United States Patent
Votaw et al.

(10) Patent No.: US 10,305,891 B2
(45) Date of Patent: *May 28, 2019

(54) PREVENTING UNAUTHORIZED ACCESS TO SECURED INFORMATION SYSTEMS USING MULTI-DEVICE AUTHENTICATION TECHNIQUES

(71) Applicant: Bank of America Corporation, Charlotte, NC (US)

(72) Inventors: Elizabeth S. Votaw, Potomac, MD (US); Andrew T. Keys, Albany, OR (US)

(73) Assignee: Bank of America Corporation, Charlotte, NC (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/152,753

(22) Filed: May 12, 2016

(65) Prior Publication Data

US 2017/0331816 A1 Nov. 16, 2017

(51) Int. Cl.
*H04L 29/06* (2006.01)
*G06F 21/34* (2013.01)
(Continued)

(52) U.S. Cl.
CPC .......... *H04L 63/0838* (2013.01); *G06F 21/32* (2013.01); *G06F 21/34* (2013.01);
(Continued)

(58) Field of Classification Search
CPC .......... G06F 21/32; G06F 21/34; G06F 21/42; H04L 63/0838; H04L 63/0846; H04L 63/0853; H04L 63/0861; H04L 63/10
(Continued)

(56) References Cited

U.S. PATENT DOCUMENTS

| 7,562,227 | B1 * | 7/2009 | Cox | G06F 21/36 |
| | | | | 713/183 |
| 8,412,928 | B1 * | 4/2013 | Bowness | H04L 63/0838 |
| | | | | 713/155 |

(Continued)

OTHER PUBLICATIONS

Dec. 1, 2017 (US) Non-Final Office Action—U.S. Appl. No. 15/152,849.

(Continued)

*Primary Examiner* — Shahriar Zarrineh
(74) *Attorney, Agent, or Firm* — Banner & Witcoff, Ltd.; Michael A. Springs

(57) ABSTRACT

A computing platform may receive, from a client portal server, a request to authenticate a user to a user account. The computing platform may generate a first one-time passcode for a first computing device associated with the user account and may send, to the first computing device, the first one-time passcode. The computing platform also may generate a first registered-device authentication prompt for a second computing device associated with the user account and may send, to the second computing device, the first registered-device authentication prompt. Thereafter, the computing platform may receive first one-time passcode input and a first response to the first registered-device authentication prompt, which the computing platform may validate. Based on the validating, the computing platform may generate a validation message directing the client portal server to provide the user with access to the user account, which the computing platform may send to the client portal server.

22 Claims, 30 Drawing Sheets

(51) Int. Cl.
*G06F 21/42* (2013.01)
*G06F 21/32* (2013.01)

(52) U.S. Cl.
CPC .......... *G06F 21/42* (2013.01); *H04L 63/0853* (2013.01); *H04L 63/0861* (2013.01); *H04L 63/0846* (2013.01); *H04L 63/10* (2013.01); *H04L 2463/082* (2013.01)

(58) Field of Classification Search
USPC ........................................................... 726/7
See application file for complete search history.

(56) References Cited

U.S. PATENT DOCUMENTS

| | | | |
|---|---|---|---|
| 9,185,108 B2* | 11/2015 | M'Raihi | G06F 21/33 |
| 9,298,901 B1* | 3/2016 | Boss | G06F 21/31 |
| 9,300,661 B1* | 3/2016 | O'Malley | H04L 63/0861 |
| 9,350,717 B1* | 5/2016 | Siddiqui | H04L 63/08 |
| 9,525,551 B1* | 12/2016 | Ackerman | H04L 9/3228 |
| 9,614,829 B1* | 4/2017 | Molina-Markham | H04L 63/08 |
| 9,939,908 B2 | 4/2018 | Lopez Lecube et al. | |
| 2005/0091539 A1* | 4/2005 | Wang | G06F 21/31 726/4 |
| 2005/0268107 A1* | 12/2005 | Harris | G06F 21/31 713/182 |
| 2007/0186103 A1* | 8/2007 | Randle | G06F 21/31 713/168 |
| 2008/0098466 A1* | 4/2008 | Yoshida | G06F 21/35 726/5 |
| 2013/0145446 A1* | 6/2013 | Dorso | G06F 21/36 726/6 |
| 2013/0159195 A1* | 6/2013 | Kirillin | G06Q 20/322 705/71 |
| 2013/0191902 A1* | 7/2013 | Friedl | H04L 9/3271 726/7 |
| 2013/0198081 A1 | 8/2013 | Royyuru et al. | |
| 2013/0325697 A1 | 12/2013 | Allison, Jr. et al. | |
| 2013/0325713 A1 | 12/2013 | Yeri et al. | |
| 2013/0325716 A1 | 12/2013 | Yeri et al. | |
| 2014/0006954 A1* | 1/2014 | Raffa | G06F 3/04883 715/733 |
| 2014/0024361 A1 | 1/2014 | Poon et al. | |
| 2014/0032691 A1 | 1/2014 | Barton et al. | |
| 2014/0032733 A1 | 1/2014 | Barton et al. | |
| 2014/0032758 A1 | 1/2014 | Barton et al. | |
| 2014/0032759 A1 | 1/2014 | Barton et al. | |
| 2014/0033271 A1 | 1/2014 | Barton et al. | |
| 2014/0040638 A1 | 2/2014 | Barton et al. | |
| 2014/0040977 A1 | 2/2014 | Barton et al. | |
| 2014/0040978 A1 | 2/2014 | Barton et al. | |
| 2014/0040979 A1 | 2/2014 | Barton et al. | |
| 2014/0053234 A1 | 2/2014 | Barton et al. | |
| 2014/0095894 A1 | 4/2014 | Barton et al. | |
| 2014/0096186 A1 | 4/2014 | Barton et al. | |
| 2014/0109171 A1 | 4/2014 | Barton et al. | |
| 2014/0109172 A1 | 4/2014 | Barton et al. | |
| 2014/0109173 A1 | 4/2014 | Barton et al. | |
| 2014/0109174 A1 | 4/2014 | Barton et al. | |
| 2014/0109175 A1 | 4/2014 | Barton et al. | |
| 2014/0123257 A1 | 5/2014 | Gordon et al. | |
| 2014/0189350 A1* | 7/2014 | Baghdasaryan | H04L 9/3271 713/168 |
| 2014/0199961 A1 | 7/2014 | Mohammed et al. | |
| 2014/0199962 A1 | 7/2014 | Mohammed et al. | |
| 2014/0227999 A1 | 8/2014 | Ferlin | |
| 2014/0289833 A1* | 9/2014 | Briceno | H04L 63/08 726/7 |
| 2014/0337528 A1 | 11/2014 | Barton et al. | |
| 2014/0353369 A1 | 12/2014 | Malin et al. | |
| 2014/0357221 A1 | 12/2014 | Mohammed et al. | |
| 2014/0357222 A1 | 12/2014 | Mohammed et al. | |
| 2015/0007298 A1* | 1/2015 | Menon | G06F 21/41 726/8 |
| 2015/0067769 A1 | 3/2015 | Barton et al. | |
| 2015/0100788 A1 | 4/2015 | Chastain et al. | |
| 2015/0154597 A1* | 6/2015 | Bacastow | G06Q 20/4012 705/72 |
| 2015/0163366 A1 | 6/2015 | Mohammed et al. | |
| 2015/0193749 A1 | 7/2015 | Ivanoff et al. | |
| 2015/0193750 A1 | 7/2015 | Ivanoff et al. | |
| 2015/0193787 A1 | 7/2015 | Ivanoff et al. | |
| 2015/0193843 A1 | 7/2015 | Ivanoff et al. | |
| 2015/0193872 A1 | 7/2015 | Ivanoff et al. | |
| 2015/0213195 A1 | 7/2015 | Blechman | |
| 2015/0254672 A1 | 9/2015 | Huesch et al. | |
| 2015/0256684 A1 | 9/2015 | Mohammed et al. | |
| 2015/0310204 A1 | 10/2015 | Pruthi et al. | |
| 2015/0310205 A1 | 10/2015 | Pruthi et al. | |
| 2015/0324789 A1 | 11/2015 | Dvorak et al. | |
| 2015/0334107 A1 | 11/2015 | Chastain et al. | |
| 2015/0373206 A1 | 12/2015 | Mohammed et al. | |
| 2016/0050234 A1* | 2/2016 | Choyi | G06F 21/32 726/1 |
| 2016/0054140 A1* | 2/2016 | Breed | G01C 21/3611 701/408 |
| 2016/0065568 A1 | 3/2016 | Dave et al. | |
| 2016/0072903 A1* | 3/2016 | Chakra | G06F 17/2785 704/9 |
| 2016/0085926 A1 | 3/2016 | Ivanoff et al. | |
| 2016/0103965 A1 | 4/2016 | Ivanoff et al. | |
| 2016/0103982 A1* | 4/2016 | Boss | G06F 21/31 726/7 |
| 2016/0105546 A1 | 4/2016 | Keys et al. | |
| 2016/0105792 A1 | 4/2016 | Mohammed et al. | |
| 2016/0110523 A1 | 4/2016 | Francois | |
| 2016/0112437 A1* | 4/2016 | Churyumov | G06F 21/43 726/7 |
| 2016/0117507 A1 | 4/2016 | Pruthi et al. | |
| 2016/0150406 A1* | 5/2016 | Vincent | G06F 21/34 726/6 |
| 2016/0180072 A1* | 6/2016 | Ligatti | G06F 21/34 726/7 |
| 2016/0182500 A1* | 6/2016 | Ligatti | H04L 63/0853 713/156 |
| 2016/0189136 A1* | 6/2016 | Mercille | G06Q 20/3227 705/44 |
| 2016/0191515 A1* | 6/2016 | Kim | H04L 63/0861 726/6 |
| 2016/0255063 A1* | 9/2016 | Zhang | H04L 63/0876 713/168 |
| 2016/0277597 A1 | 9/2016 | Ohara | |
| 2016/0286396 A1* | 9/2016 | Tuukkanen | G06F 21/40 |
| 2017/0093846 A1* | 3/2017 | Lopez Lecube | H04L 63/0853 |
| 2017/0104761 A1* | 4/2017 | Seigel | H04L 63/107 |
| 2017/0139659 A1* | 5/2017 | Spriggs | G06F 3/1407 |
| 2017/0161503 A1 | 6/2017 | Seigel et al. | |
| 2017/0257397 A1 | 9/2017 | Graham et al. | |
| 2018/0234831 A1* | 8/2018 | Liu | A63F 13/12 |

OTHER PUBLICATIONS

Jun. 20, 2018 (US) Notice of Allowance—U.S. Appl. No. 15/152,849.
Jan Hajny et al., "Multi-device Authentication Using Wearable and IoT," Proceedings of the 13th International Joint Conference one-Business and Telecommunications (ICETE 2016)—vol. 4: SECRYPT, pp. 483-488.
Daniel Hintze, "Towards Transparent Multi-Device-Authentication," Ubicomp/IsWC '15 Adjunct, Sep. 7-11, 2015, Japan, pp. 435-440.

* cited by examiner

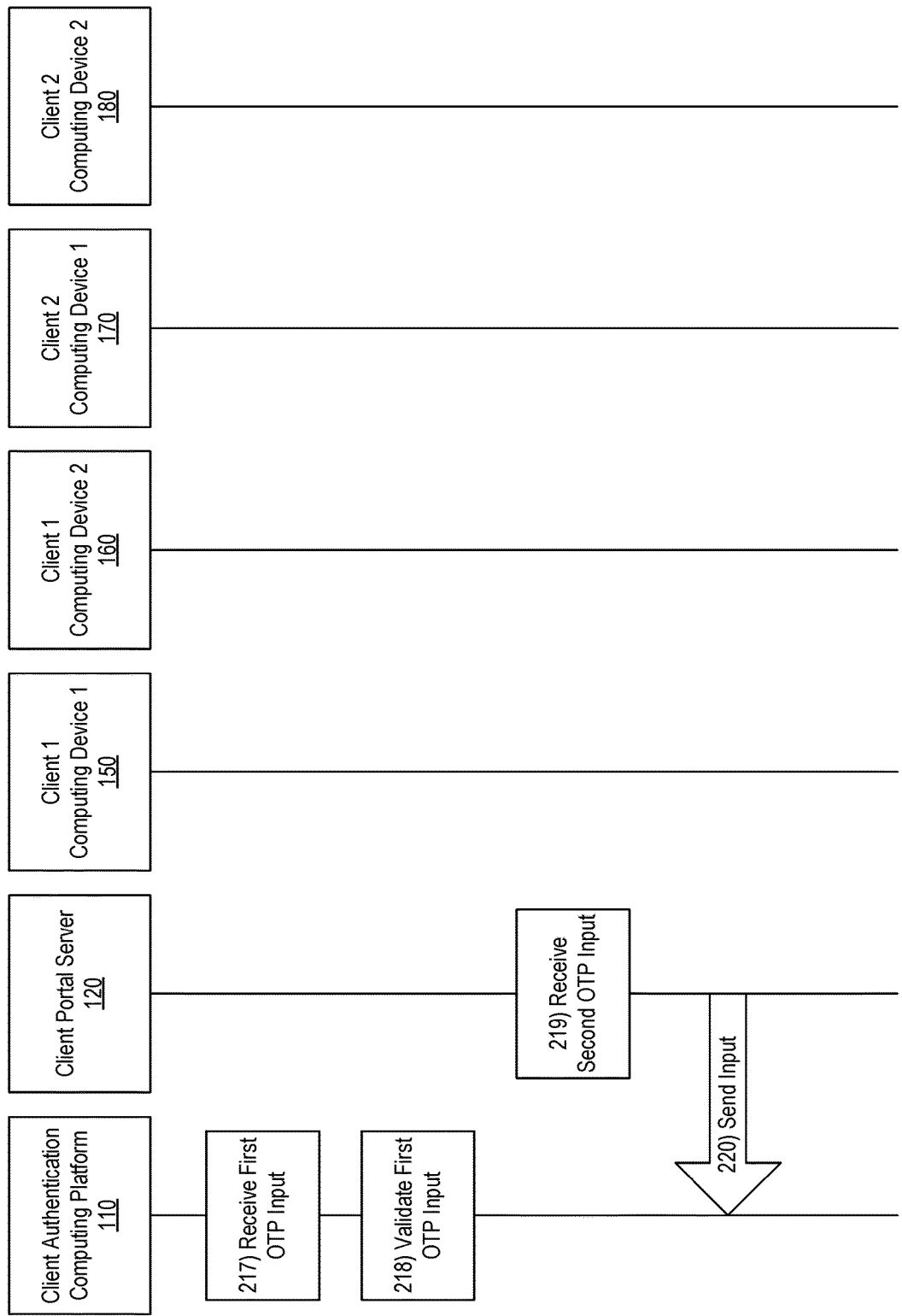

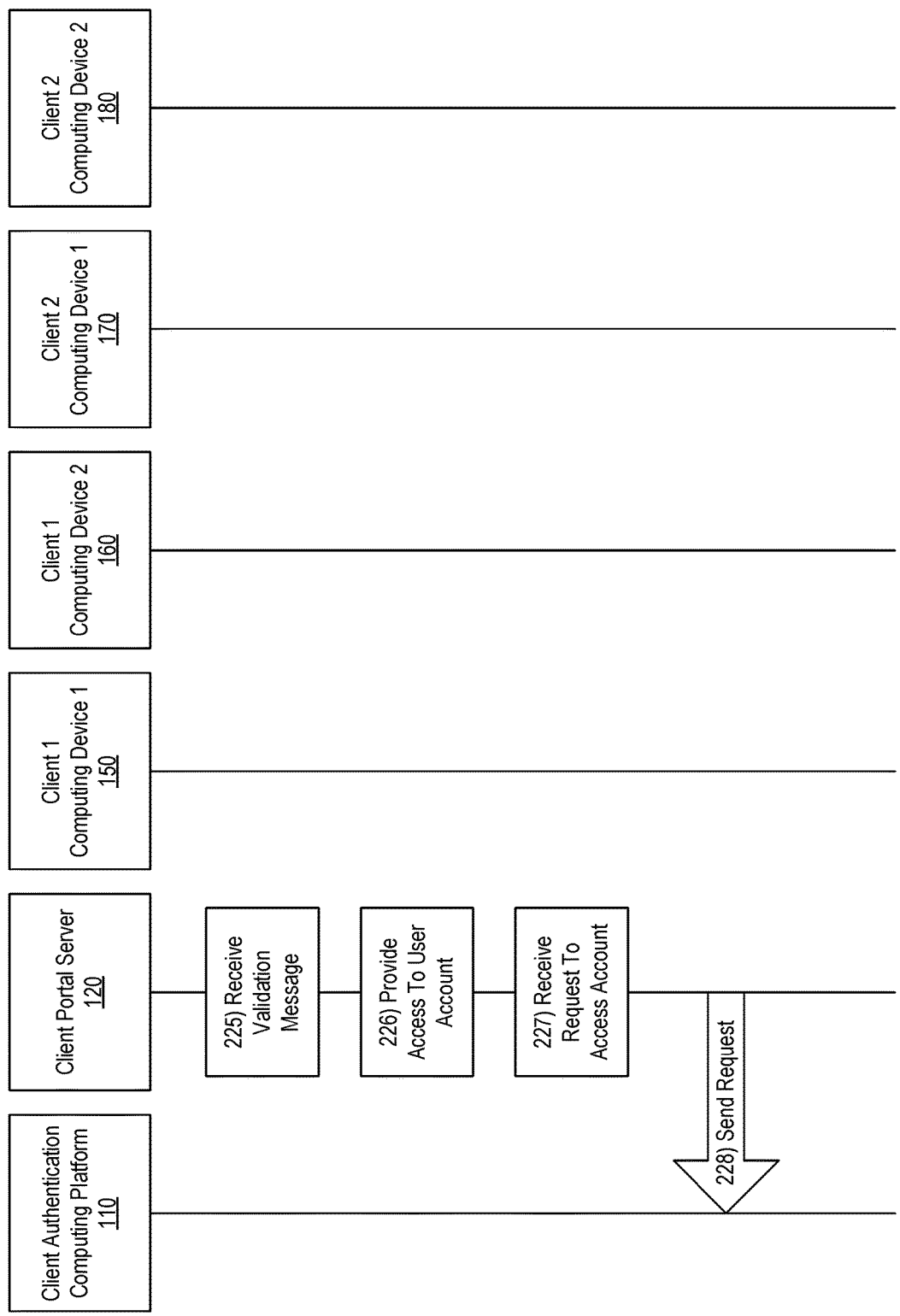

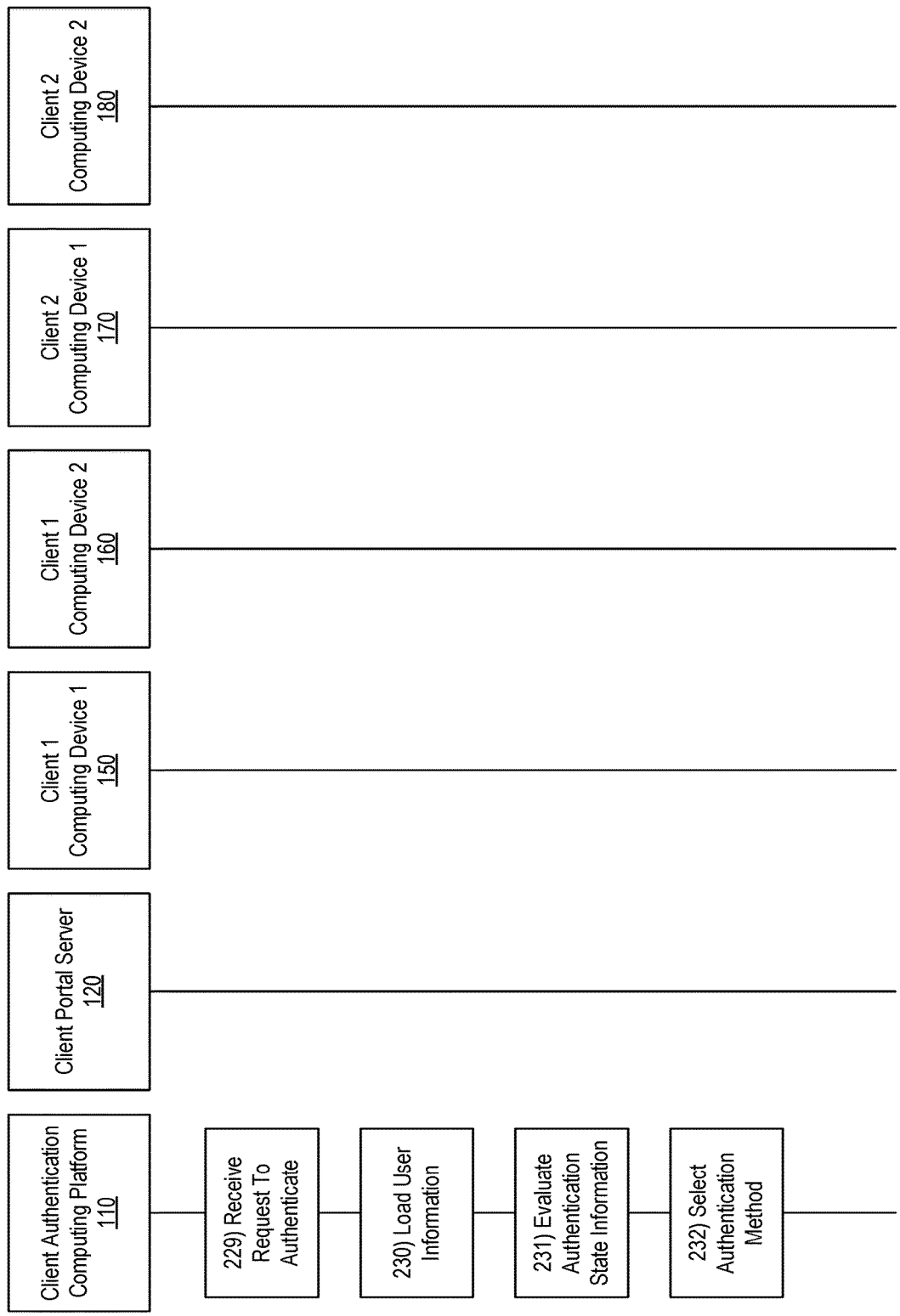

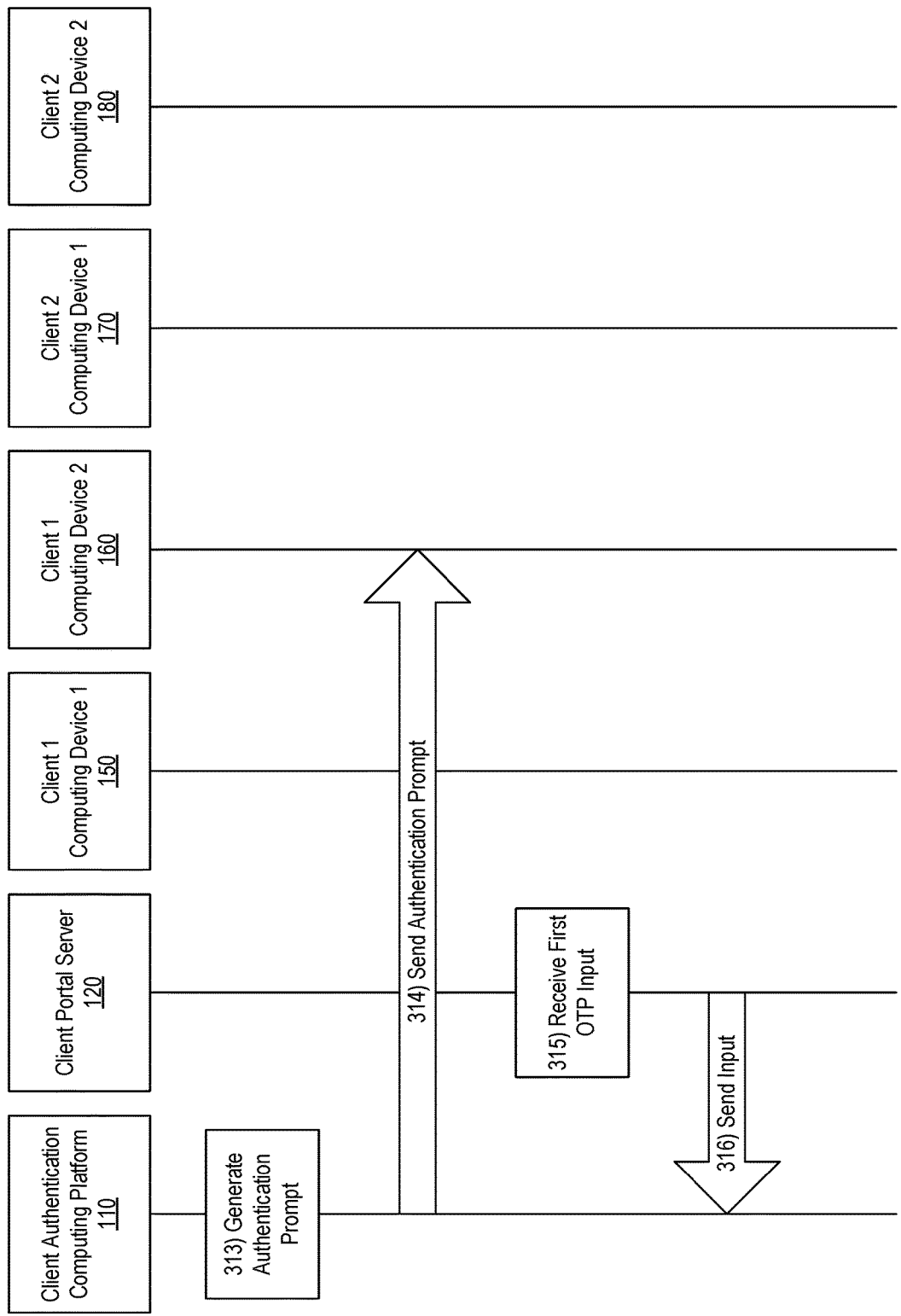

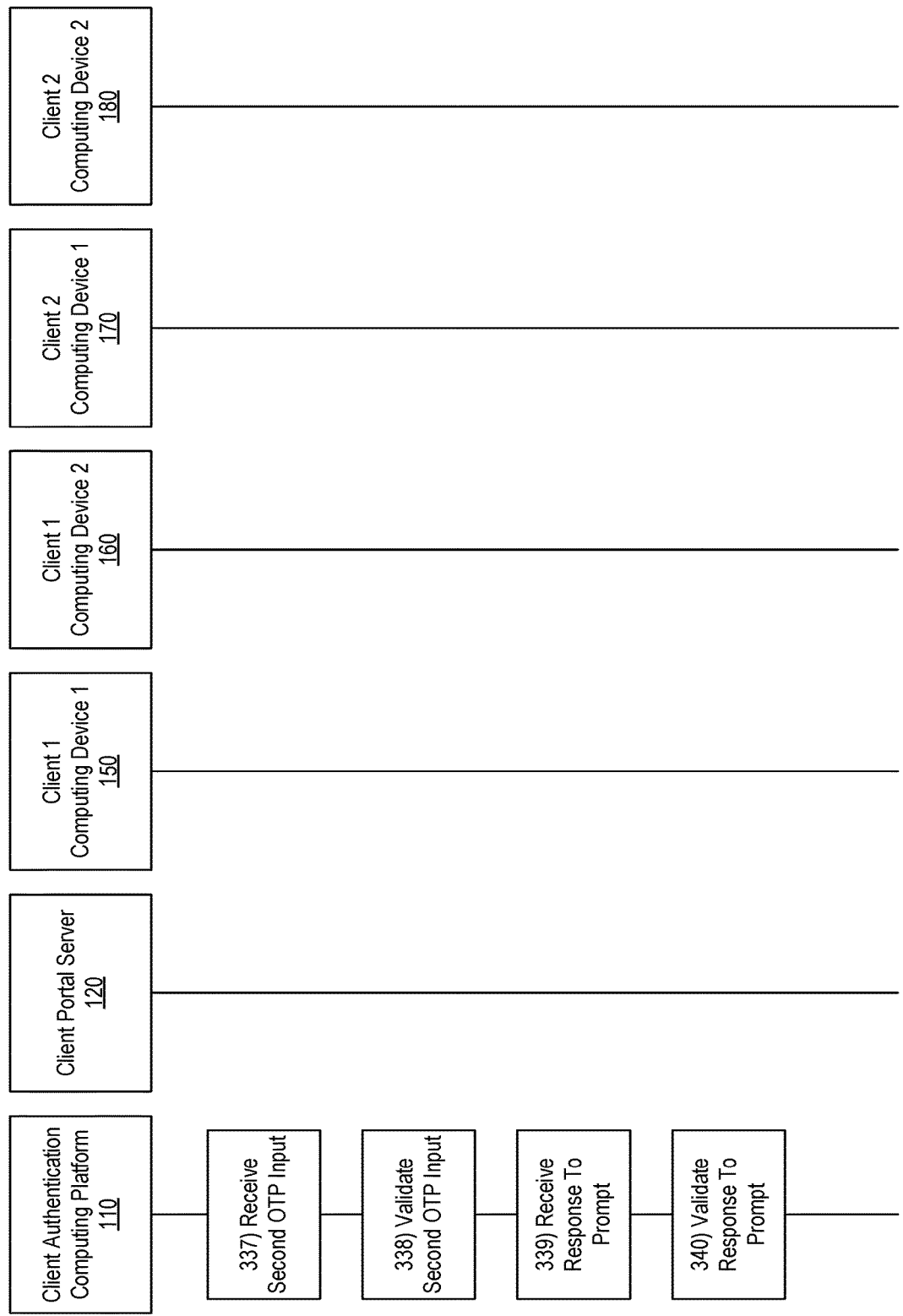

PREVENTING UNAUTHORIZED ACCESS TO SECURED INFORMATION SYSTEMS USING MULTI-DEVICE AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using multi-device authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing multi-device authentication techniques.

In accordance with one or more embodiments, a computing platform having at least one processor, a memory, and a communication interface may receive, via the communication interface, and from a client portal server, a request to authenticate a first user to a first user account associated with a client portal provided by the client portal server. Based on receiving the request to authenticate the first user to the first user account, the computing platform may generate a first one-time passcode for a first computing device associated with the first user account. Subsequently, the computing platform may send, via the communication interface, to the first computing device associated with the first user account, the first one-time passcode generated for the first computing device associated with the first user account. Based on receiving the request to authenticate the first user to the first user account, the computing platform also may generate a second one-time passcode for a second computing device associated with the first user account. Subsequently, the computing platform may send, via the communication interface, to the second computing device associated with the first user account, the second one-time passcode generated for the second computing device associated with the first user account. Thereafter, the computing platform may receive, via the communication interface, from the client portal server, first one-time passcode input. The computing platform may validate the first one-time passcode input based on the first one-time passcode generated for the first computing device associated with the first user account. The computing platform also may receive, via the communication interface, from the client portal server, second one-time passcode input. The computing platform may validate the second one-time passcode input based on the second one-time passcode generated for the second computing device associated with the first user account. Based on validating the first one-time passcode input and the second one-time passcode input, the computing platform may generate a first validation message directing the client portal server to provide the first user with access to the first user account. Subsequently, the computing platform may send, via the communication interface, to the client portal server, the first validation message directing the client portal server to provide the first user with access to the first user account.

In some embodiments, prior to receiving the request to authenticate the first user to the first user account, the computing platform may store first device registration information linking the first computing device and the second computing device to the first user account.

In some embodiments, prior to receiving the request to authenticate the first user to the first user account, the computing platform may receive, via the communication interface, from the client portal server, first authentication preferences information for the first user account. Subsequently, the computing platform may store the first authentication preferences information for the first user account received from the client portal server. In some instances, the first authentication preferences information for the first user account comprises selection information directing the computing platform to use a multi-device authentication technique when processing authentication requests for the first user account.

In some embodiments, prior to generating the first one-time passcode and the second one-time passcode, the computing platform may evaluate authentication state information associated with the first user account. Subsequently, the computing platform may select a multi-device authentication technique for authenticating the first user to the first user account based on evaluating the authentication state information associated with the first user account. In some instances, evaluating the authentication state information associated with the first user account comprises evaluating a current time of day. In some instances, evaluating the authentication state information associated with the first user account comprises evaluating location information. In some instances, evaluating the authentication state information associated with the first user account comprises evaluating authentication history information associated with the first user account.

In some embodiments, the computing platform may receive, via the communication interface, and from the client portal server, a request to authenticate a second user to a second user account associated with the client portal provided by the client portal server. Based on receiving the request to authenticate the second user to the second user account, the computing platform may generate a third one-time passcode for a third computing device associated with the second user account. Subsequently, the computing platform may send, via the communication interface, to the third computing device associated with the second user account, the third one-time passcode generated for the third computing device associated with the second user account. Based on receiving the request to authenticate the second user to the second user account, the computing platform also may generate a fourth one-time passcode for a fourth computing device associated with the second user account. Subsequently, the computing platform may send, via the communication interface, to the fourth computing device associated with the second user account, the fourth one-time passcode generated for the fourth computing device associated with the second user account. Thereafter, the computing platform may receive, via the communication interface, from the client portal server, third one-time passcode input. The computing platform may validate the third one-time passcode input based on the third one-time passcode generated for the third computing device associated with the second user account. The computing platform also may receive, via the communication interface, from the client portal server, fourth one-time passcode input. The computing platform may validate the fourth one-time passcode input based on the fourth one-time passcode generated for the fourth computing device associated with the second user account. Based on validating the third one-time passcode input and the fourth one-time passcode input, the computing platform may generate a second validation message directing the client portal server to provide the second user with access to the second user account. Subsequently, the computing platform may send, via the communication interface, to the client portal server, the second validation message directing the client portal server to provide the second user with access to the second user account.

In some embodiments, prior to receiving the request to authenticate the second user to the second user account, the computing platform may store second device registration information linking the third computing device and the fourth computing device to the second user account.

In some embodiments, prior to receiving the request to authenticate the second user to the second user account, the computing platform may receive, via the communication interface, from the client portal server, second authentication preferences information for the second user account. Subsequently, the computing platform may store the second authentication preferences information for the second user account received from the client portal server. In some instances, the second authentication preferences information for the second user account comprises selection information directing the computing platform to use a multi-device authentication technique when processing authentication requests for the second user account.

In some embodiments, prior to generating the third one-time passcode and the fourth one-time passcode, the computing platform may evaluate authentication state information associated with the second user account. Subsequently, the computing platform may select a multi-device authentication technique for authenticating the second user to the second user account based on evaluating the authentication state information associated with the second user account. In some instances, evaluating the authentication state information associated with the second user account comprises evaluating a current time of day. In some instances, evaluating the authentication state information associated with the second user account comprises evaluating location information. In some instances, evaluating the authentication state information associated with the second user account comprises evaluating authentication history information associated with the second user account.

In accordance with one or more additional or alternative embodiments, a computing platform having at least one processor, a memory, and a communication interface may receive, via the communication interface, and from a client portal server, a request to authenticate a first user to a first user account associated with a client portal provided by the client portal server. Based on receiving the request to authenticate the first user to the first user account, the computing platform may generate a first one-time passcode for a first computing device associated with the first user account. Subsequently, the computing platform may send, via the communication interface, to the first computing device associated with the first user account, the first one-time passcode generated for the first computing device associated with the first user account. Based on receiving the request to authenticate the first user to the first user account, the computing platform also may generate a first registered-device authentication prompt for a second computing device associated with the first user account. Subsequently, the computing platform may send, via the communication interface, to the second computing device associated with the first user account, the first registered-device authentication prompt generated for the second computing device associated with the first user account. Thereafter, the computing platform may receive, via the communication interface, from the client portal server, first one-time passcode input. The computing platform may validate the first one-time passcode input based on the first one-time passcode generated for the first computing device associated with the first user account. In addition, the computing platform may receive, via the communication interface, a first response to the first registered-device authentication prompt. The computing platform may validate the first response to the first registered-device authentication prompt. Based on validating the first one-time passcode input and the first response to the first registered-device authentication prompt, the computing platform may generate a first validation message directing the client portal server to provide the first user with access to the first user account. Subsequently, the computing platform may send, via the communication interface, to the client portal server, the first validation message directing the client portal server to provide the first user with access to the first user account.

In some embodiments, generating the first registered-device authentication prompt for the second computing device associated with the first user account comprises generating a biometric authentication prompt for the second computing device associated with the first user account.

In some embodiments, generating the first registered-device authentication prompt for the second computing device associated with the first user account comprises generating a physical token authentication prompt for the second computing device associated with the first user account.

In some embodiments, prior to receiving the request to authenticate the first user to the first user account, the computing platform may store first device registration information linking the first computing device and the second computing device to the first user account.

In some embodiments, prior to receiving the request to authenticate the first user to the first user account, the computing platform may receive, via the communication interface, from the client portal server, first authentication preferences information for the first user account. Subsequently, the computing platform may store the first authentication preferences information for the first user account received from the client portal server. In some instances, the first authentication preferences information for the first user account comprises selection information directing the computing platform to use a multi-device authentication technique when processing authentication requests for the first user account.

In some embodiments, prior to generating the first one-time passcode and the first registered-device authentication prompt, the computing platform may evaluate authentication state information associated with the first user account. Subsequently, the computing platform may select a multi-device authentication technique for authenticating the first user to the first user account based on evaluating the authentication state information associated with the first user account. In some instances, evaluating the authentication state information associated with the first user account comprises evaluating a current time of day. In some instances, evaluating the authentication state information associated with the first user account comprises evaluating location information. In some instances, evaluating the authentication state information associated with the first user account comprises evaluating authentication history information associated with the first user account.

In some embodiments, the computing platform may receive, via the communication interface, and from the client portal server, a request to authenticate a second user to a second user account associated with the client portal provided by the client portal server. Based on receiving the request to authenticate the second user to the second user account, the computing platform may generate a second one-time passcode for a third computing device associated with the second user account. Subsequently, the computing platform may send, via the communication interface, to the third computing device associated with the second user account, the second one-time passcode generated for the third computing device associated with the second user account. Based on receiving the request to authenticate the second user to the second user account, the computing platform also may generate a second registered-device authentication prompt for a fourth computing device associated with the second user account. Subsequently, the computing platform may send, via the communication interface, to the fourth computing device associated with the second user account, the second registered-device authentication prompt generated for the fourth computing device associated with the second user account. Thereafter, the computing platform may receive, via the communication interface, from the client portal server, second one-time passcode input. The computing platform may validate the second one-time passcode input based on the second one-time passcode generated for the third computing device associated with the second user account. In addition, the computing platform may receive, via the communication interface, a second response to the second registered-device authentication prompt. The computing platform may validate the second response to the second registered-device authentication prompt. Based on validating the second one-time passcode input and the second response to the second registered-device authentication prompt, the computing platform may generate a second validation message directing the client portal server to provide the second user with access to the second user account. Subsequently, the computing platform may send, via the communication interface, to the client portal server, the second validation message directing the client portal server to provide the second user with access to the second user account.

In some instances, generating the second registered-device authentication prompt for the fourth computing device associated with the second user account comprises generating a biometric authentication prompt for the fourth computing device associated with the second user account. In some instances, generating the second registered-device authentication prompt for the fourth computing device associated with the second user account comprises generating a physical token authentication prompt for the fourth computing device associated with the second user account.

In some embodiments, prior to receiving the request to authenticate the second user to the second user account, the computing platform may store second device registration information linking the third computing device and the fourth computing device to the second user account.

In some embodiments, prior to receiving the request to authenticate the second user to the second user account, the computing platform may receive, via the communication interface, from the client portal server, second authentication preferences information for the second user account. Subsequently, the computing platform may store the second authentication preferences information for the second user account received from the client portal server. In some instances, the second authentication preferences information for the second user account comprises selection information directing the computing platform to use a multi-device authentication technique when processing authentication requests for the second user account.

In some embodiments, prior to generating the second one-time passcode and the second registered-device authentication prompt, the computing platform may evaluate authentication state information associated with the second user account. Subsequently, the computing platform may select a multi-device authentication technique for authenticating the second user to the second user account based on evaluating the authentication state information associated with the second user account. In some instances, evaluating the authentication state information associated with the second user account comprises evaluating a current time of day. In some instances, evaluating the authentication state information associated with the second user account comprises evaluating location information. In some instances, evaluating the authentication state information associated with the second user account comprises evaluating authentication history information associated with the second user account.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for preventing unauthorized access to secured information systems using multi-device authentication techniques in accordance with one or more example embodiments;

FIGS. 3A-3K depict another illustrative event sequence for preventing unauthorized access to secured information systems using multi-device authentication techniques in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to implementing multi-device one-time passcode authentication techniques. For example, when authenticating an individual customer to online banking or mobile banking, an authentication server may generate and send a plurality of different one-time passcodes to a plurality of different devices registered to the individual customer. To successfully authenticate, the customer may be required to provide the plurality of different one-time passcodes for verification and validation by the server.

Figure 1A:
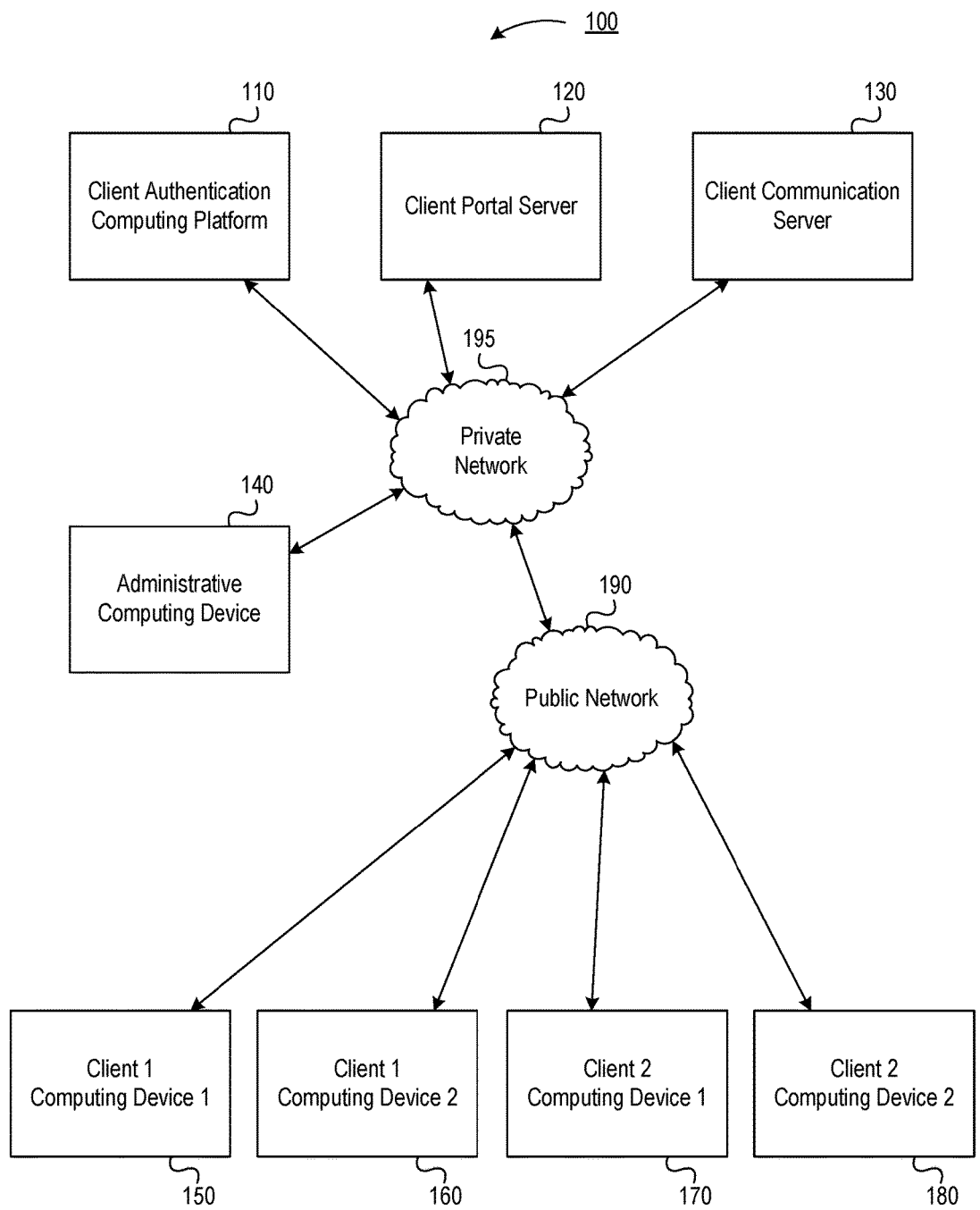
FIGS. 1A and 1B depict an illustrative computing environment for preventing unauthorized access to secured information systems using multi-device authentication techniques in accordance with one or more example embodiments.
Figure 1B:
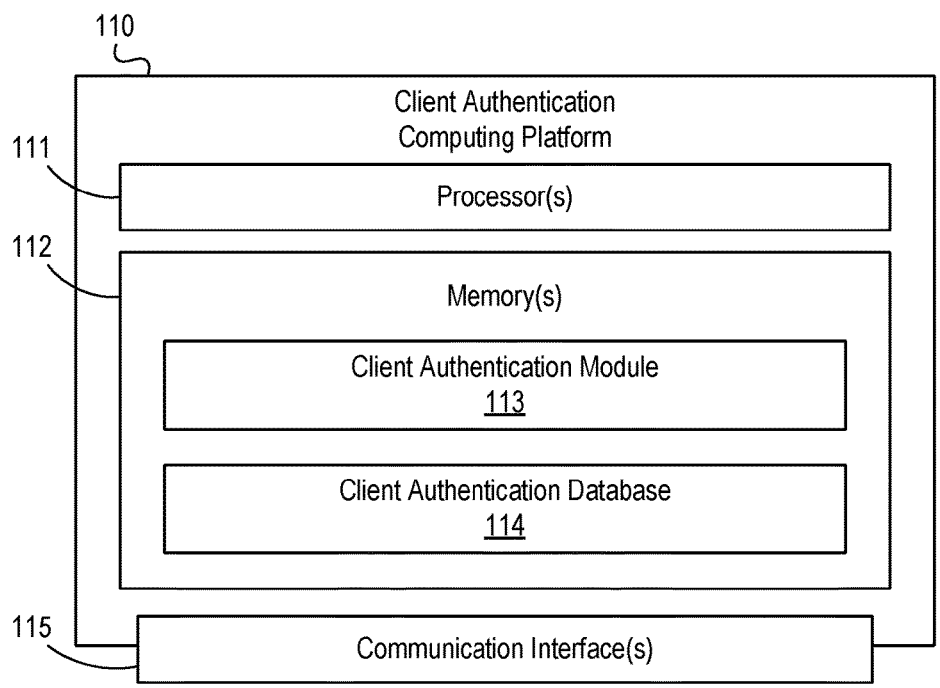

FIGS. 1A and 1B depict an illustrative computing environment for preventing unauthorized access to secured information systems using multi-device authentication techniques in accordance with one or more example embodiments. Referring to FIG. 1A, computing environment 100 may include one or more computing devices. For example, computing environment 100 may include a client portal server 120, a client communication server 130, an administrative computing device 140, a first client computing device 150, a second client computing device 160, a third client computing device 170, and a fourth client computing device 180.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as client computing device 150, client computing device 160, client computing device 170, and/or client computing device 180, as illustrated in greater detail below. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client communication server 130 may be configured to generate and/or send one or more messages to one or more client devices. For example, client communication server 130 may be configured to generate and/or send one or more account messages, advertising messages, and/or other messages to one or more customers of an organization, such as a financial institution, who may use one or more client computing devices to access the portal, such as client computing device 150, client computing device 160, client computing device 170, and/or client computing device 180. For instance, client communication server 130 may be configured to generate and/or send notifications to client computing device 150, client computing device 160, client computing device 170, and/or client computing device 180, and/or one or more other client computing devices to inform the users of such devices when new account information is available (e.g., when new financial account statements are available, when other new documents are available, or the like), when user-specific deals and/or other offers are available, and/or when other information selected for the users of such devices is available.

Administrative computing device 140 may be configured to provide one or more interfaces that allow for configuration and management of one or more other computing devices and/or computer systems included in computing environment 100. Client computing device 150 may be configured to be used by a first customer of an organization, such as a financial institution. Client computing device 160 also may be configured to be used by the first customer of the organization. In some instances, client computing device 150 and client computing device 160 may, for example, be registered with the organization and/or one or more computer systems in computing environment 100, such that the organization and/or the one or more computer systems maintain one or more records linking client computing device 150 and client computing device 160 to the first customer of the organization, as discussed in greater detail below. Client computing device 170 may be configured to be used by a second customer of the organization (who may, e.g., be different from the first customer of the organization). Client computing device 180 also may be configured to be used by the second customer of the organization. In some instances, client computing device 170 and client computing device 180 may, for example, be registered with the organization and/or one or more computer systems in computing environment 100, such that the organization and/or the one or more computer systems maintain one or more records linking client computing device 170 and client computing device 180 to the second customer of the organization, as discussed in greater detail below.

In one or more arrangements, client portal server 120, client communication server 130, administrative computing device 140, client computing device 150, client computing device 160, client computing device 170, and client computing device 180 may be any type of computing device capable of receiving a user interface, receiving input via the user interface, and communicating the received input to one or more other computing devices. For example, client portal server 120, client communication server 130, administrative computing device 140, client computing device 150, client computing device 160, client computing device 170, and client computing device 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client portal server 120, client communication server 130, administrative computing device 140, client computing device 150, client computing device 160, client computing device 170, and client computing device 180 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, client portal server 120, client communication server 130, administrative computing device 140, client computing device 150, client computing device 160, client computing device 170, and client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, client portal server 120, client communication server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, client portal server 120, client communication server 130, and administrative computing device 140 and one or more other computing devices and/or computer systems that are used by, operated by, and/or otherwise associated with the organization. Public network 190 may connect private network 195 and/or one or more computing devices connected thereto (e.g., client authentication computing platform 110, client portal server 120, client communication server 130, and administrative computing device 140) with one or more networks and/or computing devices that are not associated with the organization. For example, client computing device 150, client computing device 160, client computing device 170, and client computing device 180 might not be associated with an organization that operates private network 195 (e.g., because client computing device 150, client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 150, client computing device 160, client computing device 170, and client computing device 180 to private network 195 and/or one or more computing devices connected thereto (e.g., client authentication computing platform 110, client portal server 120, client communication server 130, and administrative computing device 140).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more users and/or devices using multi-device authentication techniques and/or to perform other functions, as discussed in greater detail below. Client authentication database 114 may store information used by client authentication module 113 and/or client authentication computing platform 110 in authenticating one or more users and/or devices using multi-device authentication techniques and/or in performing other functions.

FIGS. 2A-2L depict an illustrative event sequence for preventing unauthorized access to secured information systems using multi-device authentication techniques in accordance with one or more example embodiments. As illustrated in greater detail below, the event sequence shown in FIGS. 2A-2L illustrates, among other things, how a computing platform, such as client authentication computing platform 110, may authenticate a user of a computing device to a user account associated with a client portal using multi-device authentication techniques.

Figure 2A:
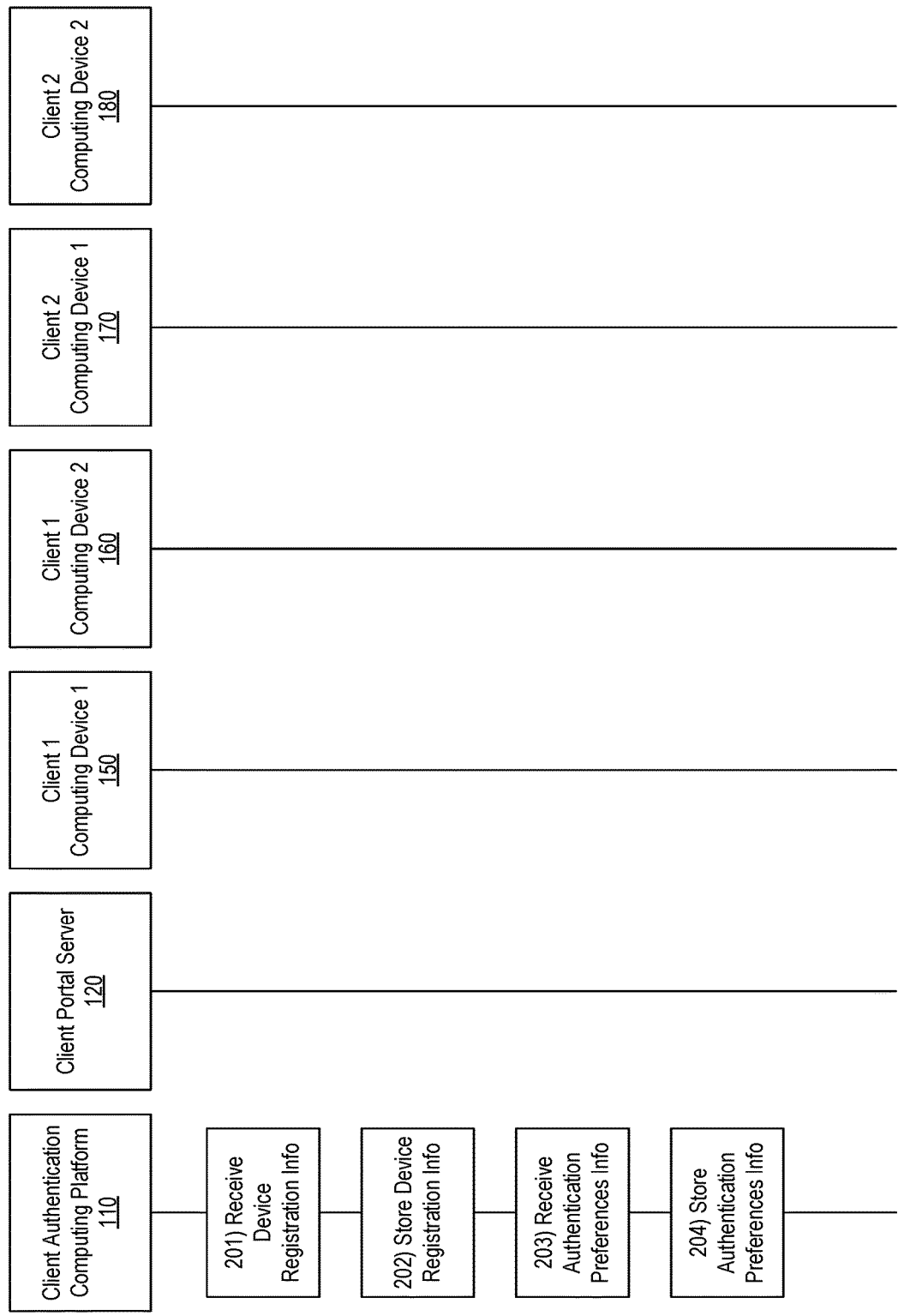

Referring to FIG. 2A, at step 201, client authentication computing platform 110 may receive device registration information. For example, at step 201, client authentication computing platform 110 may receive device registration information from client portal server 120 and/or one or more client devices, such as client computing device 150, client computing device 160, client computing device 170, and client computing device 180. Client authentication computing platform 110 may receive such device registration information, for instance, as various client devices and/or users of such client devices register the client devices to receive one-time passcodes, biometric authentication prompts, token authentication prompts, and/or the like when authenticating to access a client portal and/or website provided by client portal server 120. In some instances, such device registration information may, for example, include a unique identifier associated with a particular client device being registered (such as client computing device 150, client computing device 160, client computing device 170, and client computing device 180, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 202, client authentication computing platform 110 may store the device registration information. For example, at step 202, client authentication computing platform 110 may store the device registration information received at step 201 in a database, such as client authentication database 114. In some instances, prior to receiving a request to authenticate a first user to a first user account, client authentication computing platform 110 may store first device registration information linking a first computing device and a second computing device to the first user account. For example, at step 202, client authentication computing platform 110 may store first device registration information linking a first computing device (e.g., client computing device 150) and a second computing device (e.g., client computing device 160) to the first user account. Additionally or alternatively, prior to receiving a request to authenticate a second user to a second user account, client authentication computing platform 110 may store second device registration information linking a third computing device and a fourth computing device to the second user account. For example, at step 202, client authentication computing platform 110 may store second device registration information linking a third computing device (e.g., client computing device 170) and a fourth computing device (e.g., client computing device 180) to the second user account.

At step 203, client authentication computing platform 110 may receive authentication preferences information. For example, at step 203, client authentication computing platform 110 may receive authentication preferences information from client portal server 120 and/or one or more client devices, such as client computing device 150, client computing device 160, client computing device 170, and client computing device 180. Client authentication computing platform 110 may receive such authentication preferences information, for instance, as various client devices and/or users of such client devices define and/or modify one or more settings for authenticating to access a client portal and/or website provided by client portal server 120. In some instances, such authentication preferences information may, for example, include settings defining whether one or more passwords are used when authenticating a particular client device (such as client computing device 150, client computing device 160, client computing device 170, and client computing device 180, for instance), settings defining whether one or more security questions are used when authenticating the particular client device, settings defining whether one or more one-time passcodes are used when authenticating the particular client device, settings defining whether one or more biometric authentication prompts are used when authenticating the particular client device, settings defining whether one or more other prompts are used when authenticating the particular client device, and/or other settings.

In some instances, prior to receiving a request to authenticate the first user to the first user account, client authentication computing platform 110 may receive, via the communication interface (e.g., communication interface 115), from the client portal server (e.g., client portal server 120), first authentication preferences information for the first user account. In some embodiments, the first authentication preferences information for the first user account comprises selection information directing the computing platform to use a multi-device authentication technique when processing authentication requests for the first user account. For example, the first authentication preferences information for the first user account (which may, e.g., be received by client authentication computing platform 110 at step 203) may include selection information directing client authentication computing platform 110 to use a multi-device authentication technique when processing authentication requests for the first user account. Such a multi-device authentication technique may, for instance, include, direct, and/or cause client authentication computing platform 110 to send a first one-time passcode to a first client device linked to the first user account (e.g., client computing device 150) and send a second one-time passcode to a second client device linked to the first user account (e.g., client computing device 160) when authenticating a user to the first user account. In addition, the multi-device authentication technique may, for example, be selected instead of one or more other authentication patterns, such as a single-device authentication pattern, a single one-time passcode authentication pattern, and/or one or more other types of authentication patterns (e.g., based on prompting a user to provide a username, password, one or more biometrics, one or more security question responses, and/or the like).

In some instances, prior to receiving a request to authenticate the second user to the second user account, client authentication computing platform 110 may receive, via the communication interface (e.g., communication interface 115), from the client portal server (e.g., client portal server 120), second authentication preferences information for the second user account. In some embodiments, the second authentication preferences information for the second user account comprises selection information directing the computing platform to use a multi-device authentication technique when processing authentication requests for the second user account. For example, the second authentication preferences information for the second user account (which may, e.g., be received by client authentication computing platform 110 at step 203) may include selection information directing client authentication computing platform 110 to use a multi-device authentication technique when processing authentication requests for the second user account. Such a multi-device authentication technique may, for instance, include, direct, and/or cause client authentication computing platform 110 to send a first one-time passcode to a first client device linked to the second user account (e.g., client computing device 170) and send a second one-time passcode to a second client device linked to the second user account (e.g., client computing device 180) when authenticating a user to the second user account. In addition, the multi-device authentication technique may, for example, be selected instead of one or more other authentication patterns, such as a single-device authentication pattern, a single one-time passcode authentication pattern, and/or one or more other types of authentication patterns (e.g., based on prompting a user to provide a username, password, one or more biometrics, one or more security question responses, and/or the like).

At step 204, client authentication computing platform 110 may store the authentication preferences information. For example, at step 204, client authentication computing platform 110 may store the authentication preferences information received at step 203 in a database, such as client authentication database 114. For instance, at step 204, client authentication computing platform 110 may store the first authentication preferences information for the first user account received from the client portal server (e.g., client portal server 120). In addition, client authentication computing platform 110 may, for instance, store the second authentication preferences information for the second user account received from the client portal server (e.g., client portal server 120).

Figure 2B:
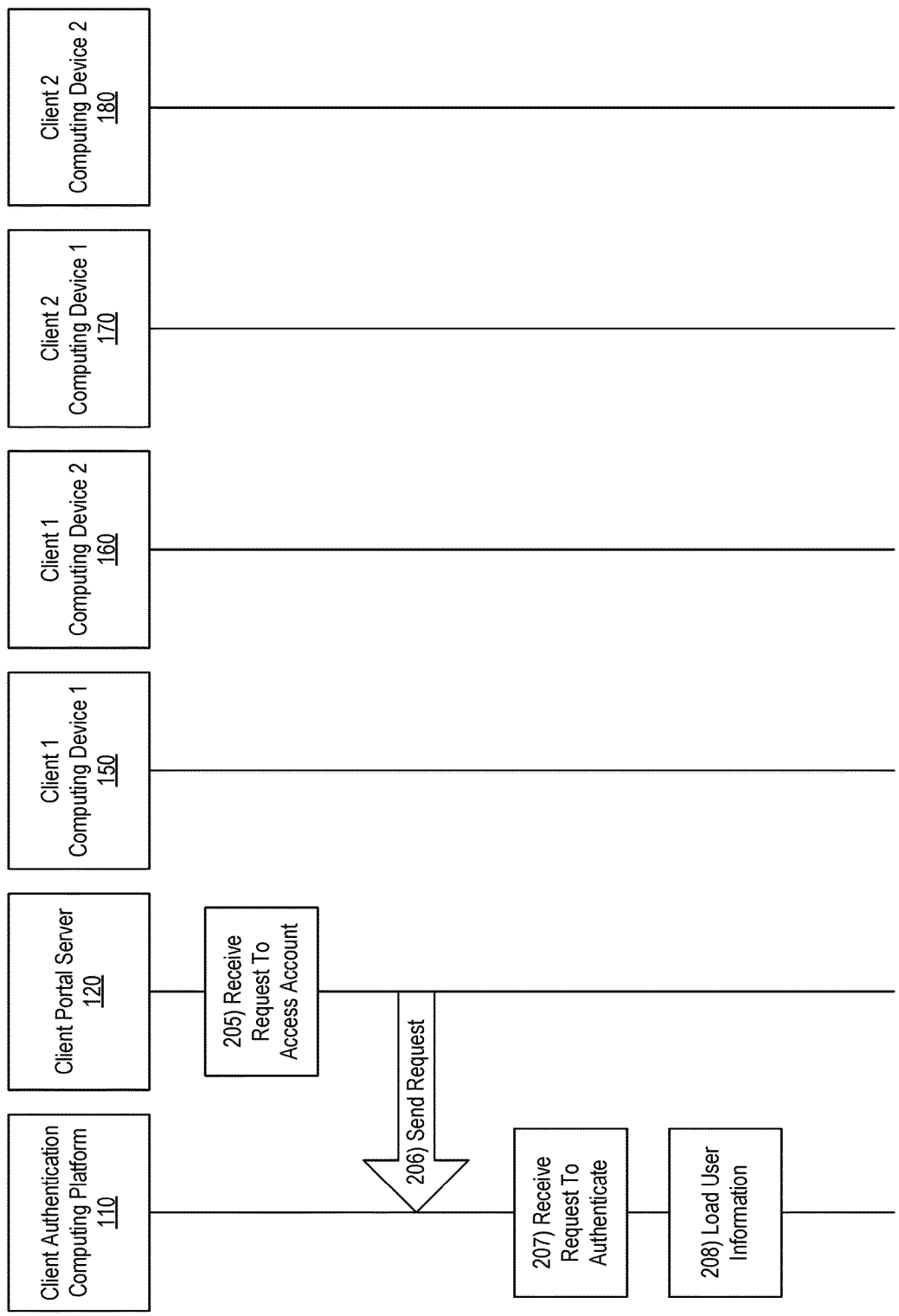

Referring to FIG. 2B, at step 205, client portal server 120 may receive a request to access a first user account from a first user of a portal provided by client portal server 120. For example, at step 205, client portal server 120 may receive such a request from client computing device 150, client computing device 160, or another computing device and/or a user of such a device, in connection with a request by the user of the device to access, view, and/or modify information associated with the first user account via a client portal and/or one or more client portal interfaces provided by client portal server 120. At step 206, client portal server 120 may send to client authentication computing platform 110 a request to authenticate the first user to the first user account (e.g., in response to and/or otherwise based on receiving the request at step 205).

At step 207, client authentication computing platform 110 may receive the request to authenticate the first user to the first user account from client portal server 120. For example, at step 207, client authentication computing platform 110 may receive, via the communication interface (e.g., communication interface 115), and from a client portal server (e.g., client portal server 120), a request to authenticate a first user to a first user account associated with a client portal provided by the client portal server (e.g., client portal server 120).

At step 208, client authentication computing platform 110 may load user information associated with the first user account. For example, at step 208, client authentication computing platform 110 may load user information associated with the first user account that includes information identifying registered devices for the first user account, which may include and/or be generated based on device registration information previously received and/or stored by client authentication computing platform 110 for the first user account. In addition, client authentication computing platform 110 may load user information associated with the first user account that includes information identifying user preferences for authentication for the first user account, which may include and/or be generated based on authentication preferences information previously received and/or stored by client authentication computing platform 110 for the first user account.

Figure 2C:
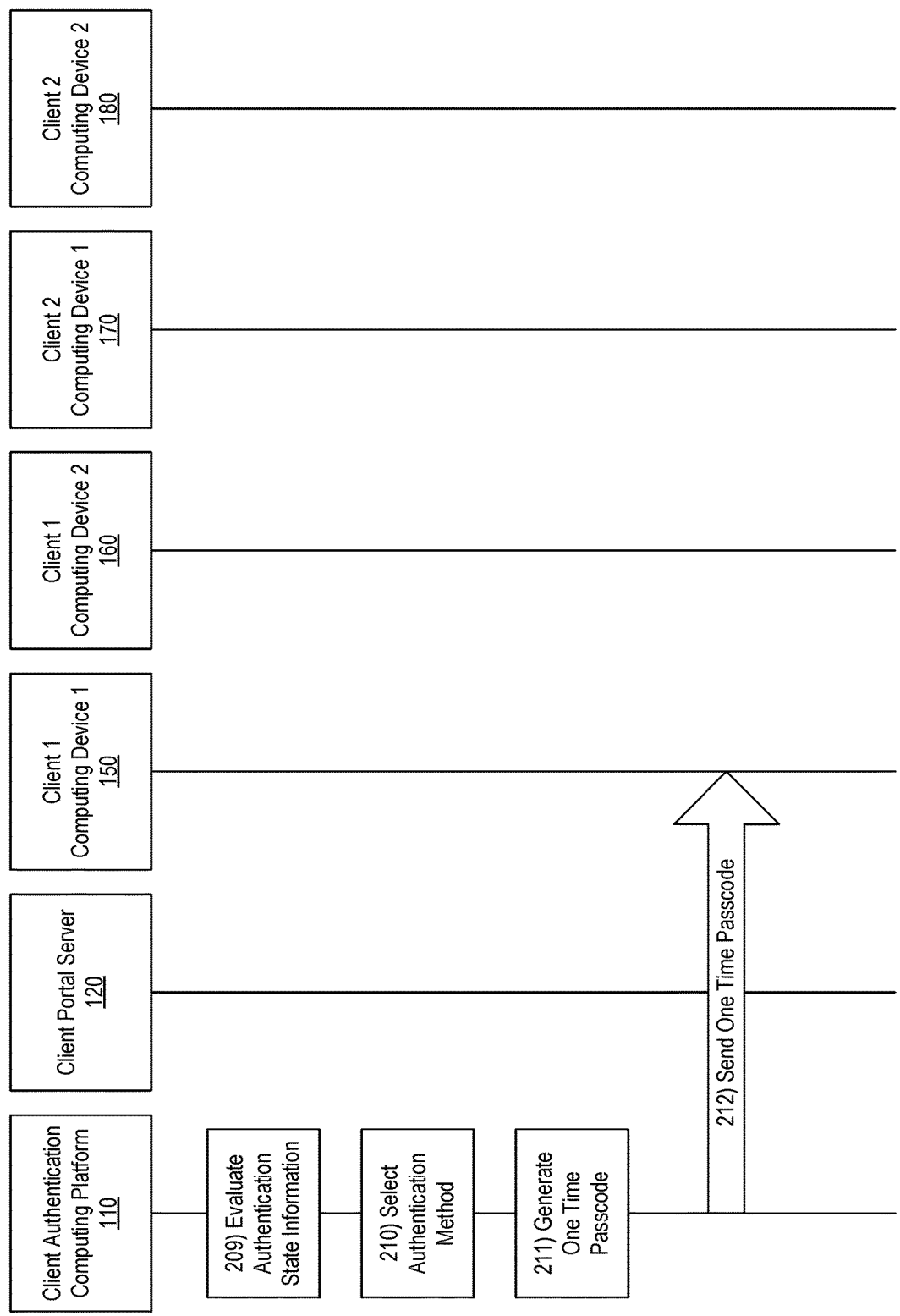

Referring to FIG. 2C, at step 209, client authentication computing platform 110 may evaluate authentication state information associated with the first user account. For example, at step 209, client authentication computing platform 110 may evaluate authentication state information associated with the first user account. As illustrated below, client authentication computing platform 110 may subsequently select a particular authentication technique for authenticating the first user to the first user account based on the evaluation performed at step 209. For instance, if the authentication state information associated with the first user account indicates that the first user account is currently in a relatively high risk state, client authentication computing platform 110 may select a relatively more secure and/or complex authentication pattern for authenticating the first user to the first user account, such as a multi-device authentication technique. Alternatively, if the authentication state information associated with the first user account indicates that the first user account is currently in a relatively low risk state, client authentication computing platform 110 may select a relatively less secure and/or complex authentication pattern for authenticating the first user to the first user account, such as a single-device authentication technique.

In some embodiments, evaluating the authentication state information associated with the first user account comprises evaluating a current time of day. For example, in evaluating the authentication state information associated with the first user account (e.g., at step 209), client authentication computing platform 110 may evaluate a current time of day, as this factor may affect which authentication technique is selected by client authentication computing platform 110 for authenticating the first user to the first user account.

In some embodiments, evaluating the authentication state information associated with the first user account comprises evaluating location information. For example, in evaluating the authentication state information associated with the first user account (e.g., at step 209), client authentication computing platform 110 may evaluate location information, such as location information identifying a current location of the device requesting access to the first user account, the current location of the first device linked to the first user account (e.g., client computing device 150), and/or the current location of the second device linked to the first user account (e.g., client computing device 160), as this factor may affect which authentication technique is selected by client authentication computing platform 110 for authenticating the first user to the first user account.

In some embodiments, evaluating the authentication state information associated with the first user account comprises evaluating authentication history information associated with the first user account. For example, in evaluating the authentication state information associated with the first user account (e.g., at step 209), client authentication computing platform 110 may evaluate authentication history information indicating whether and/or when one or more devices previously were authenticated to the first user account and/or are currently authenticated to the first user account, one or more trends and/or patterns in authentication to the first user account, and/or the like, as this factor may affect which authentication technique is selected by client authentication computing platform 110 for authenticating the first user to the first user account.

At step 210, client authentication computing platform 110 may select an authentication method for authenticating the first user to the first user account. For example, at step 210, client authentication computing platform 110 may select an authentication method for authenticating the first user to the first user account based on the user information associated with the first user account (which may, e.g., have been loaded at step 208 and/or which may, e.g., include user preferences selecting a particular authentication method) and/or based on the evaluation of authentication state information (which may, e.g., have been performed at step 209). In some instances, client authentication computing platform 110 may, for example, select a multi-device authentication technique for authenticating the first user to the first user account based on evaluating the authentication state information associated with the first user account. As illustrated above, such authentication state information may be indicative of a current risk state associated with the first user account. Additionally or alternatively, client authentication computing platform 110 may select such a multi-device authentication technique for authenticating the first user to the first user account and/or another authentication technique based on a risk score for the first user account exceeding (or not exceeding) a predetermined threshold. For instance, if the authentication state information associated with the first user account indicates that the first user account is currently in a relatively high risk state and a corresponding risk score thus exceeds a predetermined threshold, client authentication computing platform 110 may select a relatively more secure and/or complex authentication pattern for authenticating the first user to the first user account, such as a multi-device authentication technique. Alternatively, if the authentication state information associated with the first user account indicates that the first user account is currently in a relatively low risk state and a corresponding risk score thus does not exceed a predetermined threshold, client authentication computing platform 110 may select a relatively less secure and/or complex authentication pattern for authenticating the first user to the first user account, such as a single-device authentication technique.

At step 211, client authentication computing platform 110 may generate a first one-time passcode for a first device associated with the first user account. For example, at step 211, based on receiving the request to authenticate the first user to the first user account, client authentication computing platform 110 may generate a first one-time passcode for a first computing device associated with the first user account (e.g., client computing device 150). Client authentication computing platform 110 may, for instance, generate the first one-time passcode for client computing device 150 using a random number generator and/or a random code generation algorithm, based on the authentication method selected by client authentication computing platform 110 at step 210 and/or based on the user information associated with the first user account (which may, e.g., have been loaded by client authentication computing platform 110 at step 208). At step 212, client authentication computing platform 110 may send the first one-time passcode to client computing device 150. For example, at step 212, client authentication computing platform 110 may send, via the communication interface (e.g., communication interface 115), to the first computing device associated with the first user account (e.g., client computing device 150), the first one-time passcode generated for the first computing device associated with the first user account (e.g., client computing device 150).

Figure 2D:
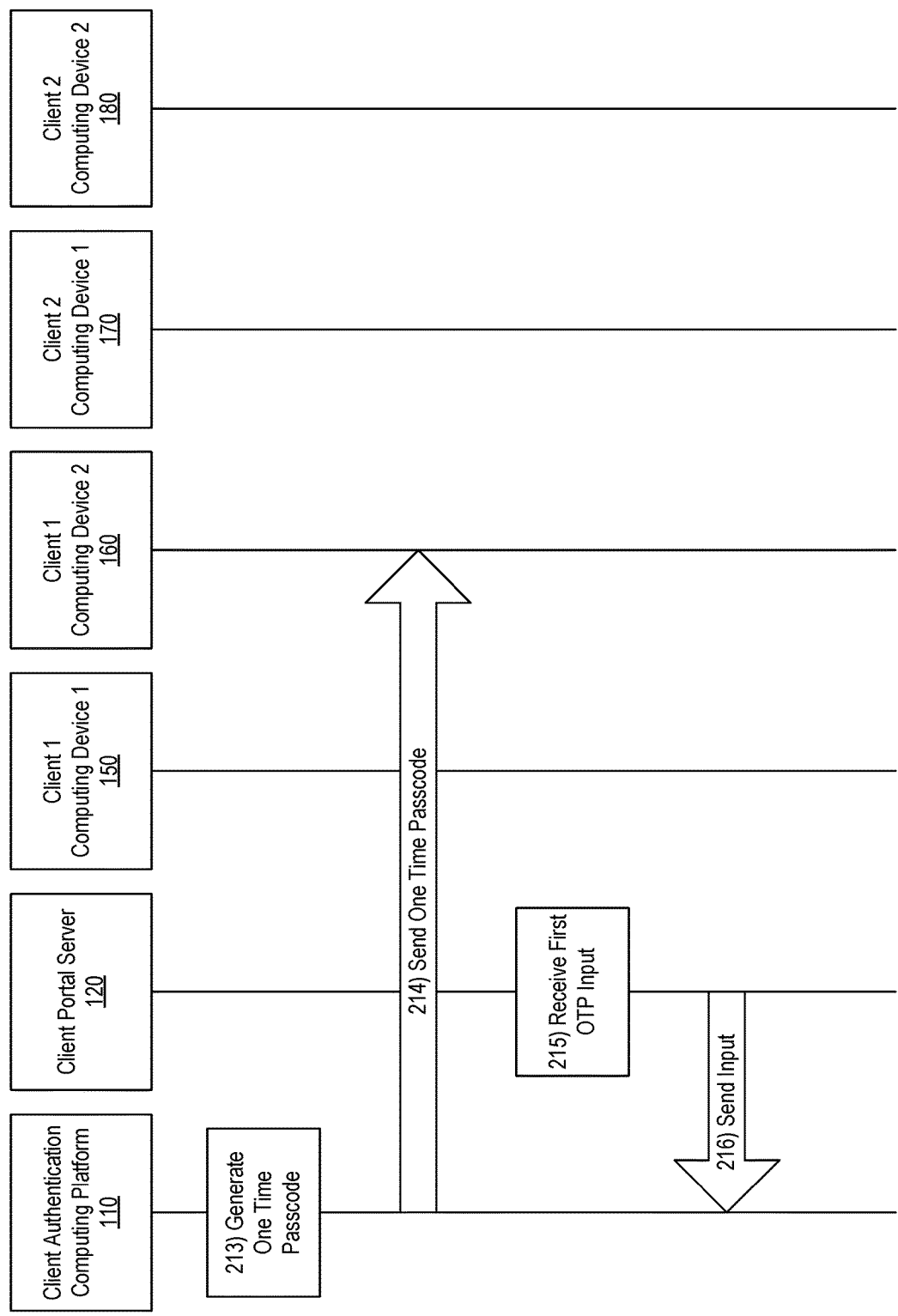

Referring to FIG. 2D, at step 213, client authentication computing platform 110 may generate a second one-time passcode for a second device associated with the first user account. For example, at step 213, based on receiving the request to authenticate the first user to the first user account, client authentication computing platform 110 may generate a second one-time passcode for a second computing device associated with the first user account (e.g., client computing device 160). Client authentication computing platform 110 may, for instance, generate the second one-time passcode for client computing device 160 using a random number generator and/or a random code generation algorithm, based on the authentication method selected by client authentication computing platform 110 at step 210 and/or based on the user information associated with the first user account (which may, e.g., have been loaded by client authentication computing platform 110 at step 208). At step 214, client authentication computing platform 110 may send the second one-time passcode to client computing device 160. For example, at step 214, client authentication computing platform 110 may send, via the communication interface (e.g., communication interface 115), to the second computing device associated with the first user account (e.g., client computing device 160), the second one-time passcode generated for the second computing device associated with the first user account (e.g., client computing device 160).

Figure 4:
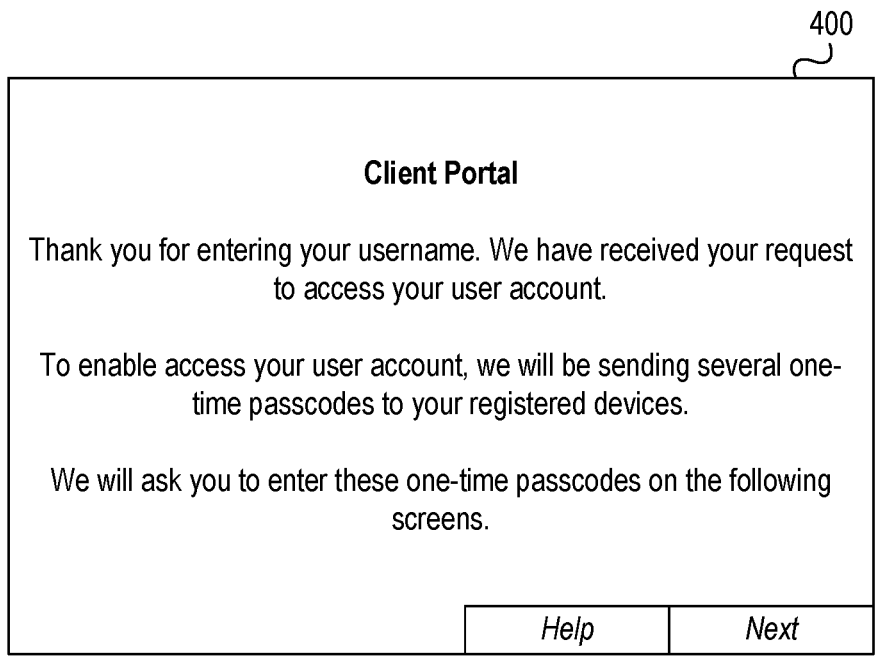
FIGS. 4-9 depict example graphical user interfaces for preventing unauthorized access to secured information systems using multi-device authentication techniques in accordance with one or more example embodiments.
Figure 5:
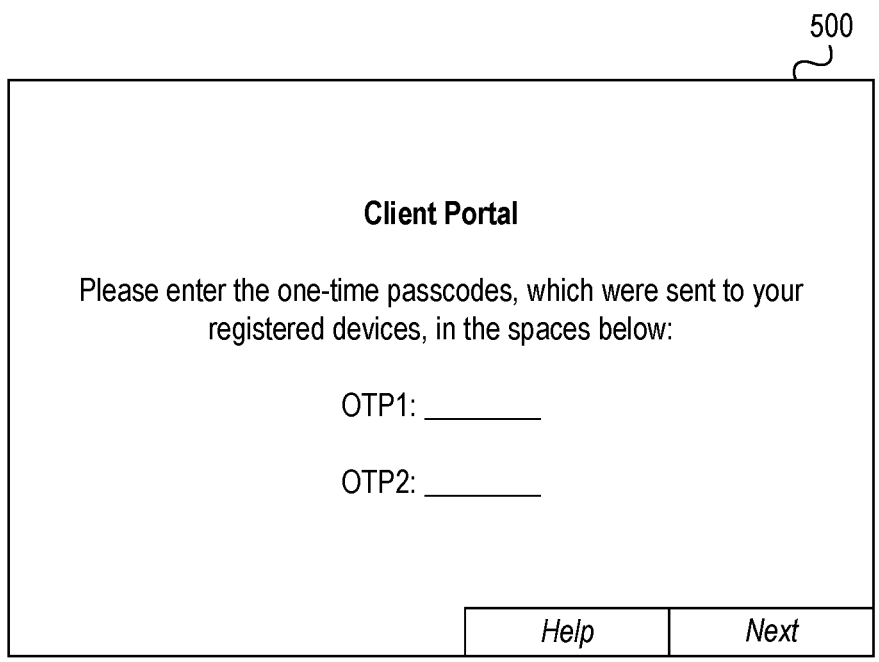

In addition to generating and/or sending the one-time passcodes, client authentication computing platform 110 also may generate and/or send one or more messages to client portal server 120 directing client portal server 120 to present one or more user interfaces that include information indicating the authentication method selected by client authentication computing platform 110 (e.g., the multi-device authentication method) and/or information instructing the user of client portal server 120 how to proceed. For example, client authentication computing platform 110 may generate and/or send one or more messages to client portal server 120 directing client portal server 120 to present a graphical user interface similar to graphical user interface 400, which is illustrated in FIG. 4. As seen in FIG. 4, graphical user interface 400 may include information indicating that a multi-device authentication method is being used by client portal server 120 and/or client authentication computing platform 110 to authenticate the user to the client portal (e.g., "To enable access your user account, we will be sending several onetime passcodes to your registered devices"), as well as information instructing the user of client portal server 120 how to proceed (e.g., "We will ask you to enter these one-time passcodes on the following screens."). Additionally or alternatively, client authentication computing platform 110 may generate and/or send one or more messages to client portal server 120 directing client portal server 120 to present a graphical user interface similar to graphical user interface 500, which is illustrated in FIG. 5. As seen in FIG. 5, graphical user interface 500 may include information prompting the user of client portal server 120 to enter the first one-time passcode generated for the first computing device associated with the first user account (e.g., client computing device 150) and the second one-time passcode generated for the second computing device associated with the first user account (e.g., client computing device 160). Client portal server 120 may, for instance, receive one-time passcode input via such a user interface, as discussed in greater detail below.

At step 215, client portal server 120 may receive first one-time passcode input. For example, at step 215, client portal server 120 may receive first one-time passcode input from the user of client portal server 120 who is requesting access to the first user account. Such first one-time passcode input may, for example, include the first one-time passcode sent by client authentication computing platform 110 to client computing device 150. At step 216, client portal server 120 may send the first one-time passcode input to client authentication computing platform 110 for validation.

Referring to FIG. 2E, at step 217, client authentication computing platform 110 may receive the first one-time passcode input from client portal server 120. For example, at step 217, client authentication computing platform 110 may receive, via the communication interface (e.g., communication interface 115), from the client portal server (e.g., client portal server 120), first one-time passcode input. At step 218, client authentication computing platform 110 may validate the first one-time passcode input received from client portal server 120. For example, at step 218, client authentication computing platform 110 may validate the first one-time passcode input based on the first one-time passcode generated for the first computing device associated with the first user account (e.g., client computing device 150). In validating the first one-time passcode input based on the first one-time passcode generated for the first computing device associated with the first user account (e.g., client computing device 150), client authentication computing platform 110 may, for example, compare the first one-time passcode input to the first one-time passcode generated for the first computing device associated with the first user account (e.g., client computing device 150) to confirm that the first one-time passcode input matches the first one-time passcode generated for the first computing device associated with the first user account (e.g., client computing device 150) and is therefore valid. If client authentication computing platform 110 determines that the first one-time passcode input does not match the first one-time passcode generated for the first computing device associated with the first user account (e.g., client computing device 150) and is therefore not valid, client authentication computing platform 110 may generate and/or send one or more error messages to client portal server 120 and/or one or more other devices. Such error messages may, for instance, prompt the user of client portal server 120 requesting access to the first user account to try entering the one-time passcode again, and if the user again provides invalid one-time passcode input, client authentication computing platform 110 may deny access to the first user account and/or the event sequence may end.

At step 219, client portal server 120 may receive second one-time passcode input. For example, at step 219, client portal server 120 may receive second one-time passcode input from the user of client portal server 120 who is requesting access to the first user account. Such second one-time passcode input may, for example, include the second one-time passcode sent by client authentication computing platform 110 to client computing device 160. At step 220, client portal server 120 may send the second one-time passcode input to client authentication computing platform 110 for validation.

Figure 2F:
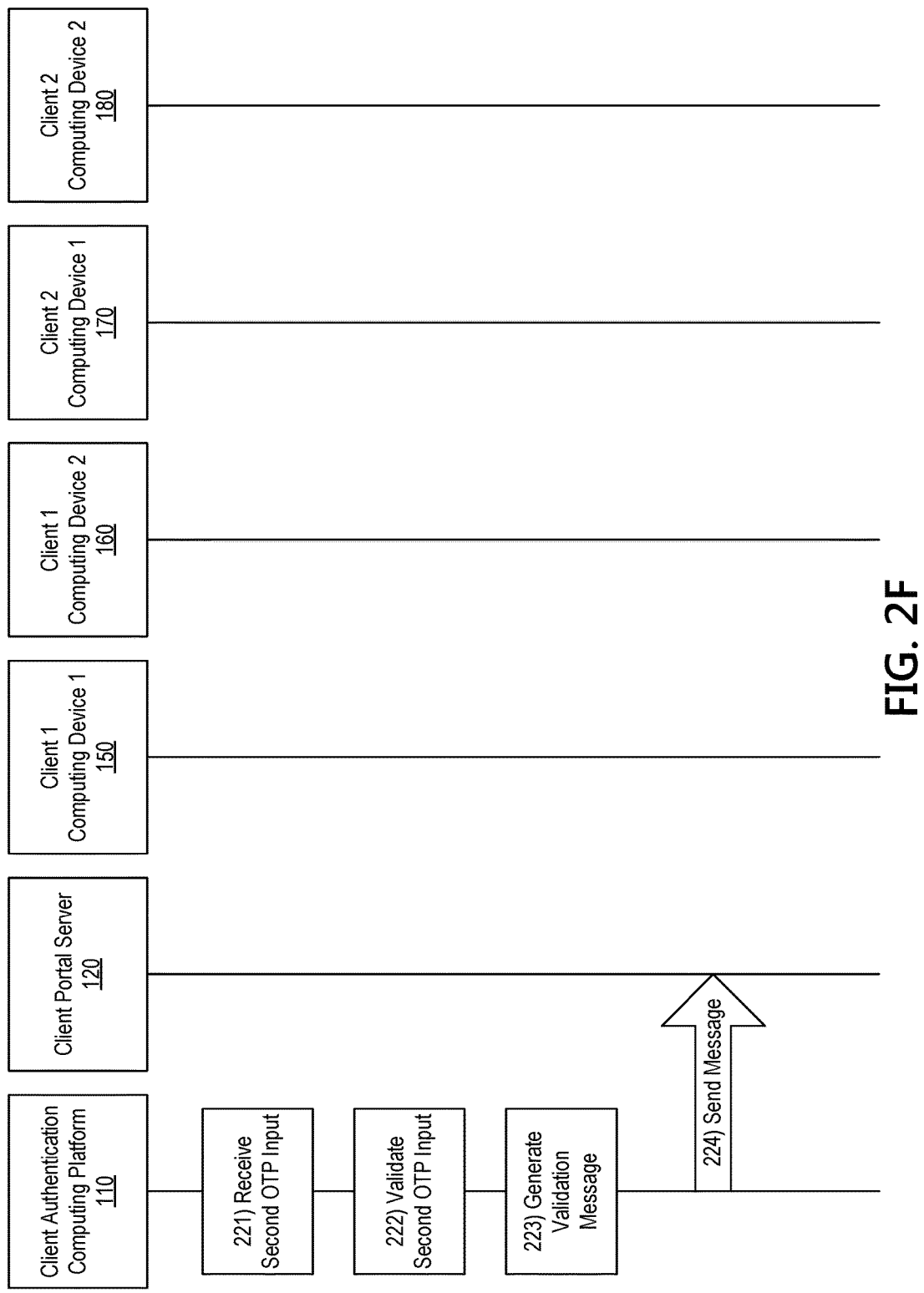

Referring to FIG. 2F, at step 221, client authentication computing platform 110 may receive the second one-time passcode input from client portal server 120. For example, at step 221, client authentication computing platform 110 may receive, via the communication interface (e.g., communication interface 115), from the client portal server (e.g., client portal server 120), second one-time passcode input. At step 222, client authentication computing platform 110 may validate the second one-time passcode input received from client portal server 120. For example, at step 222, client authentication computing platform 110 may validate the second one-time passcode input based on the second one-time passcode generated for the second computing device associated with the first user account (e.g., client computing device 160). In validating the second one-time passcode input based on the second one-time passcode generated for the second computing device associated with the first user account (e.g., client computing device 160), client authentication computing platform 110 may, for example, compare the second one-time passcode input to the second one-time passcode generated for the second computing device associated with the first user account (e.g., client computing device 160) to confirm that the second one-time passcode input matches the second one-time passcode generated for the second computing device associated with the first user account (e.g., client computing device 160) and is therefore valid. If client authentication computing platform 110 determines that the second one-time passcode input does not match the second one-time passcode generated for the second computing device associated with the first user account (e.g., client computing device 160) and is therefore not valid, client authentication computing platform 110 may generate and/or send one or more error messages to client portal server 120 and/or one or more other devices. Such error messages may, for instance, prompt the user of client portal server 120 requesting access to the first user account to try entering the one-time passcode again, and if the user again provides invalid one-time passcode input, client authentication computing platform 110 may deny access to the first user account and/or the event sequence may end.

At step 223, client authentication computing platform 110 may generate a first validation message. For example, at step 223, based on validating the first one-time passcode input and the second one-time passcode input, client authentication computing platform 110 may generate a first validation message directing the client portal server (e.g., client portal server 120) to provide the first user with access to the first user account. In some instances, in generating the first validation message directing the client portal server (e.g., client portal server 120) to provide the first user with access to the first user account, client authentication computing platform 110 may embed and/or otherwise include one or more tokens, certificates, and/or keys in the first validation message, and such tokens, certificates, and/or keys may be configured to enable and/or cause client portal server 120 to load and/or obtain user account information associated with the first user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the first validation message that enable and/or cause client portal server 120 to request, obtain, receive, and/or load financial account information associated with the first user account from one or more financial account management servers, so that client portal server 120 may subsequently present such financial account information via the client portal.

At step 224, client authentication computing platform 110 may send the first validation message to client portal server 120. For example, at step 224, client authentication computing platform 110 may send, via the communication interface (e.g., communication interface 115), to the client portal server (e.g., client portal server 120), the first validation message directing the client portal server (e.g., client portal server 120) to provide the first user with access to the first user account.

Figure 6:
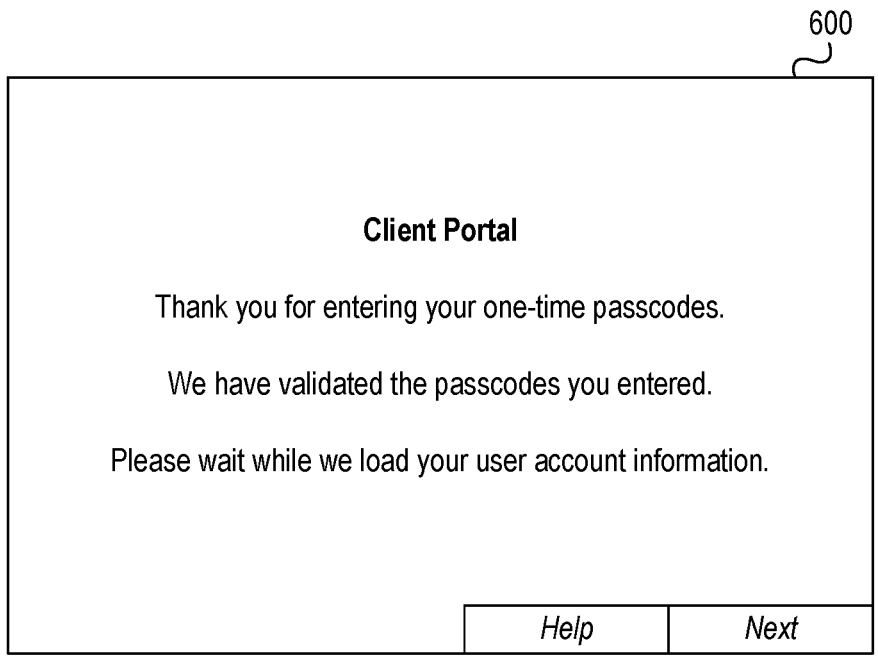

Referring to FIG. 2G, at step 225, client portal server 120 may receive the first validation message from client authentication computing platform 110. At step 226, client portal server 120 may provide the first user with access to the first user account based on the first validation message. For example, in providing the first user with access to the first user account based on the first validation message, client portal server 120 may present one or more graphical user interfaces which may form and/or otherwise be associated with a client portal provided by client portal server 120, such as an online banking portal and/or a mobile banking portal. For instance, client portal server 120 may present a graphical user interface 600, which is illustrated in FIG. 6. As seen in FIG. 6, graphical user interface 600 may include information indicating that authentication input, such as the one-time passcode input, has been validated and that access to the first user account will be provided. Additionally or alternatively, client portal server 120 may present other graphical user interfaces that include information associated with the first user account and/or one or more controls that enable a user to access, view, and/or modify such information. In some instances, in providing the first user with access to the first user account based on the first validation message, client portal server 120 may present one or more online banking user interfaces and/or mobile banking user interfaces via which a user can view account information, such as account balance information and transaction history information, request and/or execute one or more transactions (e.g., funds transfer transactions, online bill pay transactions, and/or other transactions), and/or perform other functions.

Subsequently, one or more steps of the event sequence discussed above may be repeated by client authentication computing platform 110 and/or the other systems discussed above in authenticating another user to the client portal provided by client portal server 120. Although such steps are illustrated separately and following the steps performed with respect to authenticating the first user, various steps may be performed in a different order, such that client authentication computing platform 110 may, for instance, authenticate multiple users simultaneously as client portal server 120 receives requests to access different user accounts from different users.

At step 227, client portal server 120 may receive a request to access a second user account from a second user of a portal provided by client portal server 120. For example, at step 227, client portal server 120 may receive such a request from client computing device 170, client computing device 180, or another computing device and/or a user of such a device, in connection with a request by the user of the device to access, view, and/or modify information associated with the second user account via a client portal and/or one or more client portal interfaces provided by client portal server 120. The second user account may be associated with a different user of a client portal and/or a different customer of an organization than the first user account. In addition, the second user account may be linked to client computing device 170 and/or client computing device 180 (e.g., whereas the first user account may be linked to client computing device 150 and/or client computing device 160, as illustrated above). At step 228, client portal server 120 may send to client authentication computing platform 110 a request to authenticate the second user to the second user account (e.g., in response to and/or otherwise based on receiving the request at step 227).

Referring to FIG. 2H, at step 229, client authentication computing platform 110 may receive the request to authenticate the second user to the second user account from client portal server 120. For example, at step 229, client authentication computing platform 110 may receive, via the communication interface (e.g., communication interface 115), and from the client portal server (e.g., client portal server 120), a request to authenticate a second user to a second user account associated with the client portal provided by the client portal server (e.g., client portal server 120).

At step 230, client authentication computing platform 110 may load user information associated with the second user account. For example, at step 230, client authentication computing platform 110 may load user information associated with the second user account that includes information identifying registered devices for the second user account, which may include and/or be generated based on device registration information previously received and/or stored by client authentication computing platform 110 for the second user account. In addition, client authentication computing platform 110 may load user information associated with the second user account that includes information identifying user preferences for authentication for the second user account, which may include and/or be generated based on authentication preferences information previously received and/or stored by client authentication computing platform 110 for the second user account.

At step 231, client authentication computing platform 110 may evaluate authentication state information associated with the second user account. For example, at step 231, client authentication computing platform 110 may evaluate authentication state information associated with the second user account. As illustrated below, client authentication computing platform 110 may subsequently select a particular authentication technique for authenticating the second user to the second user account based on the evaluation performed at step 231. For instance, if the authentication state information associated with the second user account indicates that the second user account is currently in a relatively high risk state, client authentication computing platform 110 may select a relatively more secure and/or complex authentication pattern for authenticating the second user to the second user account, such as a multi-device authentication technique. Alternatively, if the authentication state information associated with the second user account indicates that the second user account is currently in a relatively low risk state, client authentication computing platform 110 may select a relatively less secure and/or complex authentication pattern for authenticating the second user to the second user account, such as a single-device authentication technique.

In some embodiments, evaluating the authentication state information associated with the second user account comprises evaluating a current time of day. For example, in evaluating the authentication state information associated with the second user account (e.g., at step 231), client authentication computing platform 110 may evaluate a current time of day, as this factor may affect which authentication technique is selected by client authentication computing platform 110 for authenticating the second user to the second user account.

In some embodiments, evaluating the authentication state information associated with the second user account comprises evaluating location information. For example, in evaluating the authentication state information associated with the second user account (e.g., at step 231), client authentication computing platform 110 may evaluate location information, such as location information identifying a current location of the device requesting access to the second user account, the current location of the first device linked to the second user account (e.g., client computing device 170), and/or the current location of the second device linked to the second user account (e.g., client computing device 180), as this factor may affect which authentication technique is selected by client authentication computing platform 110 for authenticating the second user to the second user account.

In some embodiments, evaluating the authentication state information associated with the second user account comprises evaluating authentication history information associated with the second user account. For example, in evaluating the authentication state information associated with the second user account (e.g., at step 231), client authentication computing platform 110 may evaluate authentication history information indicating whether and/or when one or more devices previously were authenticated to the second user account and/or are currently authenticated to the second user account, one or more trends and/or patterns in authentication to the second user account, and/or the like, as this factor may affect which authentication technique is selected by client authentication computing platform 110 for authenticating the second user to the second user account.

At step 232, client authentication computing platform 110 may select an authentication method for authenticating the second user to the second user account. For example, at step 232, client authentication computing platform 110 may select an authentication method for authenticating the second user to the second user account based on the user information associated with the second user account (which may, e.g., have been loaded at step 230 and/or which may, e.g., include user preferences selecting a particular authentication method) and/or based on the evaluation of authentication state information (which may, e.g., have been performed at step 231). In some instances, client authentication computing platform 110 may, for example, select a multi-device authentication technique for authenticating the second user to the second user account based on evaluating the authentication state information associated with the second user account. As illustrated above, such authentication state information may be indicative of a current risk state associated with the second user account. Additionally or alternatively, client authentication computing platform 110 may select such a multi-device authentication technique for authenticating the second user to the second user account and/or another authentication technique based on a risk score for the second user account exceeding (or not exceeding) a predetermined threshold. For instance, if the authentication state information associated with the second user account indicates that the second user account is currently in a relatively high risk state and a corresponding risk score thus exceeds a predetermined threshold, client authentication computing platform 110 may select a relatively more secure and/or complex authentication pattern for authenticating the second user to the second user account, such as a multi-device authentication technique. Alternatively, if the authentication state information associated with the second user account indicates that the second user account is currently in a relatively low risk state and a corresponding risk score thus does not exceed a predetermined threshold, client authentication computing platform 110 may select a relatively less secure and/or complex authentication pattern for authenticating the second user to the second user account, such as a single-device authentication technique.

Figure 2I:
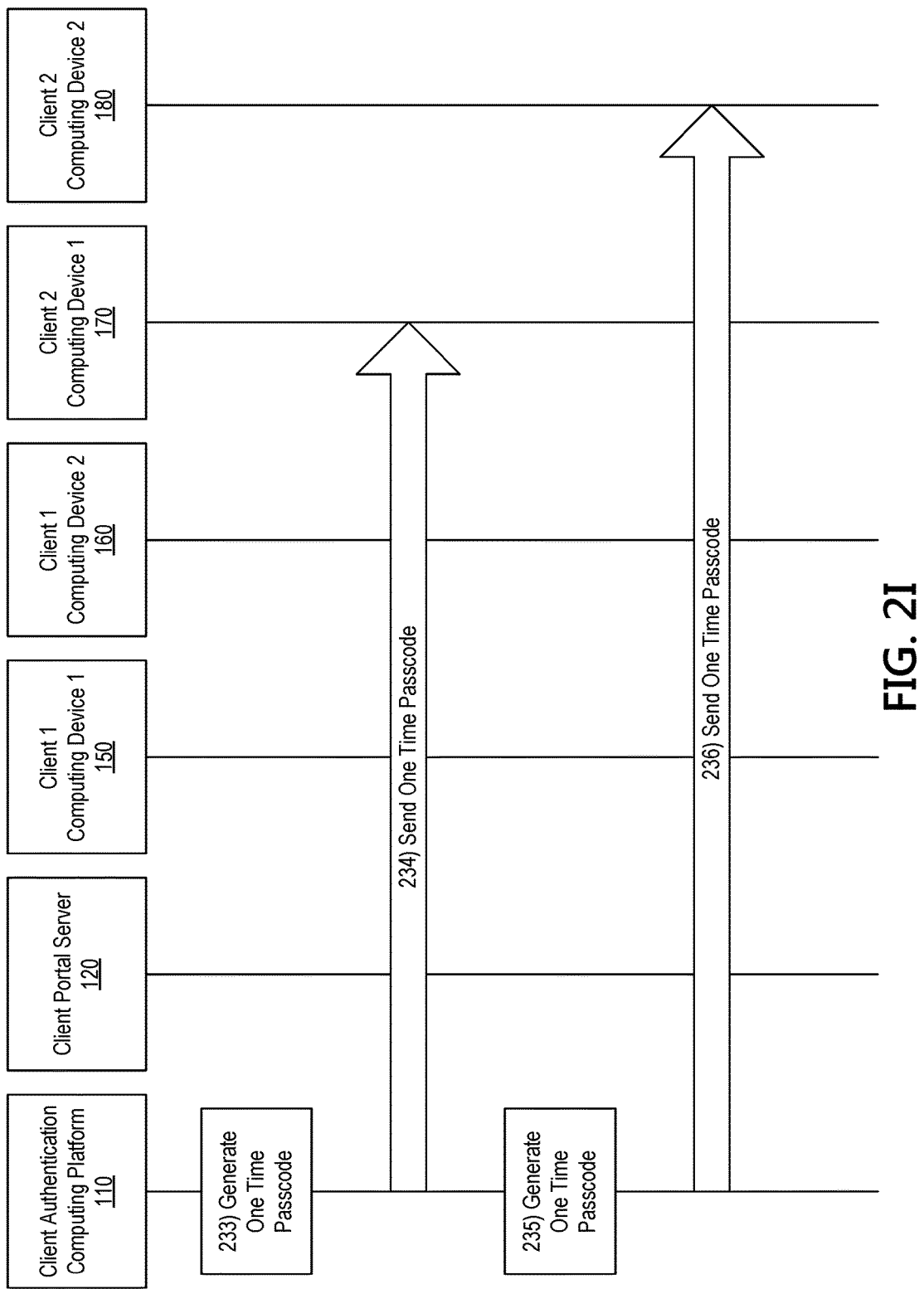

Referring to FIG. 2I, at step 233, client authentication computing platform 110 may generate a third one-time passcode for a third device associated with the second user account. For example, at step 233, based on receiving the request to authenticate the second user to the second user account, client authentication computing platform 110 may generate a third one-time passcode for a third computing device associated with the second user account (e.g., client computing device 170). Client authentication computing platform 110 may, for instance, generate the third one-time passcode for client computing device 170 using a random number generator and/or a random code generation algorithm, based on the authentication method selected by client authentication computing platform 110 at step 232 and/or based on the user information associated with the second user account (which may, e.g., have been loaded by client authentication computing platform 110 at step 230). At step 234, client authentication computing platform 110 may send the third one-time passcode to client computing device 170. For example, at step 234, client authentication computing platform 110 may send, via the communication interface (e.g., communication interface 115), to the third computing device associated with the second user account (e.g., client computing device 170), the third one-time passcode generated for the third computing device associated with the second user account (e.g., client computing device 170).

At step 235, client authentication computing platform 110 may generate a fourth one-time passcode for a fourth device associated with the second user account. For example, at step 235, based on receiving the request to authenticate the second user to the second user account, client authentication computing platform 110 may generate a fourth one-time passcode for a fourth computing device associated with the second user account (e.g., client computing device 180). Client authentication computing platform 110 may, for instance, generate the fourth one-time passcode for client computing device 180 using a random number generator and/or a random code generation algorithm, based on the authentication method selected by client authentication computing platform 110 at step 232 and/or based on the user information associated with the second user account (which may, e.g., have been loaded by client authentication computing platform 110 at step 230). At step 236, client authentication computing platform 110 may send the fourth one-time passcode to client computing device 180. For example, at step 236, client authentication computing platform 110 may send, via the communication interface (e.g., communication interface 115), to the fourth computing device associated with the second user account (e.g., client computing device 180), the fourth one-time passcode generated for the fourth computing device associated with the second user account (e.g., client computing device 180).

Figure 2J:
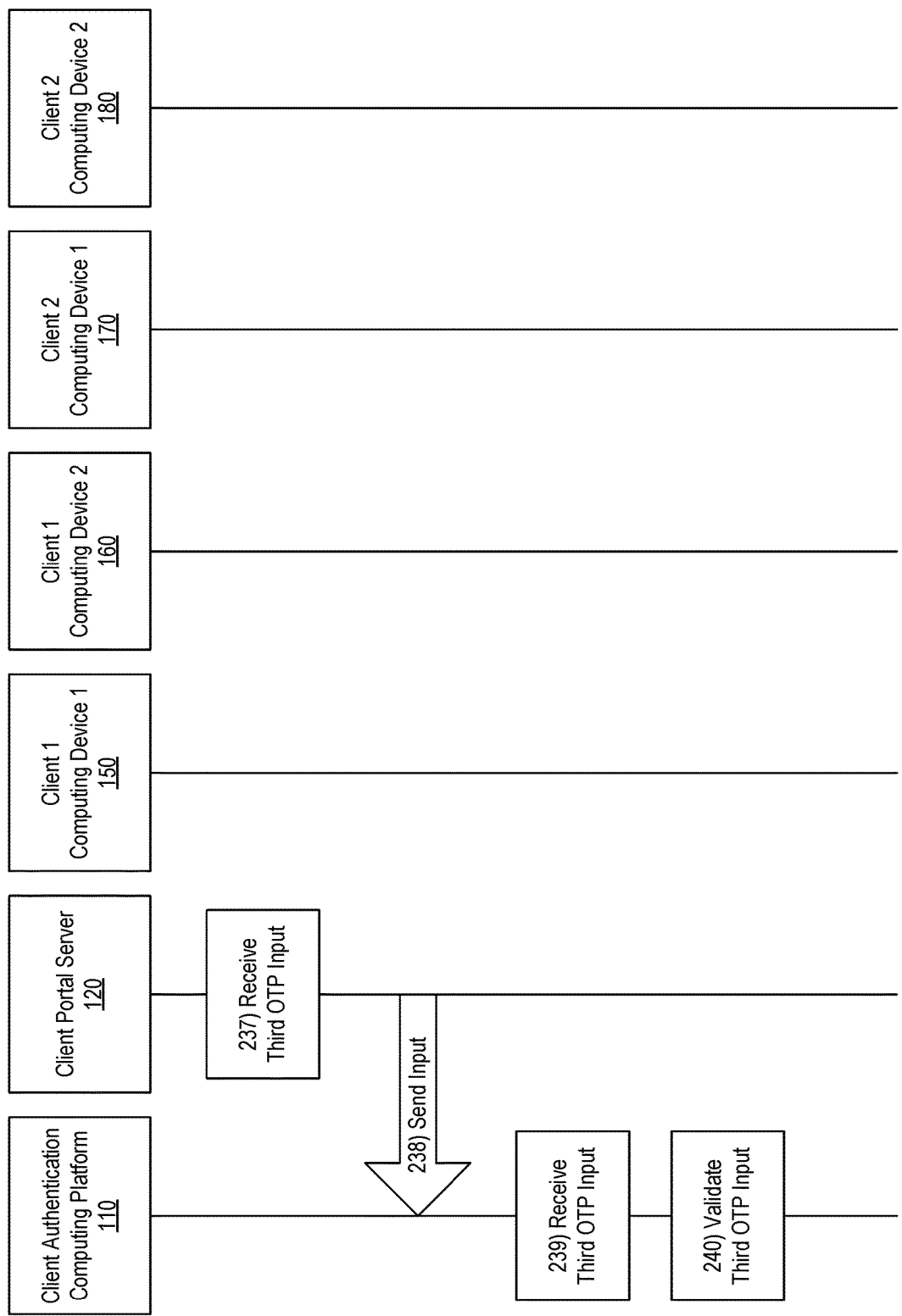

Referring to FIG. 2J, at step 237, client portal server 120 may receive third one-time passcode input. For example, at step 237, client portal server 120 may receive third one-time passcode input from the user of client portal server 120 who is requesting access to the second user account. Such third one-time passcode input may, for example, include the third one-time passcode sent by client authentication computing platform 110 to client computing device 170. At step 238, client portal server 120 may send the third one-time passcode input to client authentication computing platform 110 for validation.

At step 239, client authentication computing platform 110 may receive the third one-time passcode input from client portal server 120. For example, at step 239, client authentication computing platform 110 may receive, via the communication interface (e.g., communication interface 115), from the client portal server (e.g., client portal server 120), third one-time passcode input. At step 240, client authentication computing platform 110 may validate the third one-time passcode input received from client portal server 120. For example, at step 240, client authentication computing platform 110 may validate the third one-time passcode input based on the third one-time passcode generated for the third computing device associated with the second user account (e.g., client computing device 170). In validating the third one-time passcode input based on the third one-time passcode generated for the third computing device associated with the second user account (e.g., client computing device 170), client authentication computing platform 110 may, for example, compare the third one-time passcode input to the third one-time passcode generated for the third computing device associated with the second user account (e.g., client computing device 170) to confirm that the third one-time passcode input matches the third one-time passcode generated for the third computing device associated with the second user account (e.g., client computing device 170) and is therefore valid. If client authentication computing platform 110 determines that the third one-time passcode input does not match the third one-time passcode generated for the third computing device associated with the second user account (e.g., client computing device 170) and is therefore not valid, client authentication computing platform 110 may generate and/or send one or more error messages to client portal server 120 and/or one or more other devices. Such error messages may, for instance, prompt the user of client portal server 120 requesting access to the second user account to try entering the one-time passcode again, and if the user again provides invalid one-time passcode input, client authentication computing platform 110 may deny access to the second user account and/or the event sequence may end.

Figure 2K:
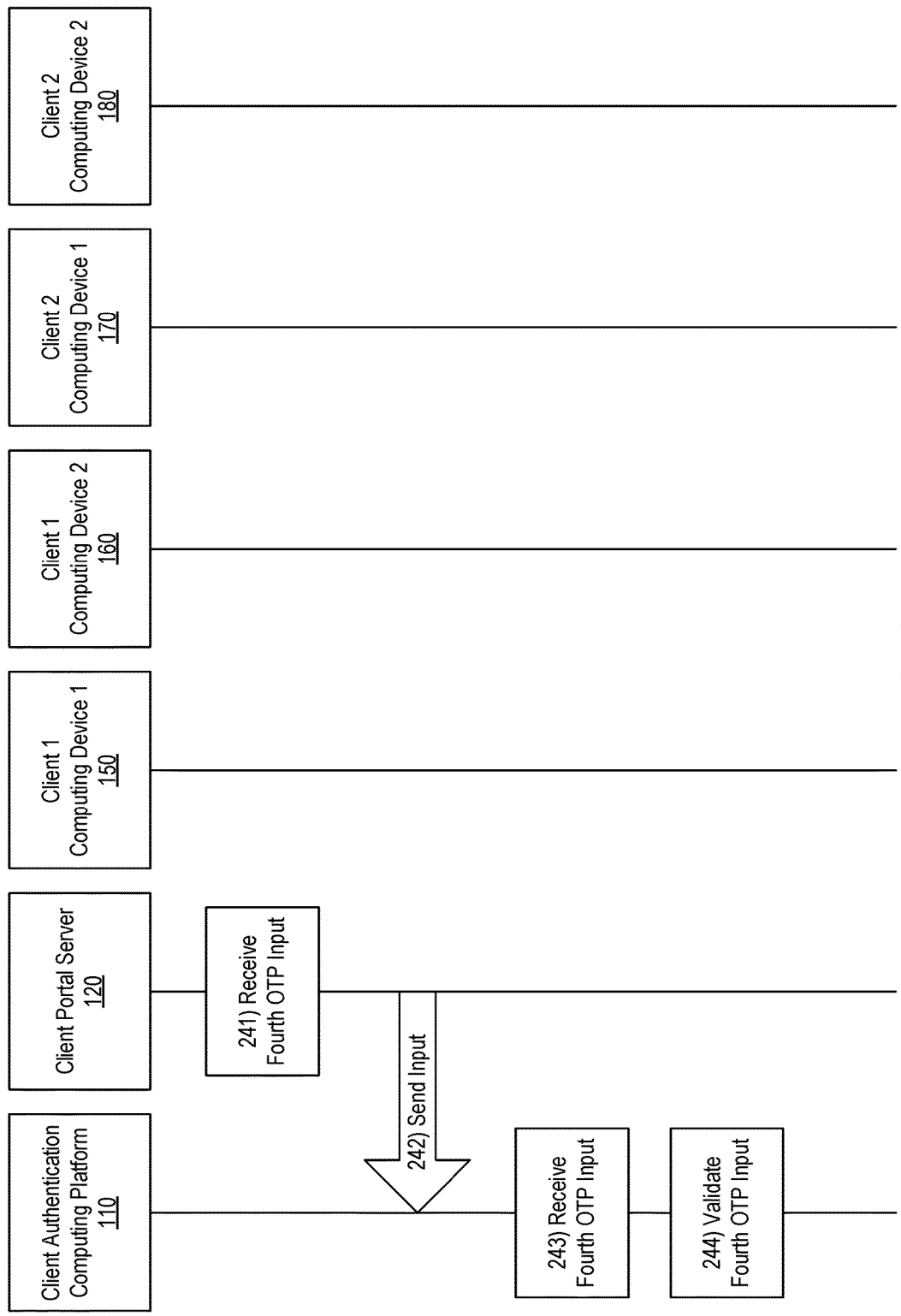

Referring to FIG. 2K, at step 241, client portal server 120 may receive fourth one-time passcode input. For example, client portal server 120 may receive fourth one-time passcode input from the user of client portal server 120 who is requesting access to the second user account. Such fourth one-time passcode input may, for example, include the fourth one-time passcode sent by client authentication computing platform 110 to client computing device 180. At step 242, client portal server 120 may send the fourth one-time passcode input to client authentication computing platform 110 for validation.

At step 243, client authentication computing platform 110 may receive the fourth one-time passcode input from client portal server 120. For example, at step 243, client authentication computing platform 110 may receive, via the communication interface (e.g., communication interface 115), from the client portal server (e.g., client portal server 120), fourth one-time passcode input. At step 244, client authentication computing platform 110 may validate the fourth one-time passcode input received from client portal server 120. For example, at step 244, client authentication computing platform 110 may validate the fourth one-time passcode input based on the fourth one-time passcode generated for the fourth computing device associated with the second user account (e.g., client computing device 180). In validating the fourth one-time passcode input based on the fourth one-time passcode generated for the fourth computing device associated with the second user account (e.g., client computing device 180), client authentication computing platform 110 may, for example, compare the fourth one-time passcode input to the fourth one-time passcode generated for the fourth computing device associated with the second user account (e.g., client computing device 180) to confirm that the fourth one-time passcode input matches the fourth one-time passcode generated for the fourth computing device associated with the second user account (e.g., client computing device 180) and is therefore valid. If client authentication computing platform 110 determines that the fourth one-time passcode input does not match the fourth one-time passcode generated for the fourth computing device associated with the second user account (e.g., client computing device 180) and is therefore not valid, client authentication computing platform 110 may generate and/or send one or more error messages to client portal server 120 and/or one or more other devices. Such error messages may, for instance, prompt the user of client portal server 120 requesting access to the second user account to try entering the one-time passcode again, and if the user again provides invalid one-time passcode input, client authentication computing platform 110 may deny access to the second user account and/or the event sequence may end.

Figure 2L:
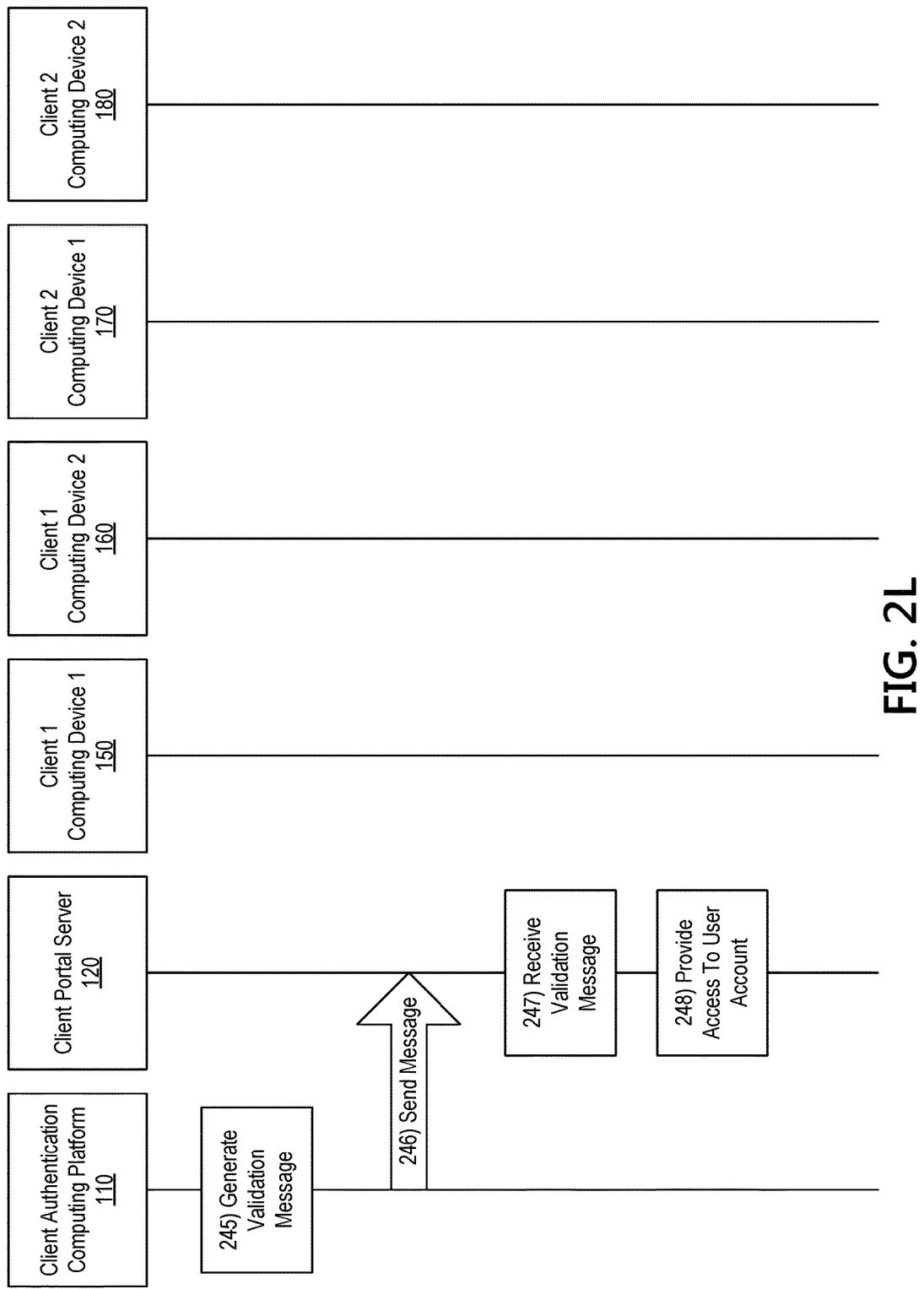

Referring to FIG. 2L, at step 245, client authentication computing platform 110 may generate a second validation message. For example, at step 245, based on validating the third one-time passcode input and the fourth one-time passcode input, client authentication computing platform 110 may generate a second validation message directing the client portal server (e.g., client portal server 120) to provide the second user with access to the second user account. In some instances, in generating the second validation message directing the client portal server (e.g., client portal server 120) to provide the second user with access to the second user account, client authentication computing platform 110 may embed and/or otherwise include one or more tokens, certificates, and/or keys in the second validation message, and such tokens, certificates, and/or keys may be configured to enable and/or cause client portal server 120 to load and/or obtain user account information associated with the second user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the second validation message that enable and/or cause client portal server 120 to request, obtain, receive, and/or load financial account information associated with the second user account from one or more financial account management servers, so that client portal server 120 may subsequently present such financial account information via the client portal.

At step 246, client authentication computing platform 110 may send the second validation message to client portal server 120. For example, at step 246, client authentication computing platform 110 may send, via the communication interface (e.g., communication interface 115), to the client portal server (e.g., client portal server 120), the second validation message directing the client portal server (e.g., client portal server 120) to provide the second user with access to the second user account.

At step 247, client portal server 120 may receive the second validation message from client authentication computing platform 110. At step 248, client portal server 120 may provide the second user with access to the second user account based on the second validation message. For example, in providing the second user with access to the second user account based on the second validation message, client portal server 120 may present one or more graphical user interfaces which may form and/or otherwise be associated with a client portal provided by client portal server 120, such as an online banking portal and/or a mobile banking portal. For instance, client portal server 120 may present a graphical user interface that may include information indicating that authentication input, such as the one-time passcode input, has been validated and that access to the second user account will be provided. Additionally or alternatively, client portal server 120 may present other graphical user interfaces that include information associated with the second user account and/or one or more controls that enable a user to access, view, and/or modify such information. In some instances, in providing the second user with access to the second user account based on the second validation message, client portal server 120 may present one or more online banking user interfaces and/or mobile banking user interfaces via which a user can view account information, such as account balance information and transaction history information, request and/or execute one or more transactions (e.g., funds transfer transactions, online bill pay transactions, and/or other transactions), and/or perform other functions.

FIGS. 3A-3K depict another illustrative event sequence for preventing unauthorized access to secured information systems using multi-device authentication techniques in accordance with one or more example embodiments. As illustrated in greater detail below, the event sequence shown in FIGS. 3A-3K illustrates, among other things, additional and/or alternative examples of how a computing platform, such as client authentication computing platform 110, may authenticate a user of a computing device to a user account associated with a client portal using multi-device authentication techniques. For instance, in some of the examples discussed below, client authentication computing platform 110 may send a one-time passcode to a first device and a different type of authentication prompt to a second device when authenticating a user to a user account associated with a client portal.

Figure 3A:
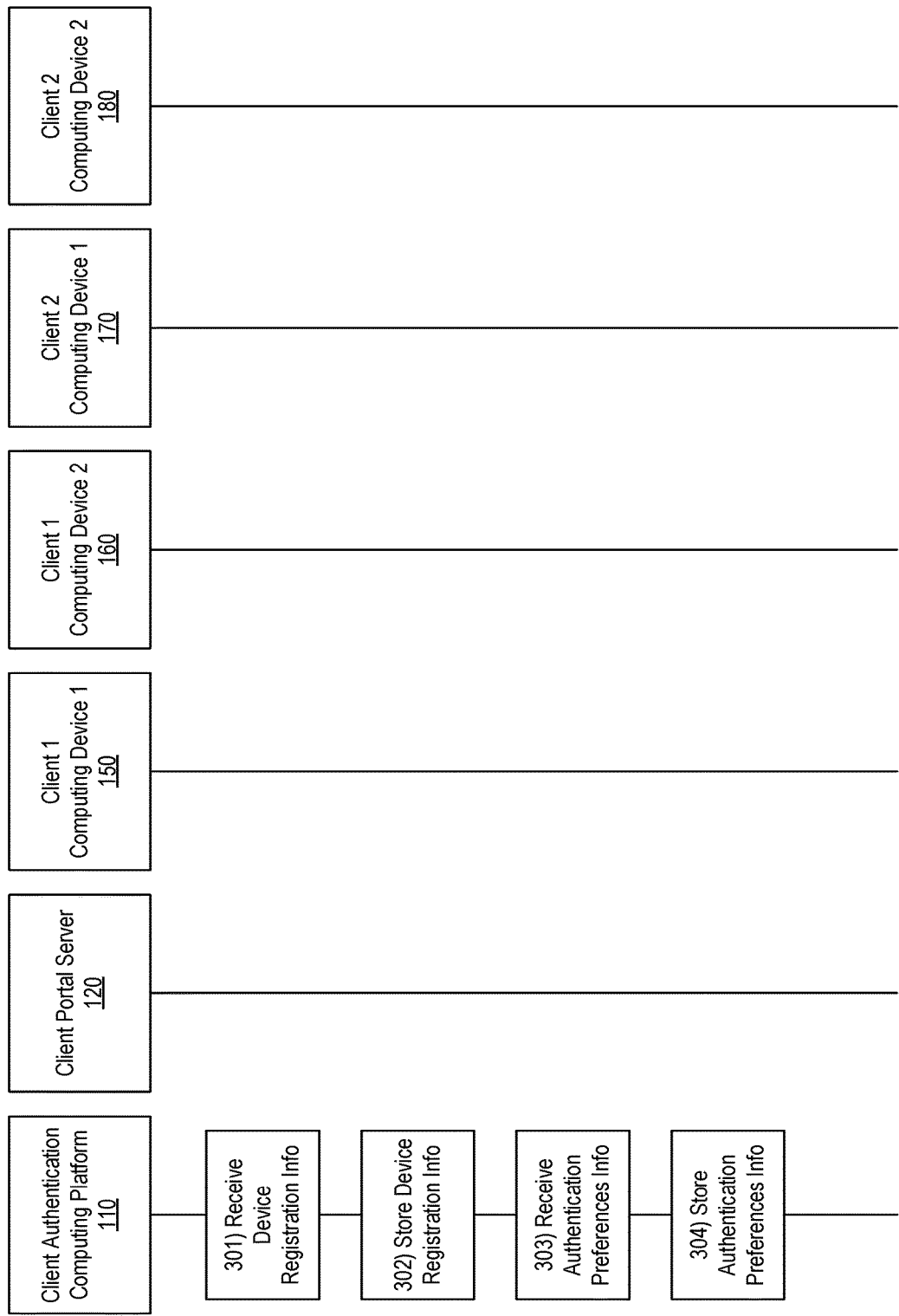

Referring to FIG. 3A, at step 301, client authentication computing platform 110 may receive device registration information. For example, at step 301, client authentication computing platform 110 may receive device registration information from client portal server 120 and/or one or more client devices, such as client computing device 150, client computing device 160, client computing device 170, and client computing device 180. Client authentication computing platform 110 may receive such device registration information, for instance, as various client devices and/or users of such client devices register the client devices to receive one-time passcodes, biometric authentication prompts, token authentication prompts, and/or the like when authenticating to access a client portal and/or website provided by client portal server 120. In some instances, such device registration information may, for example, include a unique identifier associated with a particular client device being registered (such as client computing device 150, client computing device 160, client computing device 170, and client computing device 180, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 302, client authentication computing platform 110 may store the device registration information. For example, at step 302, client authentication computing platform 110 may store the device registration information received at step 301 in a database, such as client authentication database 114. In some instances, prior to receiving a request to authenticate a first user to a first user account, client authentication computing platform 110 may store first device registration information linking a first computing device and a second computing device to the first user account. For example, at step 302, client authentication computing platform 110 may store first device registration information linking a first computing device (e.g., client computing device 150) and a second computing device (e.g., client computing device 160) to the first user account. Additionally, prior to receiving a request to authenticate a second user to a second user account, client authentication computing platform 110 may store second device registration information linking a third computing device and a fourth computing device to the second user account. For example, at step 302, client authentication computing platform 110 may store second device registration information linking a third computing device (e.g., client computing device 170) and a fourth computing device (e.g., client computing device 180) to the second user account.

At step 303, client authentication computing platform 110 may receive authentication preferences information. For example, at step 303, client authentication computing platform 110 may receive authentication preferences information from client portal server 120 and/or one or more client devices, such as client computing device 150, client computing device 160, client computing device 170, and client computing device 180. Client authentication computing platform 110 may receive such authentication preferences information, for instance, as various client devices and/or users of such client devices define and/or modify one or more settings for authenticating to access a client portal and/or website provided by client portal server 120. In some instances, such authentication preferences information may, for example, include settings defining whether one or more passwords are used when authenticating a particular client device (such as client computing device 150, client computing device 160, client computing device 170, and client computing device 180, for instance), settings defining whether one or more security questions are used when authenticating the particular client device, settings defining whether one or more one-time passcodes are used when authenticating the particular client device, settings defining whether one or more biometric authentication prompts are used when authenticating the particular client device, settings defining whether one or more other prompts are used when authenticating the particular client device, and/or other settings.

In some instances, prior to receiving a request to authenticate the first user to the first user account, client authentication computing platform 110 may receive, via the communication interface (e.g., communication interface 115), from the client portal server (e.g., client portal server 120), first authentication preferences information for the first user account. In some embodiments, the first authentication preferences information for the first user account comprises selection information directing the computing platform to use a multi-device authentication technique when processing authentication requests for the first user account. For example, the first authentication preferences information for the first user account (which may, e.g., be received by client authentication computing platform 110 at step 303) may include selection information directing client authentication computing platform 110 to use a multi-device authentication technique when processing authentication requests for the first user account. Such a multi-device authentication technique may, for instance, include, direct, and/or cause client authentication computing platform 110 to send a one-time passcode to a first client device linked to the first user account (e.g., client computing device 150) and send a registered-device authentication prompt to a second client device linked to the first user account (e.g., client computing device 160) when authenticating a user to the first user account. In addition, the multi-device authentication technique may, for example, be selected instead of one or more other authentication patterns, such as a single-device authentication pattern, a single one-time passcode authentication pattern, and/or one or more other types of authentication patterns (e.g., based on prompting a user to provide a username, password, one or more biometrics, one or more security question responses, and/or the like).

In some instances, prior to receiving a request to authenticate the second user to the second user account, client authentication computing platform 110 may receive, via the communication interface (e.g., communication interface 115), from the client portal server (e.g., client portal server 120), second authentication preferences information for the second user account. In some embodiments, the second authentication preferences information for the second user account comprises selection information directing the computing platform to use a multi-device authentication technique when processing authentication requests for the second user account. For example, the second authentication preferences information for the second user account (which may, e.g., be received by client authentication computing platform 110 at step 303) may include selection information directing client authentication computing platform 110 to use a multi-device authentication technique when processing authentication requests for the second user account. Such a multi-device authentication technique may, for instance, include, direct, and/or cause client authentication computing platform 110 to send a one-time passcode to a first client device linked to the second user account (e.g., client computing device 170) and send a registered-device authentication prompt to a second client device linked to the second user account (e.g., client computing device 180) when authenticating a user to the second user account. In addition, the multi-device authentication technique may, for example, be selected instead of one or more other authentication patterns, such as a single-device authentication pattern, a single one-time passcode authentication pattern, and/or one or more other types of authentication patterns (e.g., based on prompting a user to provide a username, password, one or more biometrics, one or more security question responses, and/or the like).

At step 304, client authentication computing platform 110 may store the authentication preferences information. For example, at step 304, client authentication computing platform 110 may store the authentication preferences information received at step 303 in a database, such as client authentication database 114. For instance, at step 304, client authentication computing platform 110 may store the first authentication preferences information for the first user account received from the client portal server (e.g., client portal server 120). In addition, client authentication computing platform 110 may, for instance, store the second authentication preferences information for the second user account received from the client portal server (e.g., client portal server 120).

Figure 3B:
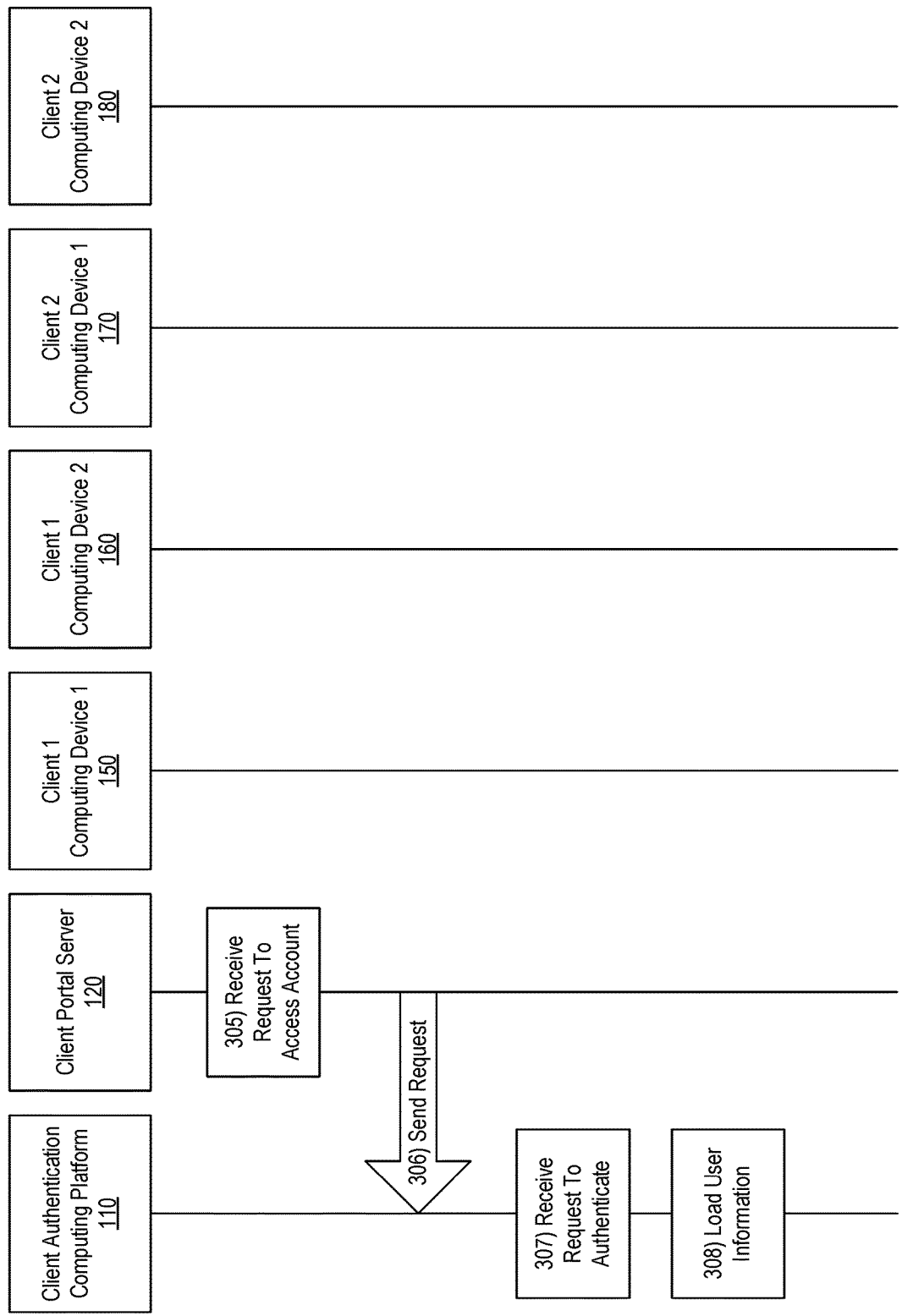

Referring to FIG. 3B, at step 305, client portal server 120 may receive a request to access a first user account from a first user of a portal provided by client portal server 120. For example, at step 305, client portal server 120 may receive such a request from client computing device 150, client computing device 160, or another computing device and/or a user of such a device, in connection with a request by the user of the device to access, view, and/or modify information associated with the first user account via a client portal and/or one or more client portal interfaces provided by client portal server 120. At step 306, client portal server 120 may send to client authentication computing platform 110 a request to authenticate the first user to the first user account (e.g., in response to and/or otherwise based on receiving the request at step 305).

At step 307, client authentication computing platform 110 may receive the request to authenticate the first user to the first user account from client portal server 120. For example, at step 307, client authentication computing platform 110 may receive, via the communication interface (e.g., communication interface 115), and from a client portal server (e.g., client portal server 120), a request to authenticate a first user to a first user account associated with a client portal provided by the client portal server (e.g., client portal server 120).

At step 308, client authentication computing platform 110 may load user information associated with the first user account. For example, at step 308, client authentication computing platform 110 may load user information associated with the first user account that includes information identifying registered devices for the first user account, which may include and/or be generated based on device registration information previously received and/or stored by client authentication computing platform 110 for the first user account. In addition, client authentication computing platform 110 may load user information associated with the first user account that includes information identifying user preferences for authentication for the first user account, which may include and/or be generated based on authentication preferences information previously received and/or stored by client authentication computing platform 110 for the first user account.

Figure 3C:
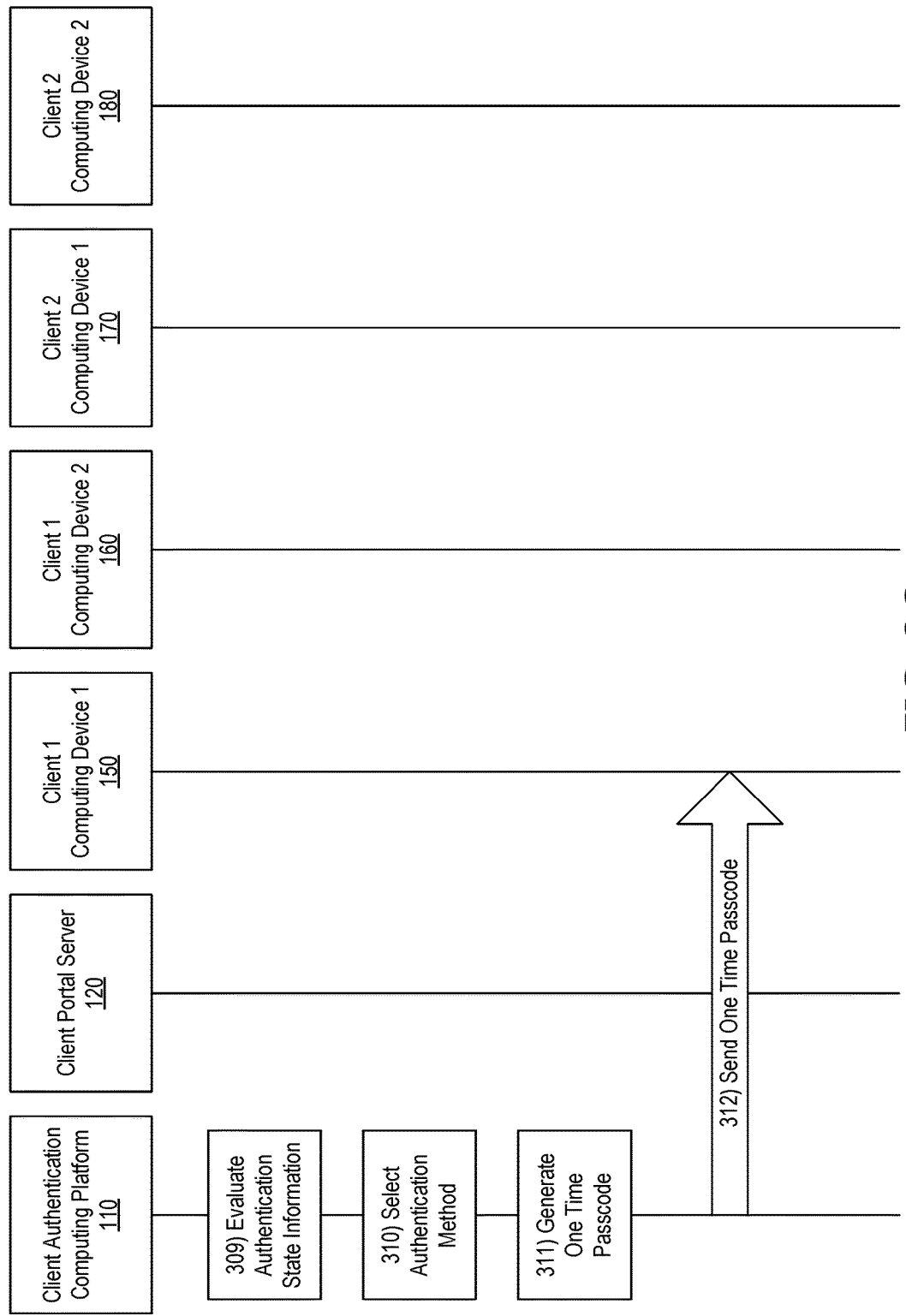

Referring to FIG. 3C, at step 309, client authentication computing platform 110 may evaluate authentication state information associated with the first user account. For example, at step 309, client authentication computing platform 110 may evaluate authentication state information associated with the first user account. As illustrated below, client authentication computing platform 110 may subsequently select a particular authentication technique for authenticating the first user to the first user account based on the evaluation performed at step 309. For instance, if the authentication state information associated with the first user account indicates that the first user account is currently in a relatively high risk state, client authentication computing platform 110 may select a relatively more secure and/or complex authentication pattern for authenticating the first user to the first user account, such as a multi-device authentication technique. Alternatively, if the authentication state information associated with the first user account indicates that the first user account is currently in a relatively low risk state, client authentication computing platform 110 may select a relatively less secure and/or complex authentication pattern for authenticating the first user to the first user account, such as a single-device authentication technique.

In some embodiments, evaluating the authentication state information associated with the first user account comprises evaluating a current time of day. For example, in evaluating the authentication state information associated with the first user account (e.g., at step 309), client authentication computing platform 110 may evaluate a current time of day, as this factor may affect which authentication technique is selected by client authentication computing platform 110 for authenticating the first user to the first user account.

In some embodiments, evaluating the authentication state information associated with the first user account comprises evaluating location information. For example, in evaluating the authentication state information associated with the first user account (e.g., at step 309), client authentication computing platform 110 may evaluate location information, such as location information identifying a current location of the device requesting access to the first user account, the current location of the first device linked to the first user account (e.g., client computing device 150), and/or the current location of the second device linked to the first user account (e.g., client computing device 160), as this factor may affect which authentication technique is selected by client authentication computing platform 110 for authenticating the first user to the first user account.

In some embodiments, evaluating the authentication state information associated with the first user account comprises evaluating authentication history information associated with the first user account. For example, in evaluating the authentication state information associated with the first user account (e.g., at step 309), client authentication computing platform 110 may evaluate authentication history information indicating whether and/or when one or more devices previously were authenticated to the first user account and/or are currently authenticated to the first user account, one or more trends and/or patterns in authentication to the first user account, and/or the like, as this factor may affect which authentication technique is selected by client authentication computing platform 110 for authenticating the first user to the first user account.

At step 310, client authentication computing platform 110 may select an authentication method for authenticating the first user to the first user account. For example, at step 310, client authentication computing platform 110 may select an authentication method for authenticating the first user to the first user account based on the user information associated with the first user account (which may, e.g., have been loaded at step 308 and/or which may, e.g., include user preferences selecting a particular authentication method) and/or based on the evaluation of authentication state information (which may, e.g., have been performed at step 309). In some instances, client authentication computing platform 110 may, for example, select a multi-device authentication technique for authenticating the first user to the first user account based on evaluating the authentication state information associated with the first user account. As illustrated above, such authentication state information may be indicative of a current risk state associated with the first user account. Additionally or alternatively, client authentication computing platform 110 may select such a multi-device authentication technique for authenticating the first user to the first user account and/or another authentication technique based on a risk score for the first user account exceeding (or not exceeding) a predetermined threshold. For instance, if the authentication state information associated with the first user account indicates that the first user account is currently in a relatively high risk state and a corresponding risk score thus exceeds a predetermined threshold, client authentication computing platform 110 may select a relatively more secure and/or complex authentication pattern for authenticating the first user to the first user account, such as a multi-device authentication technique. Alternatively, if the authentication state information associated with the first user account indicates that the first user account is currently in a relatively low risk state and a corresponding risk score thus does not exceed a predetermined threshold, client authentication computing platform 110 may select a relatively less secure and/or complex authentication pattern for authenticating the first user to the first user account, such as a single-device authentication technique.

At step 311, client authentication computing platform 110 may generate a first one-time passcode for a first device associated with the first user account. For example, at step 311, based on receiving the request to authenticate the first user to the first user account, client authentication computing platform 110 may generate a first one-time passcode for a first computing device associated with the first user account (e.g., client computing device 150). Client authentication computing platform 110 may, for instance, generate the first one-time passcode for client computing device 150 using a random number generator and/or a random code generation algorithm, based on the authentication method selected by client authentication computing platform 110 at step 310 and/or based on the user information associated with the first user account (which may, e.g., have been loaded by client authentication computing platform 110 at step 308). At step 312, client authentication computing platform 110 may send the first one-time passcode to client computing device 150. For example, at step 312, client authentication computing platform 110 may send, via the communication interface (e.g., communication interface 115), to the first computing device associated with the first user account (e.g., client computing device 150), the first one-time passcode generated for the first computing device associated with the first user account (e.g., client computing device 150).

Referring to FIG. 3D, at step 313, client authentication computing platform 110 may generate a first registered-device authentication prompt for a second device associated with the first user account. For example, at step 313, based on receiving the request to authenticate the first user to the first user account, client authentication computing platform 110 may generate a first registered-device authentication prompt for a second computing device associated with the first user account (e.g., client computing device 160). In generating the first registered-device authentication prompt for the second computing device associated with the first user account (e.g., client computing device 160), client authentication computing platform 110 may, for instance, create and/or select an authentication prompt from a library of authentication prompt templates (which may, e.g., be stored by client authentication computing platform 110 in client authentication database 114) that may include one or more authentication prompts configured to prompt a recipient and/or user for biometric input for validation (e.g., fingerprint biometric input, voice biometric input, facial biometric input, retinal biometric input, or the like), physical token input (e.g., smart card input, chip card input, or the like), and/or other input for validation (e.g., by the device receiving the particular authentication prompt, such as client computing device 160).

In some embodiments, generating the first registered-device authentication prompt for the second computing device associated with the first user account comprises generating a biometric authentication prompt for the second computing device associated with the first user account. For example, in generating the first registered-device authentication prompt for the second computing device associated with the first user account (e.g., client computing device 160), client authentication computing platform 110 may generate a biometric authentication prompt for the second computing device associated with the first user account (e.g., client computing device 160). Such a biometric authentication prompt may, for instance, prompt a user of the second computing device associated with the first user account (e.g., client computing device 160) to provide fingerprint biometric input, voice biometric input, facial biometric input, retinal biometric input, and/or other biometric input for evaluation and/or validation by client computing device 160 and/or client authentication computing platform 110.

In some embodiments, generating the first registered-device authentication prompt for the second computing device associated with the first user account comprises generating a physical token authentication prompt for the second computing device associated with the first user account. For example, in generating the first registered-device authentication prompt for the second computing device associated with the first user account (e.g., client computing device 160), client authentication computing platform 110 may generate a physical token authentication prompt for the second computing device associated with the first user account (e.g., client computing device 160). Such a physical token authentication prompt may prompt a user of the second computing device associated with the first user account (e.g., client computing device 160) to connect a physical token (e.g., a smart card, a chip card, or the like) and/or otherwise provide physical token input (e.g., by inserting a smart card or chip card into a reader device) for evaluation and/or validation by client computing device 160 and/or client authentication computing platform 110.

At step 314, client authentication computing platform 110 may send the first registered-device authentication prompt to client computing device 160. For example, at step 314, client authentication computing platform 110 may send, via the communication interface (e.g., communication interface 115), to the second computing device associated with the first user account (e.g., client computing device 160), the first registered-device authentication prompt generated for the second computing device associated with the first user account (e.g., client computing device 160). In some instances, client authentication computing platform 110 may send the first registered-device authentication prompt generated for the second computing device associated with the first user account (e.g., client computing device 160) directly to the second computing device associated with the first user account (e.g., client computing device 160), while in other instances client authentication computing platform 110 may send the first registered-device authentication prompt generated for the second computing device associated with the first user account (e.g., client computing device 160) via one or more other servers and/or devices, such as via a push notification server that provides a push notification service to the second computing device associated with the first user account (e.g., client computing device 160).

Figure 7:
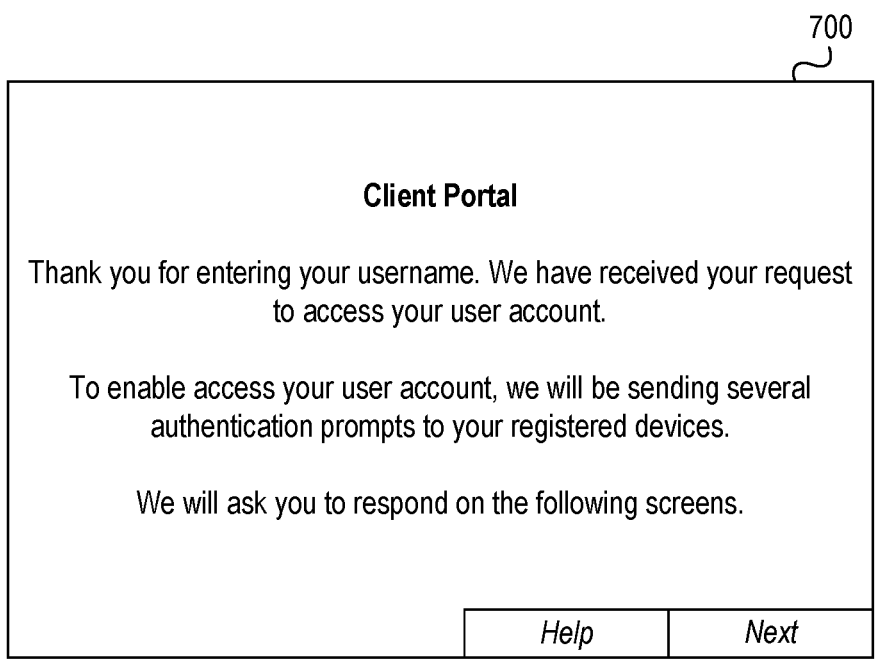
Figure 8:
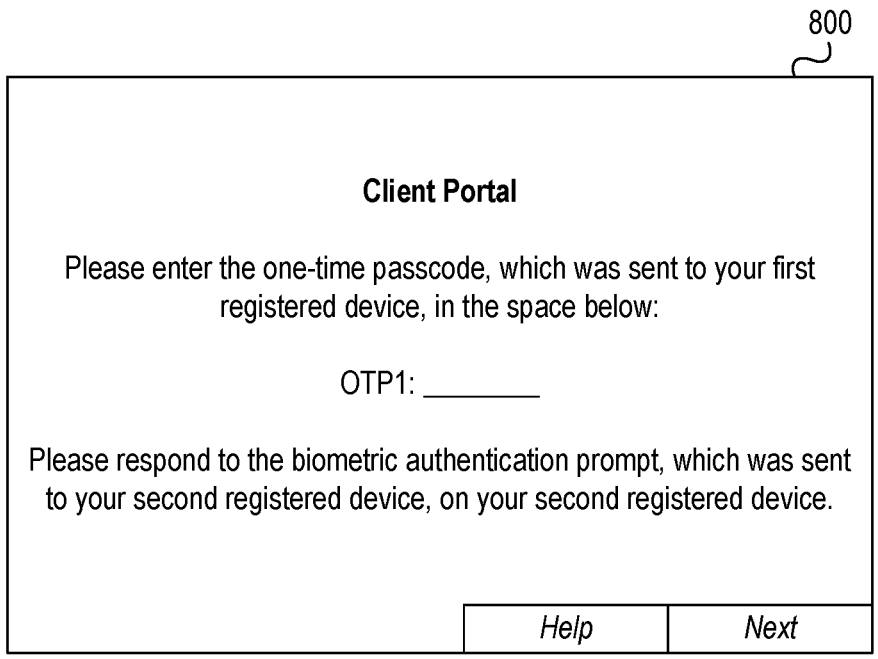

In addition to generating and/or sending the one-time passcodes and/or authentication prompts, client authentication computing platform 110 also may generate and/or send one or more messages to client portal server 120 directing client portal server 120 to present one or more user interfaces that include information indicating the authentication method selected by client authentication computing platform 110 (e.g., the multi-device authentication method) and/or information instructing the user of client portal server 120 how to proceed. For example, client authentication computing platform 110 may generate and/or send one or more messages to client portal server 120 directing client portal server 120 to present a graphical user interface similar to graphical user interface 700, which is illustrated in FIG. 7. As seen in FIG. 7, graphical user interface 700 may include information indicating that a multi-device authentication method is being used by client portal server 120 and/or client authentication computing platform 110 to authenticate the user to the client portal (e.g., "To enable access your user account, we will be sending several authentication prompts to your registered devices"), as well as information instructing the user of client portal server 120 how to proceed (e.g., "We will ask you to respond on the following screens."). Additionally or alternatively, client authentication computing platform 110 may generate and/or send one or more messages to client portal server 120 directing client portal server 120 to present a graphical user interface similar to graphical user interface 800, which is illustrated in FIG. 8. As seen in FIG. 8, graphical user interface 800 may include information prompting the user of client portal server 120 to enter the first one-time passcode generated for the first computing device associated with the first user account (e.g., client computing device 150) and respond to the first registered-device authentication prompt generated for the second computing device associated with the first user account (e.g., client computing device 160). Client portal server 120 may, for instance, receive one-time passcode input via such a user interface, as discussed in greater detail below.

At step 315, client portal server 120 may receive first one-time passcode input. For example, at step 315, client portal server 120 may receive first one-time passcode input from the user of client portal server 120 who is requesting access to the first user account. Such first one-time passcode input may, for example, include the first one-time passcode sent by client authentication computing platform 110 to client computing device 150. At step 316, client portal server 120 may send the first one-time passcode input to client authentication computing platform 110 for validation.

Figure 3E:
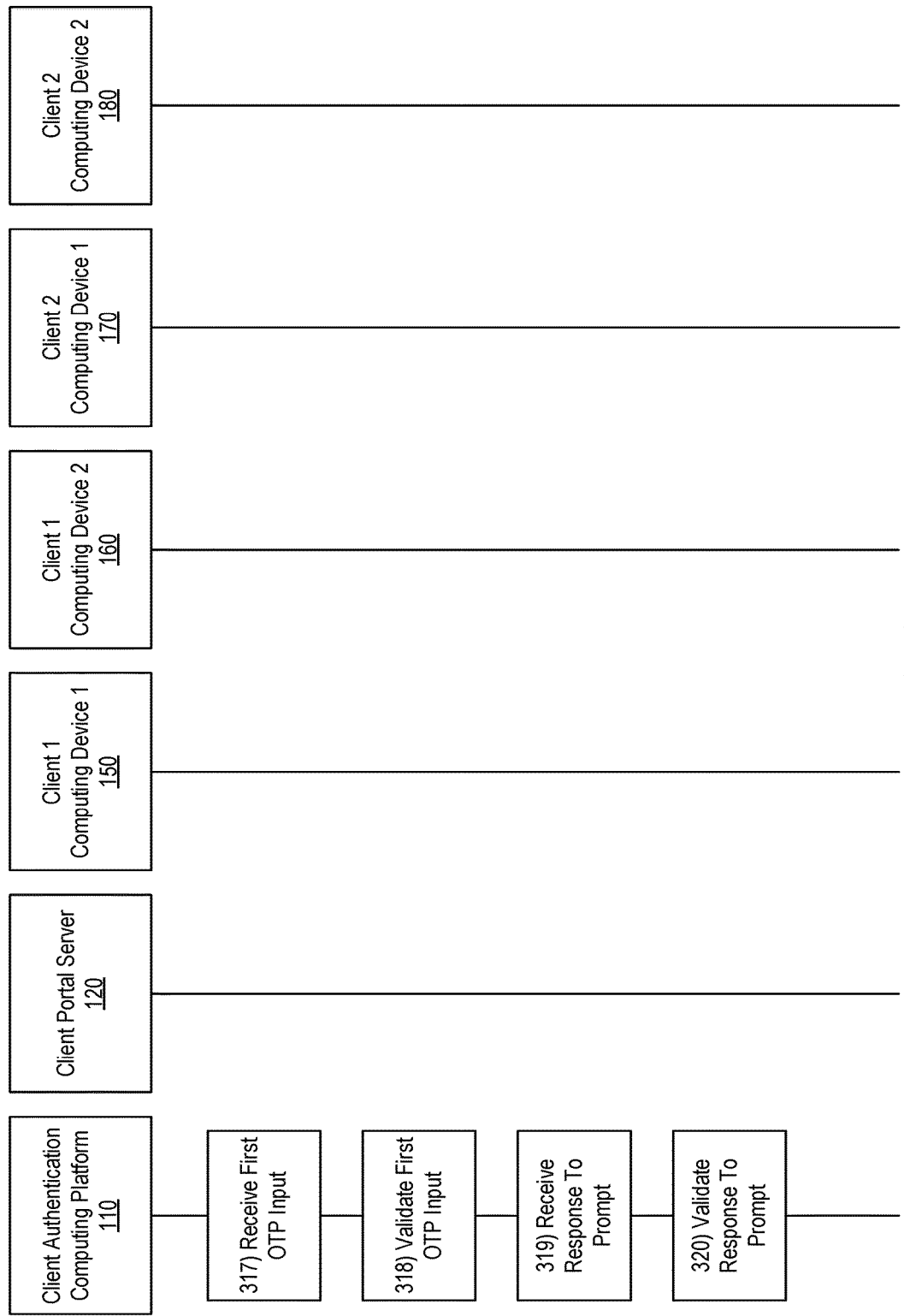

Referring to FIG. 3E, at step 317, client authentication computing platform 110 may receive the first one-time passcode input from client portal server 120. For example, at step 317, client authentication computing platform 110 may receive, via the communication interface (e.g., communication interface 115), from the client portal server (e.g., client portal server 120), first one-time passcode input. At step 318, client authentication computing platform 110 may validate the first one-time passcode input received from client portal server 120. For example, at step 318, client authentication computing platform 110 may validate the first one-time passcode input based on the first one-time passcode generated for the first computing device associated with the first user account (e.g., client computing device 150). In validating the first one-time passcode input based on the first one-time passcode generated for the first computing device associated with the first user account (e.g., client computing device 150), client authentication computing platform 110 may, for example, compare the first one-time passcode input to the first one-time passcode generated for the first computing device associated with the first user account (e.g., client computing device 150) to confirm that the first one-time passcode input matches the first one-time passcode generated for the first computing device associated with the first user account (e.g., client computing device 150) and is therefore valid. If client authentication computing platform 110 determines that the first one-time passcode input does not match the first one-time passcode generated for the first computing device associated with the first user account (e.g., client computing device 150) and is therefore not valid, client authentication computing platform 110 may generate and/or send one or more error messages to client portal server 120 and/or one or more other devices. Such error messages may, for instance, prompt the user of client portal server 120 requesting access to the first user account to try entering the one-time passcode again, and if the user again provides invalid one-time passcode input, client authentication computing platform 110 may deny access to the first user account and/or the event sequence may end.

At step 319, client authentication computing platform 110 may receive a first response to the first registered-device authentication prompt. For example, at step 319, client authentication computing platform 110 may receive, via the communication interface (e.g., communication interface 115), a first response to the first registered-device authentication prompt (e.g., from client computing device 160). The first response to the first registered-device authentication prompt (which may, e.g., be received by client authentication computing platform 110 from client computing device 160) may include information indicating that biometric input received by the second computing device associated with the first user account (e.g., client computing device 160) in response to the first registered-device authentication prompt generated for the second computing device associated with the first user account (e.g., client computing device 160) was received, confirmed, and/or validated by the second computing device associated with the first user account (e.g., client computing device 160). Additionally or alternatively, the first response to the first registered-device authentication prompt (which may, e.g., be received by client authentication computing platform 110 from client computing device 160) may include information indicating that physical token input received by the second computing device associated with the first user account (e.g., client computing device 160) in response to the first registered-device authentication prompt generated for the second computing device associated with the first user account (e.g., client computing device 160) was received, confirmed, and/or validated by the second computing device associated with the first user account (e.g., client computing device 160). Additionally or alternatively, the first response to the first registered-device authentication prompt (which may, e.g., be received by client authentication computing platform 110 from client computing device 160) may include actual biometric input received by the second computing device associated with the first user account (e.g., client computing device 160) in response to the first registered-device authentication prompt generated for the second computing device associated with the first user account (e.g., client computing device 160). Additionally or alternatively, the first response to the first registered-device authentication prompt (which may, e.g., be received by client authentication computing platform 110 from client computing device 160) may include actual physical token input received by the second computing device associated with the first user account (e.g., client computing device 160) in response to the first registered-device authentication prompt generated for the second computing device associated with the first user account (e.g., client computing device 160).

At step 320, client authentication computing platform 110 may validate the first response to the first registered-device authentication prompt. For example, at step 320, client authentication computing platform 110 may validate the first response to the first registered-device authentication prompt received from client computing device 160. In validating the first response to the first registered-device authentication prompt received from client computing device 160, client authentication computing platform 110 may, for example, determine and/or confirm that client computing device 160 provided information indicating that valid biometric input was received by client computing device 160 (e.g., from the user of client computing device 160, in response to the first registered-device authentication prompt) and determine that the first response to the first registered-device authentication prompt received from client computing device 160 is therefore valid. Additionally or alternatively, in validating the first response to the first registered-device authentication prompt received from client computing device 160, client authentication computing platform 110 may, for example, determine and/or confirm that client computing device 160 provided information indicating that valid physical token input was received by client computing device 160 (e.g., from the user of client computing device 160, in response to the first registered-device authentication prompt) and determine that the first response to the first registered-device authentication prompt received from client computing device 160 is therefore valid. Additionally or alternatively, in validating the first response to the first registered-device authentication prompt received from client computing device 160, client authentication computing platform 110 may, for example, determine and/or confirm that actual biometric input received by client computing device 160 (e.g., from the user of client computing device 160, in response to the first registered-device authentication prompt) matches one or more authorized biometrics associated with the first user account and/or maintained by client authentication computing platform 110 and determine that the first response to the first registered-device authentication prompt received from client computing device 160 is therefore valid. Additionally or alternatively, in validating the first response to the first registered-device authentication prompt received from client computing device 160, client authentication computing platform 110 may, for example, determine and/or confirm that actual physical token input received by client computing device 160 (e.g., from the user of client computing device 160, in response to the first registered-device authentication prompt) matches one or more authorized tokens associated with the first user account and/or maintained by client authentication computing platform 110 and determine that the first response to the first registered-device authentication prompt received from client computing device 160 is therefore valid. If client authentication computing platform 110 determines that the first response to the first registered-device authentication prompt received from client computing device 160 is not valid, client authentication computing platform 110 may generate and/or send one or more error messages to client portal server 120, client computing device 160, and/or one or more other devices. Such error messages may, for instance, prompt the user of client portal server 120, client computing device 160, and/or the one or more other devices to try responding to the first registered-device authentication prompt again, and if an invalid response is again received by client authentication computing platform 110, client authentication computing platform 110 may deny access to the first user account and/or the event sequence may end.

Figure 3F:
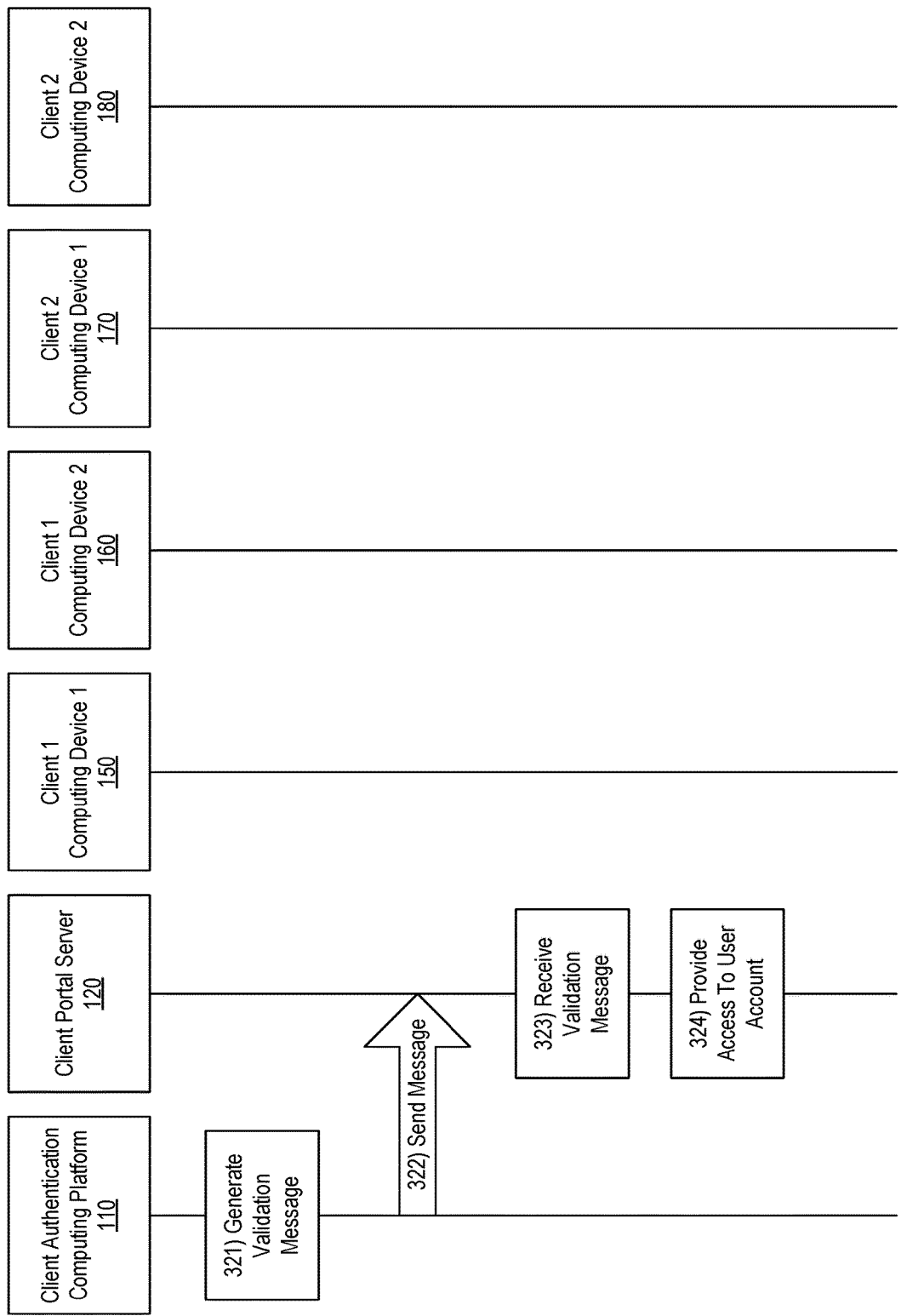

Referring to FIG. 3F, at step 321, client authentication computing platform 110 may generate a first validation message. For example, at step 321, based on validating the first one-time passcode input and the first response to the first registered-device authentication prompt, client authentication computing platform 110 may generate a first validation message directing the client portal server (e.g., client portal server 120) to provide the first user with access to the first user account. In some instances, in generating the first validation message directing the client portal server (e.g., client portal server 120) to provide the first user with access to the first user account, client authentication computing platform 110 may embed and/or otherwise include one or more tokens, certificates, and/or keys in the first validation message, and such tokens, certificates, and/or keys may be configured to enable and/or cause client portal server 120 to load and/or obtain user account information associated with the first user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the first validation message that enable and/or cause client portal server 120 to request, obtain, receive, and/or load financial account information associated with the first user account from one or more financial account management servers, so that client portal server 120 may subsequently present such financial account information via the client portal.

At step 322, client authentication computing platform 110 may send the first validation message to client portal server 120. For example, at step 322, client authentication computing platform 110 may send, via the communication interface (e.g., communication interface 115), to the client portal server (e.g., client portal server 120), the first validation message directing the client portal server (e.g., client portal server 120) to provide the first user with access to the first user account.

Figure 9:
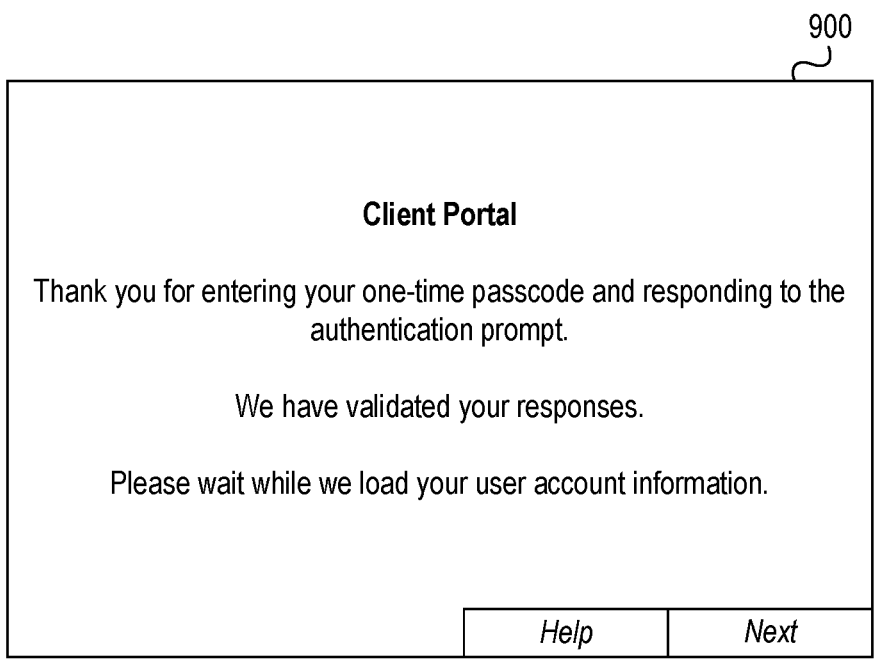

At step 323, client portal server 120 may receive the first validation message from client authentication computing platform 110. At step 324, client portal server 120 may provide the first user with access to the first user account based on the first validation message. For example, in providing the first user with access to the first user account based on the first validation message, client portal server 120 may present one or more graphical user interfaces which may form and/or otherwise be associated with a client portal provided by client portal server 120, such as an online banking portal and/or a mobile banking portal. For instance, client portal server 120 may present a graphical user interface 900, which is illustrated in FIG. 9. As seen in FIG. 9, graphical user interface 900 may include information indicating that authentication input, such as the one-time passcode input and/or the response to the registered-device authentication prompt, has been validated and that access to the first user account will be provided. Additionally or alternatively, client portal server 120 may present other graphical user interfaces that include information associated with the first user account and/or one or more controls that enable a user to access, view, and/or modify such information. In some instances, in providing the first user with access to the first user account based on the first validation message, client portal server 120 may present one or more online banking user interfaces and/or mobile banking user interfaces via which a user can view account information, such as account balance information and transaction history information, request and/or execute one or more transactions (e.g., funds transfer transactions, online bill pay transactions, and/or other transactions), and/or perform other functions.

Subsequently, one or more steps of the event sequence discussed above may be repeated by client authentication computing platform 110 and/or the other systems discussed above in authenticating another user to the client portal provided by client portal server 120. Although such steps are illustrated separately and following the steps performed with respect to authenticating the first user, various steps may be performed in a different order, such that client authentication computing platform 110 may, for instance, authenticate multiple users simultaneously as client portal server 120 receives requests to access different user accounts from different users.

Figure 3G:
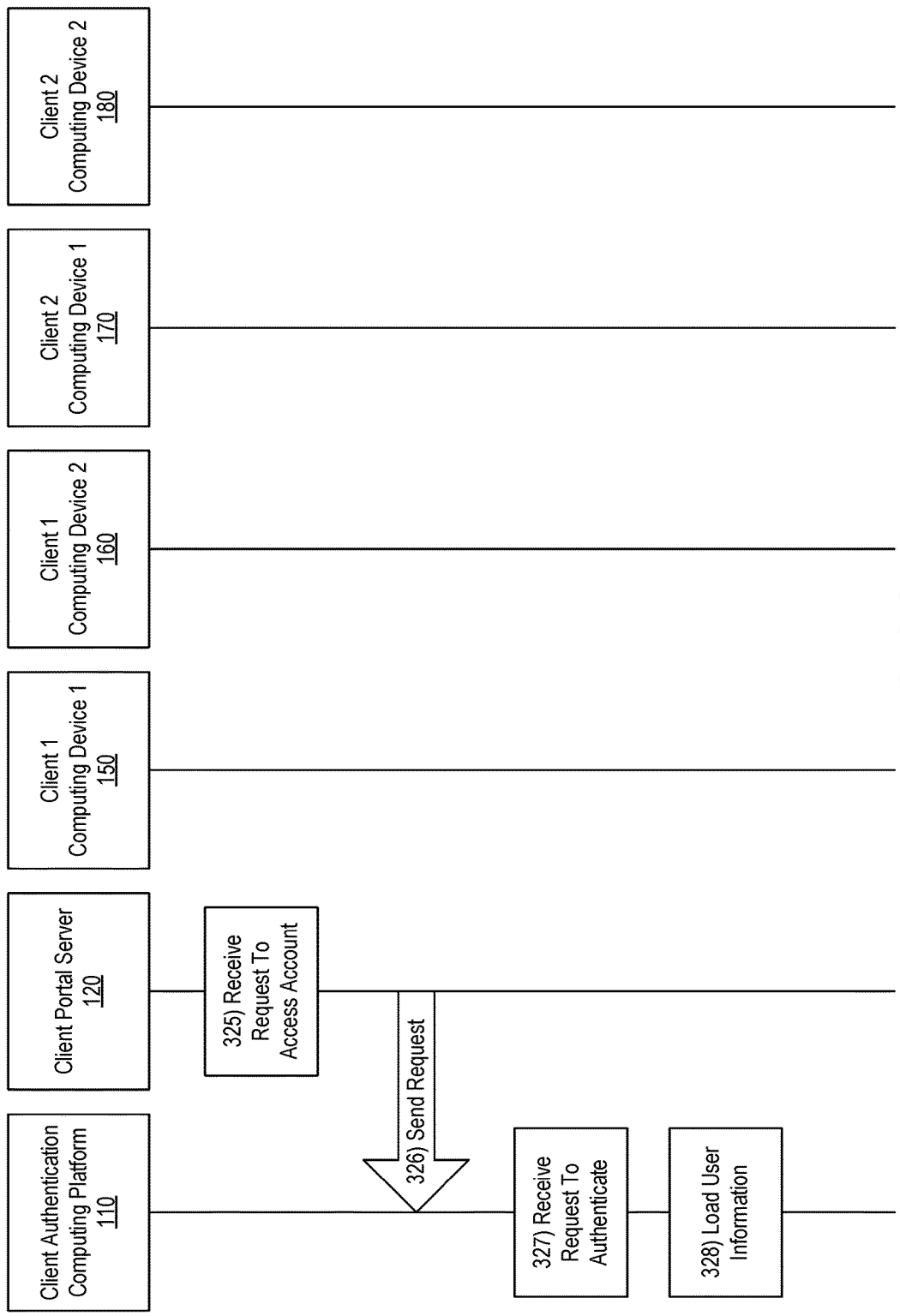

Referring to FIG. 3G, at step 325, client portal server 120 may receive a request to access a second user account from a second user of a portal provided by client portal server 120. For example, at step 325, client portal server 120 may receive such a request from client computing device 170, client computing device 180, or another computing device and/or a user of such a device, in connection with a request by the user of the device to access, view, and/or modify information associated with the second user account via a client portal and/or one or more client portal interfaces provided by client portal server 120. At step 326, client portal server 120 may send to client authentication computing platform 110 a request to authenticate the second user to the second user account (e.g., in response to and/or otherwise based on receiving the request at step 325).

At step 327, client authentication computing platform 110 may receive the request to authenticate the second user to the second user account from client portal server 120. For example, at step 327, client authentication computing platform 110 may receive, via the communication interface (e.g., communication interface 115), and from the client portal server (e.g., client portal server 120), a request to authenticate a second user to a second user account associated with the client portal provided by the client portal server (e.g., client portal server 120).

At step 328, client authentication computing platform 110 may load user information associated with the second user account. For example, at step 328, client authentication computing platform 110 may load user information associated with the second user account that includes information identifying registered devices for the second user account, which may include and/or be generated based on device registration information previously received and/or stored by client authentication computing platform 110 for the second user account. In addition, client authentication computing platform 110 may load user information associated with the second user account that includes information identifying user preferences for authentication for the second user account, which may include and/or be generated based on authentication preferences information previously received and/or stored by client authentication computing platform 110 for the second user account.

Figure 3H:
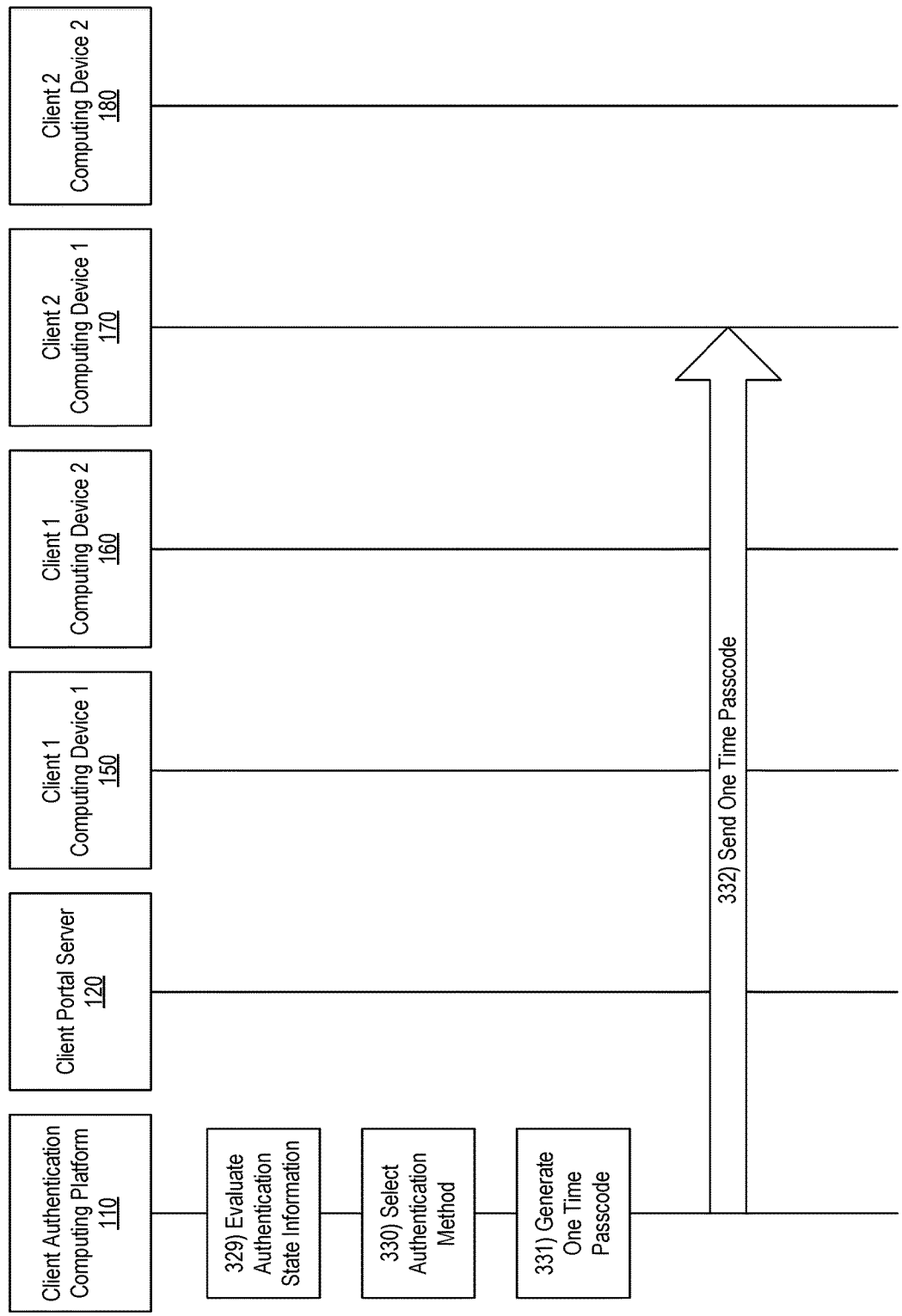

Referring to FIG. 3H, at step 329, client authentication computing platform 110 may evaluate authentication state information associated with the second user account. For example, at step 309, client authentication computing platform 110 may evaluate authentication state information associated with the second user account. As illustrated below, client authentication computing platform 110 may subsequently select a particular authentication technique for authenticating the second user to the second user account based on the evaluation performed at step 329. For instance, if the authentication state information associated with the second user account indicates that the second user account is currently in a relatively high risk state, client authentication computing platform 110 may select a relatively more secure and/or complex authentication pattern for authenticating the second user to the second user account, such as a multi-device authentication technique. Alternatively, if the authentication state information associated with the second user account indicates that the second user account is currently in a relatively low risk state, client authentication computing platform 110 may select a relatively less secure and/or complex authentication pattern for authenticating the second user to the second user account, such as a single-device authentication technique.

In some embodiments, evaluating the authentication state information associated with the second user account comprises evaluating a current time of day. For example, in evaluating the authentication state information associated with the second user account (e.g., at step 329), client authentication computing platform 110 may evaluate a current time of day, as this factor may affect which authentication technique is selected by client authentication computing platform 110 for authenticating the second user to the second user account.

In some embodiments, evaluating the authentication state information associated with the second user account comprises evaluating location information. For example, in evaluating the authentication state information associated with the second user account (e.g., at step 329), client authentication computing platform 110 may evaluate location information, such as location information identifying a current location of the device requesting access to the second user account, the current location of the first device linked to the second user account (e.g., client computing device 170), and/or the current location of the second device linked to the second user account (e.g., client computing device 180), as this factor may affect which authentication technique is selected by client authentication computing platform 110 for authenticating the second user to the second user account.

In some embodiments, evaluating the authentication state information associated with the second user account comprises evaluating authentication history information associated with the second user account. For example, in evaluating the authentication state information associated with the second user account (e.g., at step 329), client authentication computing platform 110 may evaluate authentication history information indicating whether and/or when one or more devices previously were authenticated to the second user account and/or are currently authenticated to the second user account, one or more trends and/or patterns in authentication to the second user account, and/or the like, as this factor may affect which authentication technique is selected by client authentication computing platform 110 for authenticating the second user to the second user account.

At step 330, client authentication computing platform 110 may select an authentication method for authenticating the second user to the second user account. For example, at step 330, client authentication computing platform 110 may select an authentication method for authenticating the second user to the second user account based on the user information associated with the second user account (which may, e.g., have been loaded at step 328 and/or which may, e.g., include user preferences selecting a particular authentication method) and/or based on the evaluation of authentication state information (which may, e.g., have been performed at step 329). In some instances, client authentication computing platform 110 may, for example, select a multi-device authentication technique for authenticating the second user to the second user account based on evaluating the authentication state information associated with the second user account. As illustrated above, such authentication state information may be indicative of a current risk state associated with the second user account. Additionally or alternatively, client authentication computing platform 110 may select such a multi-device authentication technique for authenticating the second user to the second user account and/or another authentication technique based on a risk score for the second user account exceeding (or not exceeding) a predetermined threshold. For instance, if the authentication state information associated with the second user account indicates that the second user account is currently in a relatively high risk state and a corresponding risk score thus exceeds a predetermined threshold, client authentication computing platform 110 may select a relatively more secure and/or complex authentication pattern for authenticating the second user to the second user account, such as a multi-device authentication technique. Alternatively, if the authentication state information associated with the second user account indicates that the second user account is currently in a relatively low risk state and a corresponding risk score thus does not exceed a predetermined threshold, client authentication computing platform 110 may select a relatively less secure and/or complex authentication pattern for authenticating the second user to the second user account, such as a single-device authentication technique.

At step 331, client authentication computing platform 110 may generate a second one-time passcode for a third device associated with the second user account. For example, at step 331, based on receiving the request to authenticate the second user to the second user account, client authentication computing platform 110 may generate a second one-time passcode for a third computing device associated with the second user account (e.g., client computing device 170). Client authentication computing platform 110 may, for instance, generate the second one-time passcode for client computing device 170 using a random number generator and/or a random code generation algorithm, based on the authentication method selected by client authentication computing platform 110 at step 330 and/or based on the user information associated with the second user account (which may, e.g., have been loaded by client authentication computing platform 110 at step 328). At step 332, client authentication computing platform 110 may send the second one-time passcode to client computing device 170. For example, at step 332, client authentication computing platform 110 may send, via the communication interface (e.g., communication interface 115), to the third computing device associated with the second user account (e.g., client computing device 170), the second one-time passcode generated for the third computing device associated with the second user account (e.g., client computing device 170).

Figure 3I:
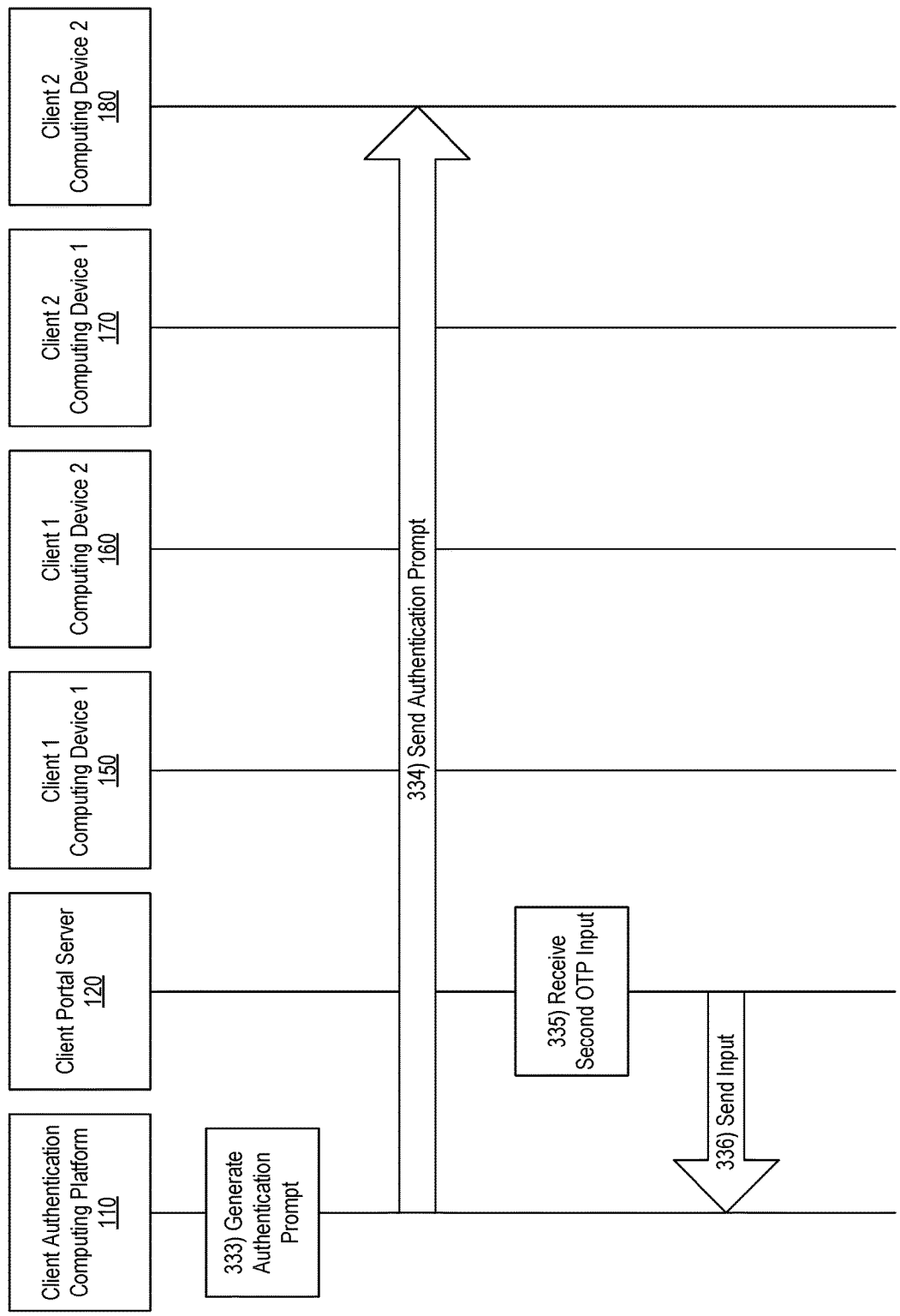

Referring to FIG. 3I, at step 333, client authentication computing platform 110 may generate a second registered-device authentication prompt for a fourth device associated with the second user account. For example, at step 333, based on receiving the request to authenticate the second user to the second user account, client authentication computing platform 110 may generate a second registered-device authentication prompt for a fourth computing device associated with the second user account (e.g., client computing device 180). In generating the second registered-device authentication prompt for the fourth computing device associated with the second user account (e.g., client computing device 180), client authentication computing platform 110 may, for instance, create and/or select an authentication prompt from a library of authentication prompt templates (which may, e.g., be stored by client authentication computing platform 110 in client authentication database 114) that may include one or more authentication prompts configured to prompt a recipient and/or user for biometric input for validation (e.g., fingerprint biometric input, voice biometric input, facial biometric input, retinal biometric input, or the like), physical token input (e.g., smart card input, chip card input, or the like), and/or other input for validation (e.g., by the device receiving the particular authentication prompt, such as client computing device 180).

In some embodiments, generating the second registered-device authentication prompt for the fourth computing device associated with the second user account comprises generating a biometric authentication prompt for the fourth computing device associated with the second user account. For example, in generating the second registered-device authentication prompt for the fourth computing device associated with the second user account (e.g., client computing device 180), client authentication computing platform 110 may generate a biometric authentication prompt for the fourth computing device associated with the second user account (e.g., client computing device 180). Such a biometric authentication prompt may, for instance, prompt a user of the fourth computing device associated with the second user account (e.g., client computing device 180) to provide fingerprint biometric input, voice biometric input, facial biometric input, retinal biometric input, and/or other biometric input for evaluation and/or validation by client computing device 180 and/or client authentication computing platform 110.

In some embodiments, generating the second registered-device authentication prompt for the fourth computing device associated with the second user account comprises generating a physical token authentication prompt for the fourth computing device associated with the second user account. For example, in generating the second registered-device authentication prompt for the fourth computing device associated with the second user account (e.g., client computing device 180), client authentication computing platform 110 may generate a physical token authentication prompt for the fourth computing device associated with the second user account (e.g., client computing device 180). Such a physical token authentication prompt may prompt a user of the fourth computing device associated with the second user account (e.g., client computing device 180) to connect a physical token (e.g., a smart card, a chip card, or the like) and/or otherwise provide physical token input (e.g., by inserting a smart card or chip card into a reader device) for evaluation and/or validation by client computing device 180 and/or client authentication computing platform 110.

At step 334, client authentication computing platform 110 may send the second registered-device authentication prompt to client computing device 180. For example, at step 334, client authentication computing platform 110 may send, via the communication interface (e.g., communication interface 115), to the fourth computing device associated with the second user account (e.g., client computing device 180), the second registered-device authentication prompt generated for the fourth computing device associated with the second user account (e.g., client computing device 180). In some instances, client authentication computing platform 110 may send the second registered-device authentication prompt generated for the fourth computing device associated with the second user account (e.g., client computing device 180) directly to the fourth computing device associated with the second user account (e.g., client computing device 180), while in other instances client authentication computing platform 110 may send the second registered-device authentication prompt generated for the fourth computing device associated with the second user account (e.g., client computing device 180) via one or more other servers and/or devices, such as via a push notification server that provides a push notification service to the fourth computing device associated with the second user account (e.g., client computing device 180).

At step 335, client portal server 120 may receive second one-time passcode input. For example, at step 335, client portal server 120 may receive second one-time passcode input from the user of client portal server 120 who is requesting access to the second user account. Such second one-time passcode input may, for example, include the second one-time passcode sent by client authentication computing platform 110 to client computing device 170. At step 336, client portal server 120 may send the second one-time passcode input to client authentication computing platform 110 for validation.

Referring to FIG. 3J, at step 337, client authentication computing platform 110 may receive the second one-time passcode input from client portal server 120. For example, at step 337, client authentication computing platform 110 may receive, via the communication interface (e.g., communication interface 115), from the client portal server (e.g., client portal server 120), second one-time passcode input. At step 338, client authentication computing platform 110 may validate the second one-time passcode input received from client portal server 120. For example, at step 338, client authentication computing platform 110 may validate the second one-time passcode input based on the second one-time passcode generated for the third computing device associated with the second user account (e.g., client computing device 170). In validating the second one-time passcode input based on the second one-time passcode generated for the third computing device associated with the second user account (e.g., client computing device 170), client authentication computing platform 110 may, for example, compare the second one-time passcode input to the second one-time passcode generated for the third computing device associated with the second user account (e.g., client computing device 170) to confirm that the second one-time passcode input matches the second one-time passcode generated for the third computing device associated with the second user account (e.g., client computing device 170) and is therefore valid. If client authentication computing platform 110 determines that the second one-time passcode input does not match the second one-time passcode generated for the third computing device associated with the second user account (e.g., client computing device 170) and is therefore not valid, client authentication computing platform 110 may generate and/or send one or more error messages to client portal server 120 and/or one or more other devices. Such error messages may, for instance, prompt the user of client portal server 120 requesting access to the second user account to try entering the one-time passcode again, and if the user again provides invalid one-time passcode input, client authentication computing platform 110 may deny access to the second user account and/or the event sequence may end.

At step 339, client authentication computing platform 110 may receive a second response to the second registered-device authentication prompt. For example, at step 339, client authentication computing platform 110 may receive, via the communication interface (e.g., communication interface 115), a second response to the second registered-device authentication prompt (e.g., from client computing device 180). The second response to the second registered-device authentication prompt (which may, e.g., be received by client authentication computing platform 110 from client computing device 180) may include information indicating that biometric input received by the fourth computing device associated with the second user account (e.g., client computing device 180) in response to the second registered-device authentication prompt generated for the fourth computing device associated with the second user account (e.g., client computing device 180) was received, confirmed, and/or validated by the fourth computing device associated with the second user account (e.g., client computing device 180). Additionally or alternatively, the second response to the second registered-device authentication prompt (which may, e.g., be received by client authentication computing platform 110 from client computing device 180) may include information indicating that physical token input received by the fourth computing device associated with the second user account (e.g., client computing device 180) in response to the second registered-device authentication prompt generated for the fourth computing device associated with the second user account (e.g., client computing device 180) was received, confirmed, and/or validated by the fourth computing device associated with the second user account (e.g., client computing device 180). Additionally or alternatively, the second response to the second registered-device authentication prompt (which may, e.g., be received by client authentication computing platform 110 from client computing device 180) may include actual biometric input received by the fourth computing device associated with the second user account (e.g., client computing device 180) in response to the second registered-device authentication prompt generated for the fourth computing device associated with the second user account (e.g., client computing device 180). Additionally or alternatively, the second response to the second registered-device authentication prompt (which may, e.g., be received by client authentication computing platform 110 from client computing device 180) may include actual physical token input received by the fourth computing device associated with the second user account (e.g., client computing device 180) in response to the second registered-device authentication prompt generated for the fourth computing device associated with the second user account (e.g., client computing device 180).

At step 340, client authentication computing platform 110 may validate the second response to the second registered-device authentication prompt. For example, at step 340, client authentication computing platform 110 may validate the second response to the second registered-device authentication prompt received from client computing device 180. In validating the second response to the second registered-device authentication prompt received from client computing device 180, client authentication computing platform 110 may, for example, determine and/or confirm that client computing device 180 provided information indicating that valid biometric input was received by client computing device 180 (e.g., from the user of client computing device 180, in response to the second registered-device authentication prompt) and determine that the second response to the second registered-device authentication prompt received from client computing device 180 is therefore valid. Additionally or alternatively, in validating the second response to the second registered-device authentication prompt received from client computing device 180, client authentication computing platform 110 may, for example, determine and/or confirm that client computing device 180 provided information indicating that valid physical token input was received by client computing device 180 (e.g., from the user of client computing device 180, in response to the second registered-device authentication prompt) and determine that the second response to the second registered-device authentication prompt received from client computing device 180 is therefore valid. Additionally or alternatively, in validating the second response to the second registered-device authentication prompt received from client computing device 180, client authentication computing platform 110 may, for example, determine and/or confirm that actual biometric input received by client computing device 180 (e.g., from the user of client computing device 180, in response to the second registered-device authentication prompt) matches one or more authorized biometrics associated with the second user account and/or maintained by client authentication computing platform 110 and determine that the second response to the second registered-device authentication prompt received from client computing device 180 is therefore valid. Additionally or alternatively, in validating the second response to the second registered-device authentication prompt received from client computing device 180, client authentication computing platform 110 may, for example, determine and/or confirm that actual physical token input received by client computing device 180 (e.g., from the user of client computing device 180, in response to the second registered-device authentication prompt) matches one or more authorized tokens associated with the second user account and/or maintained by client authentication computing platform 110 and determine that the second response to the second registered-device authentication prompt received from client computing device 180 is therefore valid. If client authentication computing platform 110 determines that the second response to the second registered-device authentication prompt received from client computing device 180 is not valid, client authentication computing platform 110 may generate and/or send one or more error messages to client portal server 120, client computing device 180, and/or one or more other devices. Such error messages may, for instance, prompt the user of client portal server 120, client computing device 180, and/or the one or more other devices to try responding to the second registered-device authentication prompt again, and if an invalid response is again received by client authentication computing platform 110, client authentication computing platform 110 may deny access to the second user account and/or the event sequence may end.

Figure 3K:
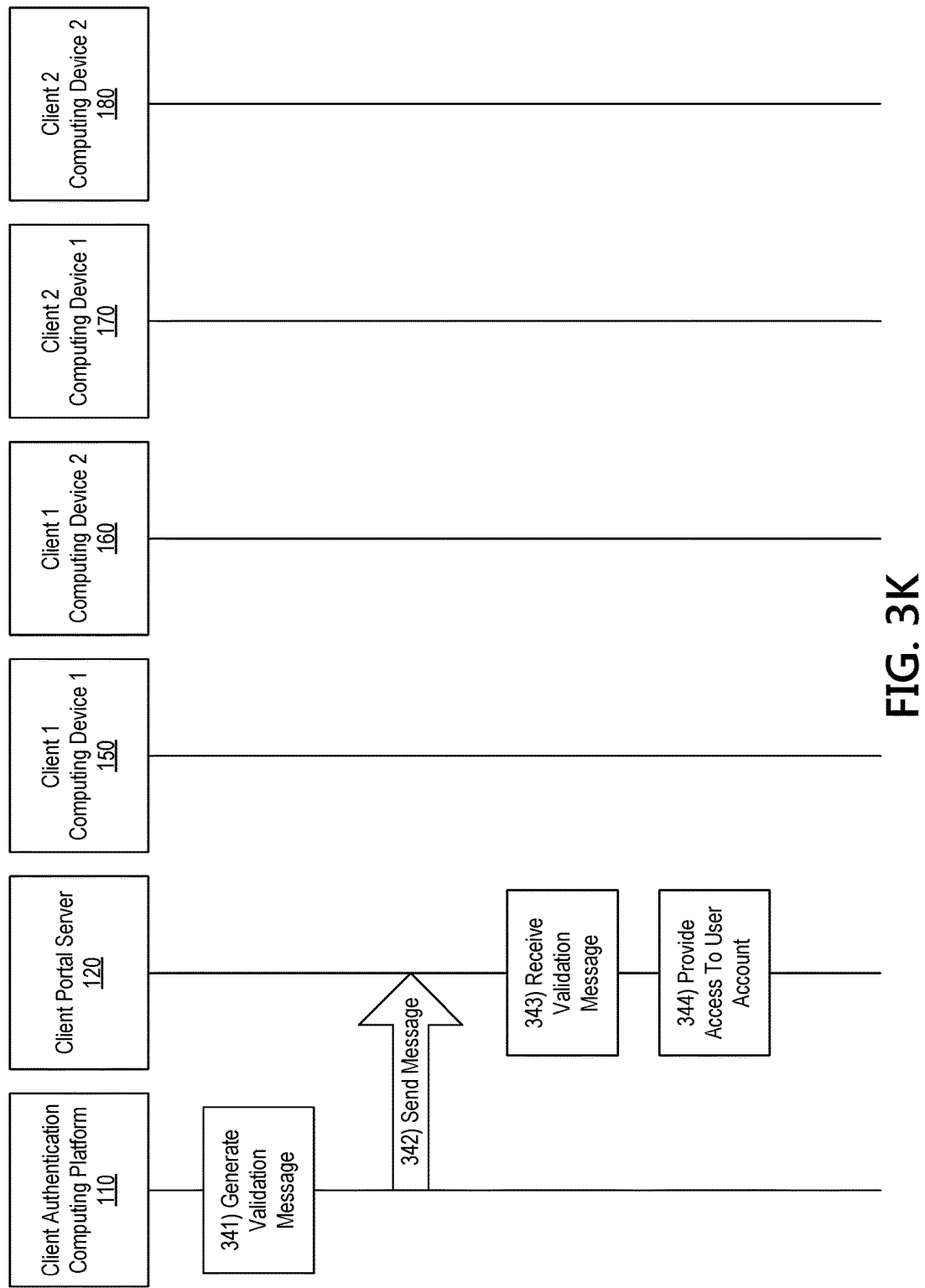

Referring to FIG. 3K, at step 341, client authentication computing platform 110 may generate a second validation message. For example, at step 341, based on validating the second one-time passcode input and the second response to the second registered-device authentication prompt, client authentication computing platform 110 may generate a second validation message directing the client portal server (e.g., client portal server 120) to provide the second user with access to the second user account. In some instances, in generating the second validation message directing the client portal server (e.g., client portal server 120) to provide the second user with access to the second user account, client authentication computing platform 110 may embed and/or otherwise include one or more tokens, certificates, and/or keys in the second validation message, and such tokens, certificates, and/or keys may be configured to enable and/or cause client portal server 120 to load and/or obtain user account information associated with the second user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the second validation message that enable and/or cause client portal server 120 to request, obtain, receive, and/or load financial account information associated with the second user account from one or more financial account management servers, so that client portal server 120 may subsequently present such financial account information via the client portal.

At step 342, client authentication computing platform 110 may send the second validation message to client portal server 120. For example, at step 342, client authentication computing platform 110 may send, via the communication interface (e.g., communication interface 115), to the client portal server (e.g., client portal server 120), the second validation message directing the client portal server (e.g., client portal server 120) to provide the second user with access to the second user account.

At step 343, client portal server 120 may receive the second validation message from client authentication computing platform 110. At step 344, client portal server 120 may provide the second user with access to the second user account based on the second validation message. For example, in providing the second user with access to the second user account based on the second validation message, client portal server 120 may present one or more graphical user interfaces which may form and/or otherwise be associated with a client portal provided by client portal server 120, such as an online banking portal and/or a mobile banking portal. For instance, client portal server 120 may present a graphical user interface that may include information indicating that authentication input, such as the onetime passcode input and/or the response to the registered-device authentication prompt, has been validated and that access to the second user account will be provided. Additionally or alternatively, client portal server 120 may present other graphical user interfaces that include information associated with the second user account and/or one or more controls that enable a user to access, view, and/or modify such information. In some instances, in providing the second user with access to the second user account based on the second validation message, client portal server 120 may present one or more online banking user interfaces and/or mobile banking user interfaces via which a user can view account information, such as account balance information and transaction history information, request and/or execute one or more transactions (e.g., funds transfer transactions, online bill pay transactions, and/or other transactions), and/or perform other functions.

Figure 10:
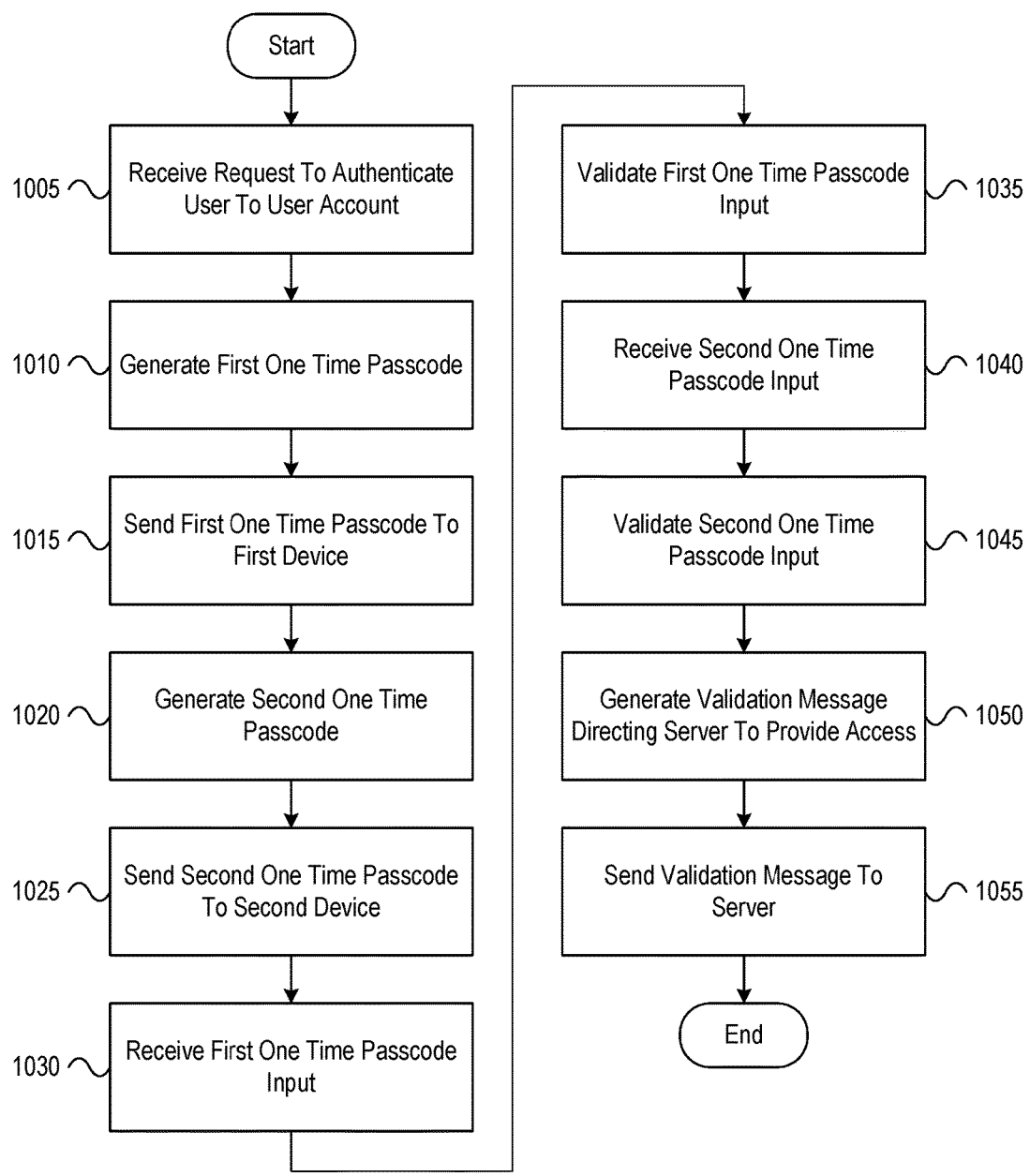
FIG. 10 depicts an illustrative method for preventing unauthorized access to secured information systems using multi-device authentication techniques in accordance with one or more example embodiments.

FIG. 10 depicts an illustrative method for preventing unauthorized access to secured information systems using multi-device authentication techniques in accordance with one or more example embodiments. Referring to FIG. 10, at step 1005, a computing platform having at least one processor, a memory, and a communication interface may receive, via the communication interface, and from a client portal server, a request to authenticate a first user to a first user account associated with a client portal provided by the client portal server. At step 1010, based on receiving the request to authenticate the first user to the first user account, the computing platform may generate a first one-time passcode for a first computing device associated with the first user account. At step 1015, the computing platform may send, via the communication interface, to the first computing device associated with the first user account, the first one-time passcode generated for the first computing device associated with the first user account. At step 1020, based on receiving the request to authenticate the first user to the first user account, the computing platform may generate a second one-time passcode for a second computing device associated with the first user account. At step 1025, the computing platform may send, via the communication interface, to the second computing device associated with the first user account, the second one-time passcode generated for the second computing device associated with the first user account.

At step 1030, the computing platform may receive, via the communication interface, from the client portal server, first one-time passcode input. At step 1035, the computing platform may validate the first one-time passcode input based on the first one-time passcode generated for the first computing device associated with the first user account. At step 1040, the computing platform may receive, via the communication interface, from the client portal server, second one-time passcode input. At step 1045, the computing platform may validate the second one-time passcode input based on the second one-time passcode generated for the second computing device associated with the first user account. At step 1050, based on validating the first one-time passcode input and the second one-time passcode input, the computing platform may generate a first validation message directing the client portal server to provide the first user with access to the first user account. At step 1055, the computing platform may send, via the communication interface, to the client portal server, the first validation message directing the client portal server to provide the first user with access to the first user account.

Figure 11:
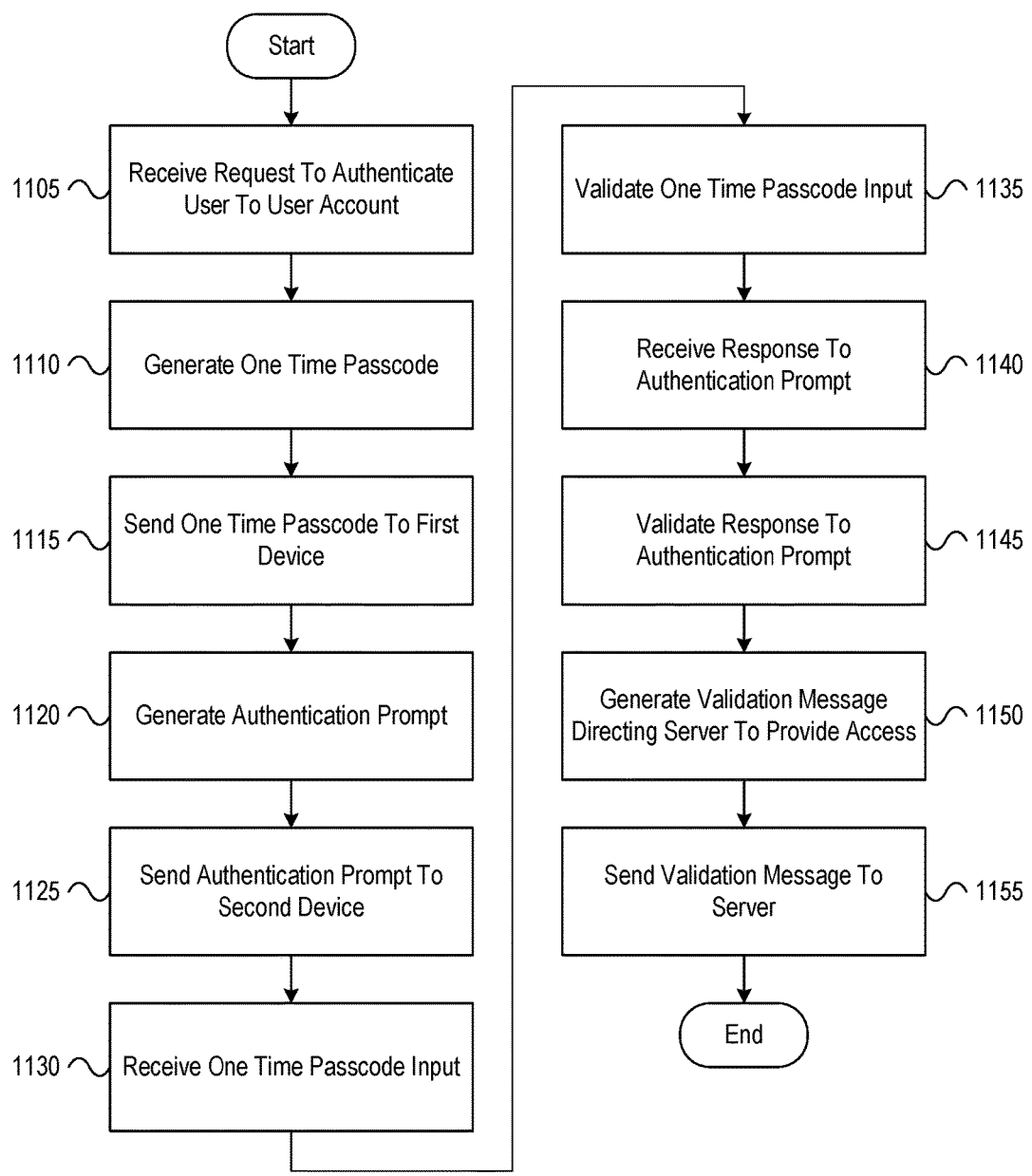
FIG. 11 depicts another illustrative method for preventing unauthorized access to secured information systems using multi-device authentication techniques in accordance with one or more example embodiments.

FIG. 11 depicts another illustrative method for preventing unauthorized access to secured information systems using multi-device authentication techniques in accordance with one or more example embodiments. Referring to FIG. 11, at step 1105, a computing platform having at least one processor, a memory, and a communication interface may receive, via the communication interface, and from a client portal server, a request to authenticate a first user to a first user account associated with a client portal provided by the client portal server. At step 1110, based on receiving the request to authenticate the first user to the first user account, the computing platform may generate a first one-time passcode for a first computing device associated with the first user account. At step 1115, the computing platform may send, via the communication interface, to the first computing device associated with the first user account, the first one-time passcode generated for the first computing device associated with the first user account. At step 1120, based on receiving the request to authenticate the first user to the first user account, the computing platform may generate a first registered-device authentication prompt for a second computing device associated with the first user account. At step 1125, the computing platform may send, via the communication interface, to the second computing device associated with the first user account, the first registered-device authentication prompt generated for the second computing device associated with the first user account.

At step 1130, the computing platform may receive, via the communication interface, from the client portal server, first one-time passcode input. At step 1135, the computing platform may validate the first one-time passcode input based on the first one-time passcode generated for the first computing device associated with the first user account. At step 1140, the computing platform may receive, via the communication interface, a first response to the first registered-device authentication prompt. At step 1145, the computing platform may validate the first response to the first registered-device authentication prompt. At step 1150, based on validating the first one-time passcode input and the first response to the first registered-device authentication prompt, the computing platform may generate a first validation message directing the client portal server to provide the first user with access to the first user account. At step 1155, the computing platform may send, via the communication interface, to the client portal server, the first validation message directing the client portal server to provide the first user with access to the first user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   store first device registration information linking a first computing device and a second computing device to a first user account associated with a client portal provided by a client portal server, wherein the second computing device is different from the first computing device;
   receive, via the communication interface, and from the client portal server, a request to authenticate a first user to the first user account associated with the client portal provided by the client portal server;
   based on receiving the request to authenticate the first user to the first user account, evaluate authentication state information associated with the first user account,
      wherein the authentication state information associated with the first user account is different from the first device registration information linking the first computing device and the second computing device to the first user account associated with the client portal provided by the client portal server, and
      wherein evaluating the authentication state information associated with the first user account comprises evaluating a current time of day, location information, and authentication history information associated with the first user account to identify a risk state of the first user account;
   select a multi-device authentication technique for authenticating the first user to the first user account based on evaluating the authentication state information associated with the first user account and the identified risk state of the first user account;
   based on selecting the multi-device authentication technique for authenticating the first user to the first user account, generate a first one-time passcode for the first computing device associated with the first user account;
   send, via the communication interface, to the first computing device associated with the first user account, the first one-time passcode generated for the first computing device associated with the first user account;
   based on selecting the multi-device authentication technique for authenticating the first user to the first user account, generate a first registered-device authentication prompt for the second computing device associated with the first user account, wherein the first registered-device authentication prompt generated for the second computing device associated with the first user account is different from the first one-time passcode generated for the first computing device associated with the first user account;
   send, via the communication interface, to the second computing device associated with the first user account, the first registered-device authentication prompt generated for the second computing device associated with the first user account;
   receive, via the communication interface, from the client portal server, first one-time passcode input;
   validate the first one-time passcode input based on the first one-time passcode generated for the first computing device associated with the first user account;
   receive, via the communication interface, a first response to the first registered-device authentication prompt;
   validate the first response to the first registered-device authentication prompt;
   based on validating the first one-time passcode input and the first response to the first registered-device authentication prompt, generate a first validation message directing the client portal server to provide the first user with access to the first user account; and
   send, via the communication interface, to the client portal server, the first validation message directing the client portal server to provide the first user with access to the first user account.

2. The computing platform of claim 1, wherein generating the first registered-device authentication prompt for the second computing device associated with the first user account comprises generating a biometric authentication prompt for the second computing device associated with the first user account.

3. The computing platform of claim 1, wherein generating the first registered-device authentication prompt for the second computing device associated with the first user account comprises generating a physical token authentication prompt for the second computing device associated with the first user account.

4. The computing platform of claim 1, wherein the memory stores additional computer-readable instructions that, when executed by the at least one processor, cause the computing platform to:
 prior to receiving the request to authenticate the first user to the first user account:
  receive, via the communication interface, from the client portal server, first authentication preferences information for the first user account; and
  store the first authentication preferences information for the first user account received from the client portal server.

5. The computing platform of claim 4, wherein the first authentication preferences information for the first user account comprises selection information directing the computing platform to use the multi-device authentication technique when processing authentication requests for the first user account.

6. The computing platform of claim 1, wherein the memory stores additional computer-readable instructions that, when executed by the at least one processor, cause the computing platform to:
 receive, via the communication interface, and from the client portal server, a request to authenticate a second user to a second user account associated with the client portal provided by the client portal server;
 based on receiving the request to authenticate the second user to the second user account, generate a second one-time passcode for a third computing device associated with the second user account;
 send, via the communication interface, to the third computing device associated with the second user account, the second one-time passcode generated for the third computing device associated with the second user account;
 based on receiving the request to authenticate the second user to the second user account, generate a second registered-device authentication prompt for a fourth computing device associated with the second user account;
 send, via the communication interface, to the fourth computing device associated with the second user account, the second registered-device authentication prompt generated for the fourth computing device associated with the second user account;
 receive, via the communication interface, from the client portal server, second one-time passcode input;
 validate the second one-time passcode input based on the second one-time passcode generated for the third computing device associated with the second user account;
 receive, via the communication interface, a second response to the second registered-device authentication prompt;
 validate the second response to the second registered-device authentication prompt;
 based on validating the second one-time passcode input and the second response to the second registered-device authentication prompt, generate a second validation message directing the client portal server to provide the second user with access to the second user account; and
 send, via the communication interface, to the client portal server, the second validation message directing the client portal server to provide the second user with access to the second user account.

7. The computing platform of claim 6, wherein generating the second registered-device authentication prompt for the fourth computing device associated with the second user account comprises generating a biometric authentication prompt for the fourth computing device associated with the second user account.

8. The computing platform of claim 6, wherein generating the second registered-device authentication prompt for the fourth computing device associated with the second user account comprises generating a physical token authentication prompt for the fourth computing device associated with the second user account.

9. The computing platform of claim 6, wherein the memory stores additional computer-readable instructions that, when executed by the at least one processor, cause the computing platform to:
 prior to receiving the request to authenticate the second user to the second user account, store second device registration information linking the third computing device and the fourth computing device to the second user account.

10. The computing platform of claim 6, wherein the memory stores additional computer-readable instructions that, when executed by the at least one processor, cause the computing platform to:
 prior to receiving the request to authenticate the second user to the second user account:
  receive, via the communication interface, from the client portal server, second authentication preferences information for the second user account; and
  store the second authentication preferences information for the second user account received from the client portal server.

11. The computing platform of claim 10, wherein the second authentication preferences information for the second user account comprises selection information directing the computing platform to use the multi-device authentication technique when processing authentication requests for the second user account.

12. The computing platform of claim 6, wherein the memory stores additional computer-readable instructions that, when executed by the at least one processor, cause the computing platform to:
 prior to generating the second one-time passcode and the second registered-device authentication prompt:
  evaluate authentication state information associated with the second user account; and
  select the multi-device authentication technique for authenticating the second user to the second user account based on evaluating the authentication state information associated with the second user account.

13. The computing platform of claim 12, wherein evaluating the authentication state information associated with the second user account comprises evaluating a current time of day.

14. The computing platform of claim 12, wherein evaluating the authentication state information associated with the second user account comprises evaluating location information.

15. The computing platform of claim 12, wherein evaluating the authentication state information associated with the second user account comprises evaluating authentication history information associated with the second user account.

16. The computing platform of claim 1, wherein the identified risk state of the first user account corresponds to a risk score, and wherein the multi-device authentication technique is selected for authenticating the first user to the first user account based on the risk score exceeding a predetermined threshold.

17. A method, comprising:
- at a computing platform comprising at least one processor, memory, and a communication interface:
  - storing, by the at least one processor, first device registration information linking a first computing device and a second computing device to a first user account associated with a client portal provided by a client portal server, wherein the second computing device is different from the first computing device;
  - receiving, by the at least one processor, via the communication interface, and from the client portal server, a request to authenticate a first user to the first user account associated with the client portal provided by the client portal server;
  - based on receiving the request to authenticate the first user to the first user account, evaluating, by the at least one processor, authentication state information associated with the first user account,
    - wherein the authentication state information associated with the first user account is different from the first device registration information linking the first computing device and the second computing device to the first user account associated with the client portal provided by the client portal server, and
    - wherein evaluating the authentication state information associated with the first user account comprises evaluating a current time of day, location information, and authentication history information associated with the first user account to identify a risk state of the first user account;
  - selecting, by the at least one processor, a multi-device authentication technique for authenticating the first user to the first user account based on evaluating the authentication state information associated with the first user account and the identified risk state of the first user account;
  - based on selecting the multi-device authentication technique for authenticating the first user to the first user account, generating, by the at least one processor, a first one-time passcode for the first computing device associated with the first user account;
  - sending, by the at least one processor, via the communication interface, to the first computing device associated with the first user account, the first one-time passcode generated for the first computing device associated with the first user account;
  - based on selecting the multi-device authentication technique for authenticating the first user to the first user account, generating, by the at least one processor, a first registered-device authentication prompt for the second computing device associated with the first user account, wherein the first registered-device authentication prompt generated for the second computing device associated with the first user account is different from the first one-time passcode generated for the first computing device associated with the first user account;
  - sending, by the at least one processor, via the communication interface, to the second computing device associated with the first user account, the first registered-device authentication prompt generated for the second computing device associated with the first user account;
  - receiving, by the at least one processor, via the communication interface, from the client portal server, first one-time passcode input;
  - validating, by the at least one processor, the first one-time passcode input based on the first one-time passcode generated for the first computing device associated with the first user account;
  - receiving, by the at least one processor, via the communication interface, a first response to the first registered-device authentication prompt;
  - validating, by the at least one processor, the first response to the first registered-device authentication prompt;
  - based on validating the first one-time passcode input and the first response to the first registered-device authentication prompt, generating, by the at least one processor, a first validation message directing the client portal server to provide the first user with access to the first user account; and
  - sending, by the at least one processor, via the communication interface, to the client portal server, the first validation message directing the client portal server to provide the first user with access to the first user account.

18. The method of claim 17, wherein generating the first registered-device authentication prompt for the second computing device associated with the first user account comprises generating a biometric authentication prompt for the second computing device associated with the first user account.

19. The method of claim 17, wherein generating the first registered-device authentication prompt for the second computing device associated with the first user account comprises generating a physical token authentication prompt for the second computing device associated with the first user account.

20. The method of claim 17, comprising:
- prior to receiving the request to authenticate the first user to the first user account:
  - receiving, by the at least one processor, via the communication interface, from the client portal server, first authentication preferences information for the first user account; and
  - storing, by the at least one processor, the first authentication preferences information for the first user account received from the client portal server.

21. The method of claim 20, wherein the first authentication preferences information for the first user account comprises selection information directing the computing platform to use the multi-device authentication technique when processing authentication requests for the first user account.

22. One or more non-transitory computer-readable media storing instructions that, when executed by a computing platform comprising at least one processor, memory, and a communication interface, cause the computing platform to:

store first device registration information linking a first computing device and a second computing device to a first user account associated with a client portal provided by a client portal server, wherein the second computing device is different from the first computing device;

receive, via the communication interface, and from the client portal server, a request to authenticate a first user to the first user account associated with the client portal provided by the client portal server;

based on receiving the request to authenticate the first user to the first user account, evaluate authentication state information associated with the first user account,
wherein the authentication state information associated with the first user account is different from the first device registration information linking the first computing device and the second computing device to the first user account associated with the client portal provided by the client portal server, and
wherein evaluating the authentication state information associated with the first user account comprises evaluating a current time of day, location information, and authentication history information associated with the first user account to identify a risk state of the first user account;

select a multi-device authentication technique for authenticating the first user to the first user account based on evaluating the authentication state information associated with the first user account and the identified risk state of the first user account;

based on selecting the multi-device authentication technique for authenticating the first user to the first user account, generate a first one-time passcode for the first computing device associated with the first user account;

send, via the communication interface, to the first computing device associated with the first user account, the first one-time passcode generated for the first computing device associated with the first user account;

based on selecting the multi-device authentication technique for authenticating the first user to the first user account, generate a first registered-device authentication prompt for the second computing device associated with the first user account, wherein the first registered-device authentication prompt generated for the second computing device associated with the first user account is different from the first one-time passcode generated for the first computing device associated with the first user account;

send, via the communication interface, to the second computing device associated with the first user account, the first registered-device authentication prompt generated for the second computing device associated with the first user account;

receive, via the communication interface, from the client portal server, first one-time passcode input;

validate the first one-time passcode input based on the first one-time passcode generated for the first computing device associated with the first user account;

receive, via the communication interface, a first response to the first registered-device authentication prompt;

validate the first response to the first registered-device authentication prompt;

based on validating the first one-time passcode input and the first response to the first registered-device authentication prompt, generate a first validation message directing the client portal server to provide the first user with access to the first user account; and send, via the communication interface, to the client portal server, the first validation message directing the client portal server to provide the first user with access to the first user account.

* * * * *